US006609110B1

(12) United States Patent
Dowd et al.

(10) Patent No.: US 6,609,110 B1
(45) Date of Patent: Aug. 19, 2003

(54) METHOD AND SYSTEM FOR RETAIL INVESTMENT OBJECTIVE SETTING

(75) Inventors: Marylou Dowd, Massapequa, NY (US); Michael F. Green, Fulham (GB); Lawrence D. Weiss, Skaneateles, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/497,571

(22) Filed: Feb. 3, 2000

Related U.S. Application Data

(63) Continuation of application No. 08/912,121, filed on Aug. 15, 1997, now abandoned.
(60) Provisional application No. 60/024,132, filed on Aug. 16, 1996.

(51) Int. Cl.[7] .............................................. G06F 17/60
(52) U.S. Cl. ............................. 705/36; 705/35; 705/37
(58) Field of Search ..................................... 705/35–37

(56) References Cited

U.S. PATENT DOCUMENTS

| | | | | |
|---|---|---|---|---|
| 4,837,693 A | * | 6/1989 | Schotz | 705/36 |
| 5,806,049 A | | 9/1998 | Petruzzi | 705/36 |
| 5,812,987 A | * | 9/1998 | Luskin et al. | 705/36 |
| 5,864,828 A | | 1/1999 | Atkins | 705/36 |
| 5,884,287 A | | 3/1999 | Edesses | 705/36 |
| 6,055,517 A | * | 4/2000 | Friend et al. | 705/36 |

FOREIGN PATENT DOCUMENTS

WO 96/18963 * 6/1996 .......... G06F/157/00

OTHER PUBLICATIONS

Droms, William G., Global asset allocation for individual investors. (High–Net–Worth Planning: The Perilous Climb) CPA Journa v64, n9, p. 26(8) Sep., 1994.*
Madura et al., International Diversification for the individual : A Review, Financial Services Review, 1991.*
Stocks and Currencies, Economist, Jun. 6, 1992, vol. 323 Issue 7762, p. 87.*

* cited by examiner

Primary Examiner—Vincent Millin
Assistant Examiner—Jagdish N Patel
(74) Attorney, Agent, or Firm—George T. Marcou; Kilpatrick Stockton LLP

(57) ABSTRACT

This invention describes a method and system for automated assistance with investment decisionmaking. In particular, the invention relates to assisting retail customers with setting investment objectives, modifying those objectives, and making investments, based on the customer's profile, portfolio, and investment preferences. The invention also comprises a system and method for providing a tutorial aspect intended to assist an account representative, through interactive visual aids, with explaining or questions by a user using the investment decisionmaking method and system. The invention also comprises a method and system for system administration of the investment decisionmaking system.

33 Claims, 90 Drawing Sheets

Financial information

File  Goto  Tools  Help

Investment Objective Setting – Financial Information — assets — 42

How much money do you have in each category?

Currency [Belgian Franc ▼]

| Cash & Equivalents | — 45a |
| Fixed Income | — 46a |
| Equities | — 47a |
| Mixed funds | — 48a |

Total

Cash & Equivalents — 52

Currency [Belgian Franc ▼]

CD's (1 year or less) [ ] — 53
Checking [ ] — 54
Insured Money Market [50000] — 55
Savings [ ] — 56
US T-Bills [ ] — 57
Other [ ] — 58

Total [50000] — 60

☐ No information

[Back] [Next]

FIG. 13

Financial information — Investment Objective Setting – Financial Information — assets — 42

File  Goto  Tools  Help

How much money do you have in each category?

Currency [Belgian Franc ▼]

| Cash & Equivalents | — 45a |
| Fixed Income | — 46a |
| Equities | — 47a |
| Mixed funds | — 48a |

Total

Fixed Income

Currency [Belgian Franc ▼]

- CD's (over 1 year) — 62
- Bond Funds — 63
- Corporate Bonds — 64
- Fixed Annuities — 65
- Index Funds — 66
- Municipal Bonds — 67
- Unit Investment Trusts — 68
- U.S. Government Bonds — 69
- Zero Coupon Bonds — 70
- Other — 71

Total

☐ No Information

[Back]  [Next]

Investment Objective Setting - Investment Information

File  Goto  Options  Tools  Help

As a portion of your total assets this investment is roughly:

[Exclude the property you live in, but include investment property, cash, stocks, bonds, and mutual funds]

- ☐ less than 25%
- ☐ between 25% and 50%
- ☐ between 51% and 75%
- ☐ more than 75%

How do you like to think about your investment money?

- ☐ as a single allocation that considers all of your investment goals
- ☐ as separate allocations for each of your individual investment goals Back / Next

RESERVED

Investment Objective Setting – Investment Profile

File  Goto  Options  Tools  Help

Which value would you like to change for this goal?

Goal: Fund retirement

- Investment amount — BET    10,000,000
- Income required — No
- Timeframe — more than 7 years
- Investment outcome — [chart: 1981 to 1995, +12.21%]
- Staying power — I would stay, I can accept short-term loss in the hope of long-term gain.

Back  Next

FIG. 49

Investment/Objective Setting

File  Goto  Options  Tools  Help

Personal | Financial | Investment

Customer ID

Name: Prefix, First, MI, Last
Spouse: Suffix
Date of Birth  mm/dd/yy

Address

Telephone

Citizenship: Belgium
Reference Currency: Belgian Franc

Marital Status

Okay

METHOD AND SYSTEM FOR RETAIL INVESTMENT OBJECTIVE SETTING

CROSS-REFERENCE TO RELATED APPLICATIONS

This application is a continuation of U.S. application Ser. No. 08/912,121, filed Aug. 15, 1997, now abandoned which claims the benefit of U.S. Provisional Application No. 60/024,132 filed Aug. 16, 1996.

FIELD OF THE INVENTION

This invention generally relates to a method and system for automated assistance with investment decisionmaking. In particular, the invention relates to assisting retail customers with identifying investment needs, setting investment objectives, educating on potential investments using historical performance, modifying objectives, and identifying and making investments, based on the customer's profile; portfolio, and investment preferences.

BACKGROUND OF THE INVENTION

The problem with existing methods of buying and selling investments is that typical investment suggestions often do not address such issues as suitability for a particular customer, suitability in terms of risk tolerance or in terms of time frame that the customer should be investing, and whether the customer prefers a conservative or more aggressive approach to investments. Products are instead typically sold based on a customer request for a particular product which, in fact, may not actually by best to meet the customer's needs. Also, the product choice may be based on what sales people are comfortable selling which again may not be best for the customer.

Existing computerized products do not provide a single comprehensive system to determine the best products for a customer. They may consist only of pieces of the investment decisionmaking process. These pieces include systems for creating charts to examine historical programs, systems for straight data entry to open an account, etc.

SUMMARY OF THE INVENTION

It is an object of the present invention to overcome the shortcomings discussed above with a method and system for assisting a customer with investment decisions. The system, referred to as Retail Investment Objective Setting ("RIOS"), takes inputted information necessary to determine customer preferences and needs in an interactive manner using charts to educate and other information to assure that customer preferences and needs are met by the investment portfolio selected. The following are the major aspects of the process of an embodiment of the present invention.

A user accesses the system using a password. In general, it is anticipated that an investment staff person would access the system in the presence of a customer wishing to make investment decisions.

The Determine Personal Profile Module within the system captures customer personal and financial data. The financial data is played back to the customer in the form of a current asset allocation. Further profiling ("filtering") questions, result in an asset allocation recommendation that is distinguished by investment time horizon, risk and return, as well as additional objective and subjective criteria (i.e., experience, staying power).

Within this module customers can identify either one or a number of financial goals against which asset allocations are to be earmarked.

The outcome of the Profiling module is an asset allocation recommendation that the customer, with the guidance of the account officer, identifies as indicative of his or her investment objectives.

Multiple portfolios (asset allocations) serve as the basis of the recommended asset allocations. The number of portfolios can vary by country, and, in an embodiment of the present invention, they are updated regularly, such as twice yearly. The recommended allocations reflect policy and strategic asset allocations and market forecasts from internal policy determinations by the financial institution providing the service.

When Profiling is complete, the system proceeds to the Recommend Asset Allocation Module. In this module, the historical performance of the recommended asset allocation is shown using cumulative and quarterly volatility historical performance charts. Once final agreement on an asset allocation approach is reached, specific investment products (mutual funds) are recommended as a means of implementing the asset allocation.

After the Recommend an Asset Allocation Module is completed, the system proceeds to Set Up Your Account, the final module. Within this module, the customer, with guidance from the Account Officer, selects specific mutual funds for purchase and identifies some specific parameters regarding the purchase.

At the conclusion of the session a summary report is generated which recaps Customer profile, investment objective(s), asset allocation and fund recommendation(s), product factsheets and fulfillment details.

Additional objects, advantages and novel features of the invention will be set forth in part in the description which follows, and in part will become more apparent to those skilled in the art upon examination of the following or may be learned by practice of the invention. The objects and advantages of the invention may be realized and attained by means of the instrumentalities and combinations particularly pointed out in the appended claims.

To achieve the stated and other objects of the present invention, as embodied and described below, the invention may comprise the steps of signing onto the system by the user, providing demographics information, providing asset information, selecting an investment amount, selecting goals for investment, selecting an investment time horizon, selecting a potential risk/return relationship, selecting a profile for investment, selecting a choice for staying power, and selecting information on investment experience. The system determines a recommended investment portfolio based on the user inputs and selections and compares the recommended portfolio and performance to the customer's current allocation. The user then selects a risk class, purchases selected products, and ends session.

BRIEF DESCRIPTION OF THE DRAWINGS

In the drawings:

FIG. 9 is the user identification information screen.

FIG. 12 is a pop-up window for category asset breakdown information.

FIG. 13 is a pop-up window relating to fixed income.

FIG. 15 is an asset investment selection screen.

FIG. 20 (RESERVED).

FIG. 35 is a screen containing an example of product selection options.

FIG. 38 is a screen in abbreviated format of previously inputted information.

FIG. 49 is a screen for Customer Data Summary.

FIG. 53 is a pop-up window for customer Personal information.

FIG. 60 is a pop-up window for the Experience menu selection.

DETAILED DESCRIPTION

Figure 1:
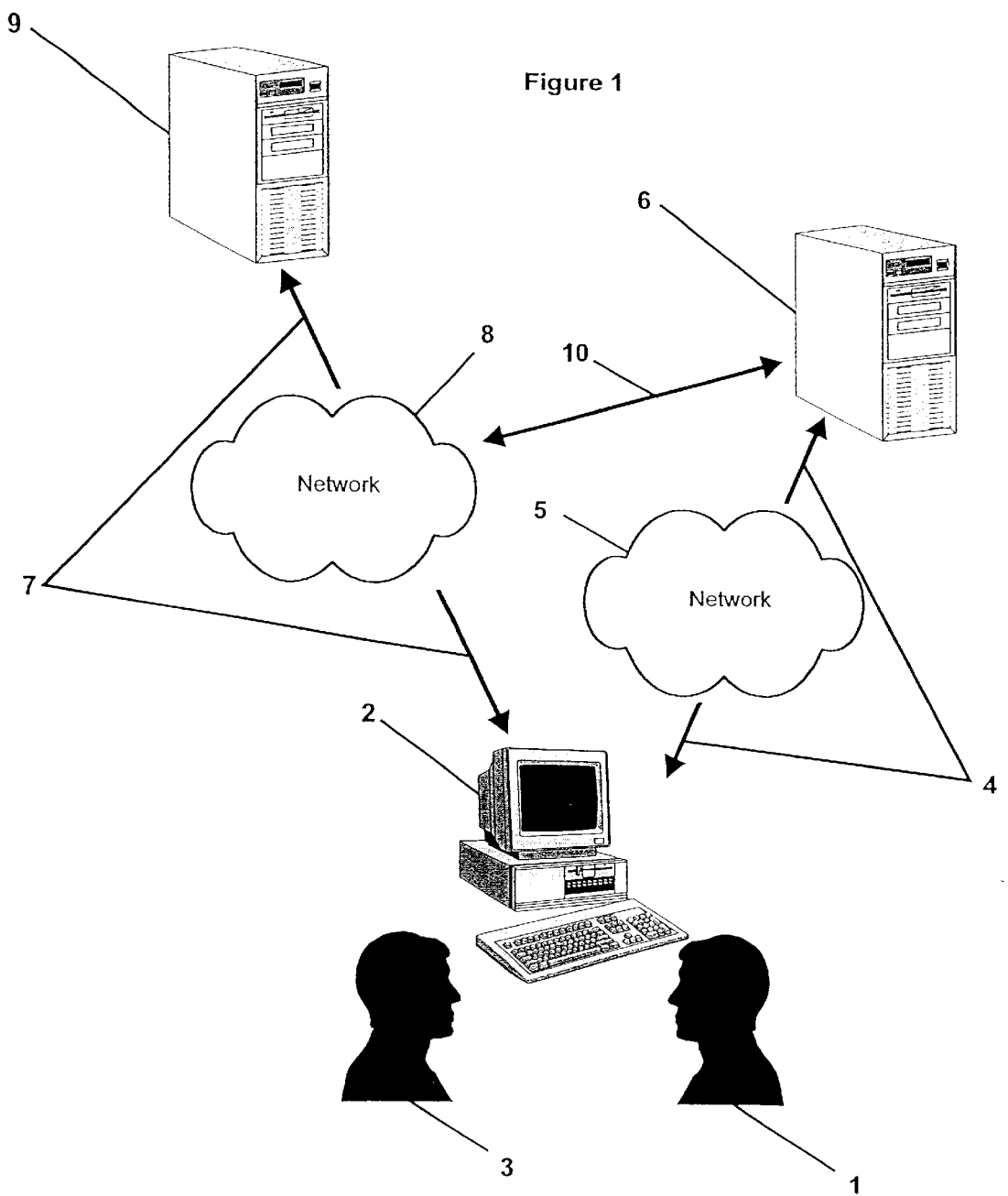
FIG. 1 contains a diagram of components overviewing an embodiment of the present invention.

The following description provides an overview of detailed system specifications for an embodiment of the present invention. The system of the present invention is an interactive automated, for example, personal computer (PC) based, tool that Account Officers or others can use with customers to develop suitable asset allocation and investment product recommendations. An embodiment of the present invention is a standalone system. Another embodiment of the present invention provides on-line fulfillment via communication with host systems, such as mainframes, servers, networks, and/or other PCs.

In order to more easily describe an embodiment of the present invention, an example application to a banking environment (e.g., products and recommendations) is described. This example includes sample data for that banking institution. The example information is not intended to limit the application of the invention to a particular banking institution or types of loan institutions.

In an embodiment of the present invention, the system is structured into four discrete modules:
1) Module 1—Determine Customer Profile. This module collects customer specific information to determine an appropriate asset allocation recommendation.
2) Module 2—Agree on an Asset Allocation. This module provides details on the recommended asset allocation
3) Module 3—Match products to the Allocation. This module suggests an implementation strategy via mutual fund investments.
4) Module 4—Implement the recommendation. This module collects information on client decisions regarding the mutual funds recommended.

In addition to these four modules the system also provides access to several features that can be used to explain the benefits of asset allocation, including: the option to establish separate asset allocations to meet several goals; tutorial screens that can be used to explain the rationale of asset allocation; the capacity to present data in different currencies; the option to present investment performance in terms of either real or nominal terms; a tool for recording notes about the customer; and the ability to print customer reports.

In an embodiment of the present invention, three methods are available to navigate through the system: 1) a Default flow which accesses a predetermined sequence of screens; 2) Pull-down menus which allow flexible access to all modules and data; and 3) Selection buttons which allow choices for details or options on a particular screen.

In an embodiment of the present invention, user access to the system requires a password. Once the password is entered, the user can begin either to go through the system in a systematic manner using the default flow or to browse. The four broadly grouped sequential stages of a complete process of an embodiment of the present invention using the default sequences are described further below.

The first stage, Determine Personal Profile, allows the capture of customer personal and financial data. The financial data is "played back" to the customer in the form of a current asset allocation. Further profiling ("filtering") questions, result in an asset allocation recommendation that is distinguished by investment time horizon, risk and return, as well as additional objective and subjective criteria (e.g. experience, staying power).

In this stage of the input process, the customer is asked to identify one or a number of financial goals for which asset allocations are to be earmarked. The assets dedicated to these goals can represent the allocation of all or only a portion of a customer's financial assets.

The outcome of the customer profiling process is the recommendation of an asset allocation to achieve each goal. The customer, with the guidance of the account officer, confirms that each allocation is consistent with his or her investment objectives.

Multiple portfolios (asset allocations), which vary by country, serve as the basis of the recommended asset allocations. These portfolios reflect the investment environment and asset types specific to the country in which the system is being used. In an embodiment of the present invention, model portfolios are updated periodically, such as twice yearly. The recommended allocations reflect policy and strategic asset allocations and market forecasts from the internal policy determinations of the financial institution affiliated with the service.

After the customer profile has been determined and an asset allocation that corresponds to the profile has been recommended, the process of the present invention moves into the next stage, Agree on an Asset Allocation. In this stage, the past performance of the recommended asset allocation is presented using historical performance charts of cumulative and quarterly volatility. The customer can compare the recommendation to the other alternative portfolios. These comparisons are used to arrive at a mutual understanding of the investment approach that will be adopted. If the customer has provided information on current holdings the selected model portfolio is compared to the customer's own allocation. Once final agreement on an asset allocation approach is reached, specific investment product (mutual funds) can be recommended as a means of implementing the asset allocation.

The recommendation and selection of specific investment products is achieved in the third stage of the process, Match Products to the Allocation. The mix of funds (Risk Class Funds, Asset Class Funds, Proprietary banking institution funds, and Third Party Funds) available in an embodiment of the present invention varies by country. The recommendations provided in an embodiment of the present invention include a combination of the following: 1) local country risk class funds; 2) local country bond fund(s); 3) local country equity fund; 4) other bank-specific products; and 5) third party funds as required. The recommendation can also include other investment products, such as guaranteed funds and market linked deposits.

For each fund recommended, the present invention is capable of generating an alternate recommendation. All such alternate fund selections are available via on screen selection.

Specific product information is presented via a "fact sheet" like screen. Information presented includes items such as: fund objectives, fund performance, fund composition (e.g., industry and country allocation); and other fund details. The "fact sheet" represents one of a number of reports that are to be printable for customer takeaway. This information is accessible within the context of the session as well as by selecting from a pull down menu.

Other features of an embodiment of the present invention are as follows.

Asset Allocation Tutorial—The tutorial contains several screens that provide generic descriptions of the three major asset classes (cash and equivalents, fixed income, and equities) and the financial instruments that comprise them, the asset allocation process, and, in the example below, a tailored banking institution's approach to asset allocation. Screens included in this tutorial enable Account officers (users) to demonstrate the risk/return implications of varying asset mixes and the differing historical performance characteristics of the three asset classes.

Multiple currency—The present invention displays multiple market and instruments data for each country included in the system.

Initial currency presentations default to the country where the session is being conducted, or to US Dollar if the country currency is not represented. The system also contains market and investment instrument data, including historical performance and specific investment product information.

Multiple language capability—In an embodiment of the present invention, multiple languages are supported by the system.

Investment Performance—The present invention provides a robust, interactive historical investment performance "what if" capability which is accessible within the context of the asset allocation session as well as by selecting from a pull-down menu. The user is able to choose to display performance in nominal or real terms. Initial data presentations default to nominal returns. Historical investment performance screens contain past performance data, presented in quarterly increments, which can vary by country. Graphs available in the system are constructed to be interactive (e.g., selecting a bar or value will result in additional clarifying data being displayed).

Report Generation—The present invention supports printing of summary reports. Reports may be printed within the context of a session or via a pulldown menu. Two basic report types are available:
1) Session Summary report—provides a detailed recap of the session, including customer profile, investment objective(s), asset allocation and fund recommendations, fund fact sheets and fulfillment details; and
2) Product fact sheet—Information presented for each portfolio or fund is presented, including items such as fund objectives, find performance, find composition (e.g., industry and country allocation), and other pertinent details.

System Security—In an embodiment of the present invention, access to the system requires a password and some form of system file security which is defined by both corporate and the individual country security standards. File encryption for saved files is also used.

File save/retrieve—In an embodiment of the present invention, customer files are saved locally. As a minimum, the three most recent customer sessions are capable of being saved and retrieved locally. Access to files may be restricted to the Customer's Account officer.

Quick data entry—The system provides access to an on-line summary form which will allow Account officers to enter (or update for returning customers) all customer profile information.

Customer noting—The ability to add and retrieve customer notes is included within system capabilities. All customer notes may be stored and retrieved within the context of a customer session.

Fulfillment—Following the acceptance of the recommendation, the system provides detailed screen(s) allowing customers to purchase the requisite funds.

Other functionality—Other functionality capability may be included in the system, such as staff Management Information Systems (MIS) reports.

References will now be made in detail to an embodiment of the invention, an example of which is illustrated in the accompanying drawings.

FIG. 1 contains a diagram of the components of an embodiment of the present invention. A user 1, such as an investment expert employed by a bank, at a terminal 2, such as a personal computer (PC) advises a customer 3, while accessing 4, through a network 5, such as the Internet, the system, which is housed on a server 6, comprising a mainframe computer, a minicomputer, or a microcomputer, such as a PC. The user 1 may also access 7 through a separate banking network 8, which comprises a conventional bank server 9, through which the user 1 may arrange directly for investments or other investment-related transactions. These transactions may also be arranged via connection 10 between the server 6 housing the system and the banking network 8, comprising the conventional bank server 9.

Figure 2:
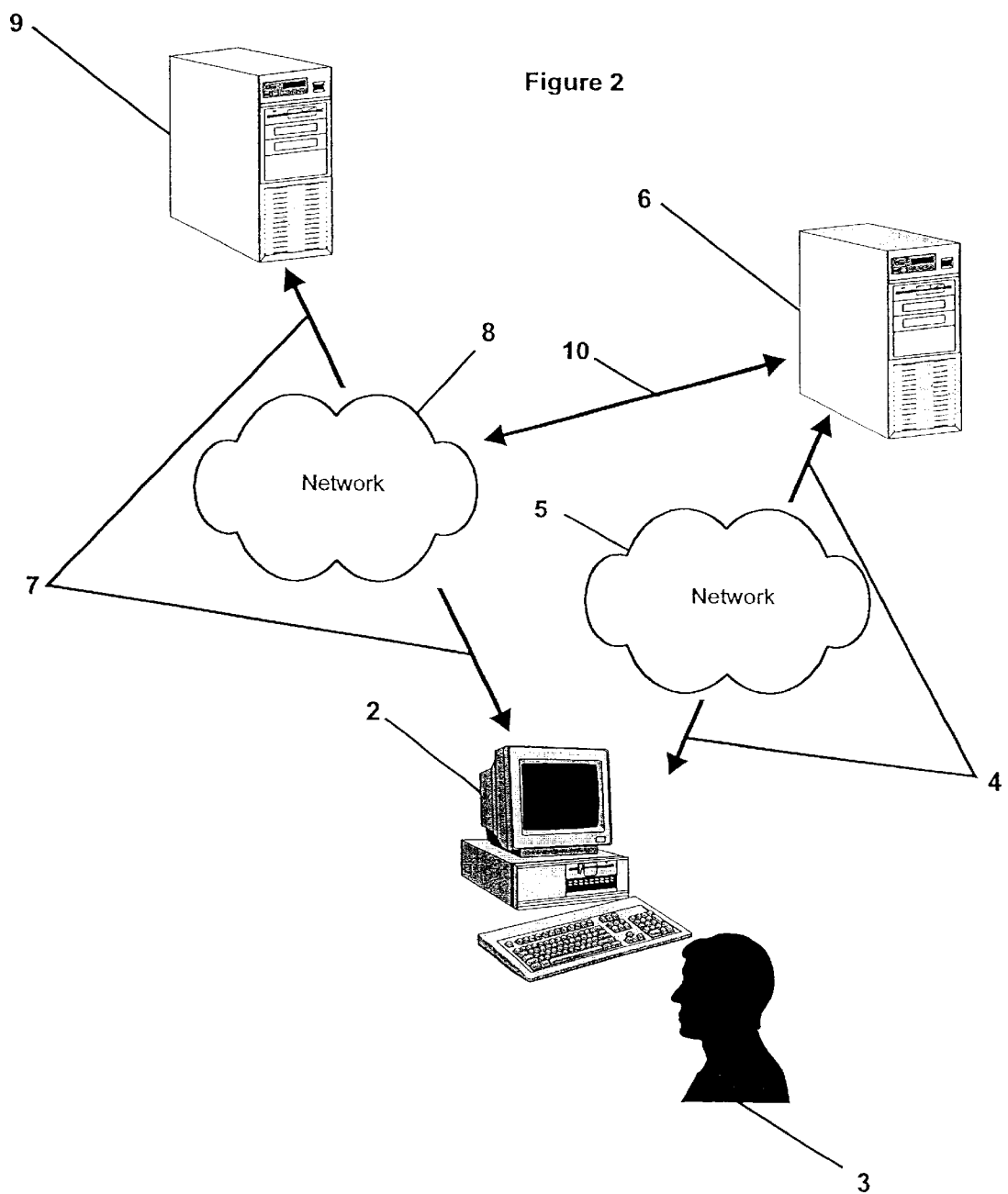
FIG. 2 contains a diagram of components of an embodiment of the system of the present invention.

FIG. 2 contains an embodiment of the present invention. In this embodiment, the customer 3, at a terminal 2, accesses 4, through a network 5, the system housed on a server 6. The customer may access 7 through a separate banking network 8, a conventional bank server 9, to carry out investment-related transactions. These transactions may also be carried out via connection 10 between the server 6 housing the system and the banking network 8 comprising the conventional bank server 9.

Figure 3:
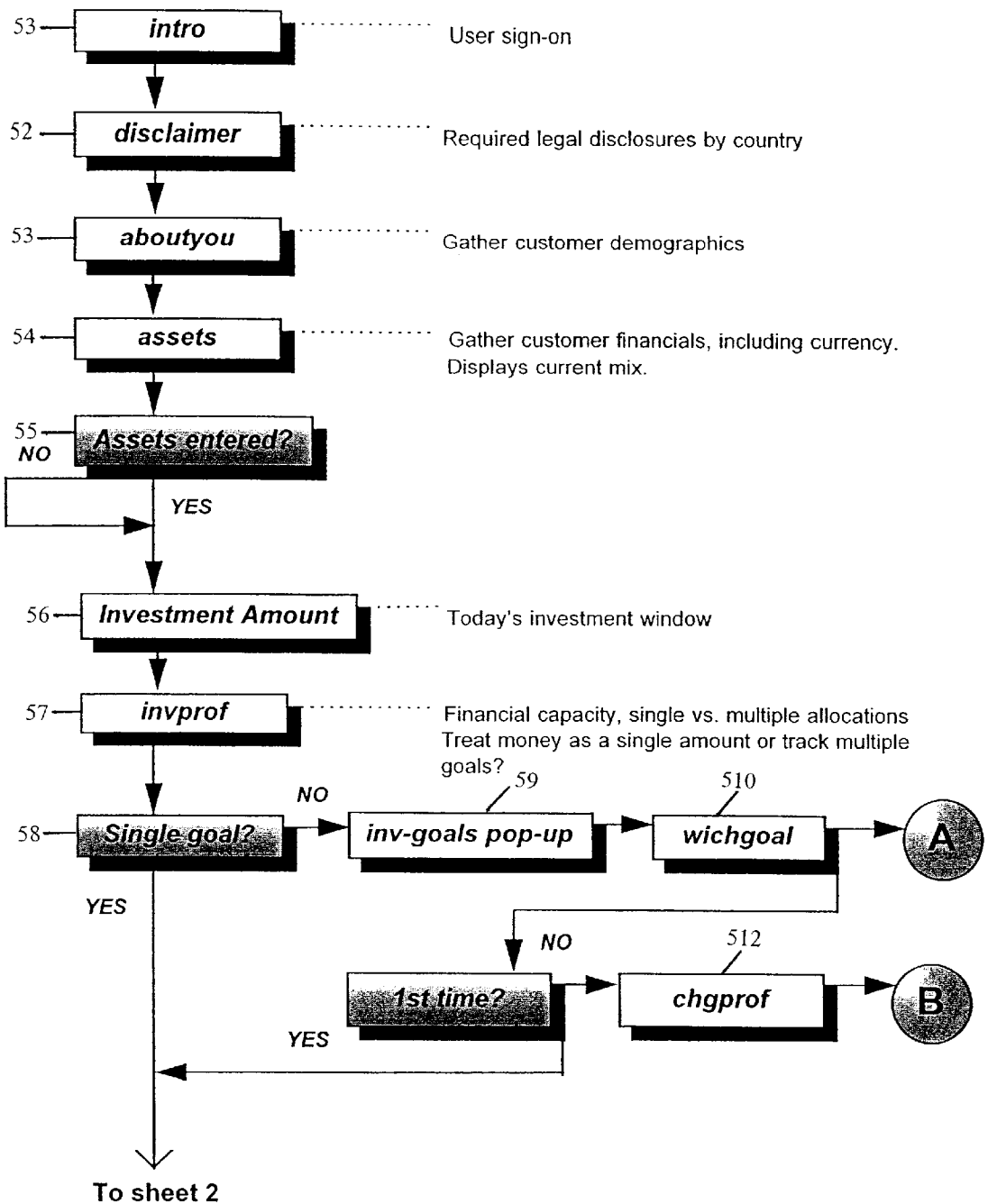
FIGS. 3 through 6 contain a block diagram of the steps of an embodiment of the system of the present invention.

FIGS. 3 through 6 contain flow diagrams of the method and system of an embodiment of the present invention. FIGS. 7 through 38 show the input screens for an embodiment of the present invention, corresponding to many of the steps contained in FIGS. 3 through 6. In FIG. 3, step S1 (intro), the user signs-on to the system. As shown in FIG. 7, this sign-on occurs within a window 1 and includes areas for providing login identification (ID) information 2 and password 3 for the user. The system contains a verification step for failure to enter a valid password, allowing up to three tries.

Figure 8:
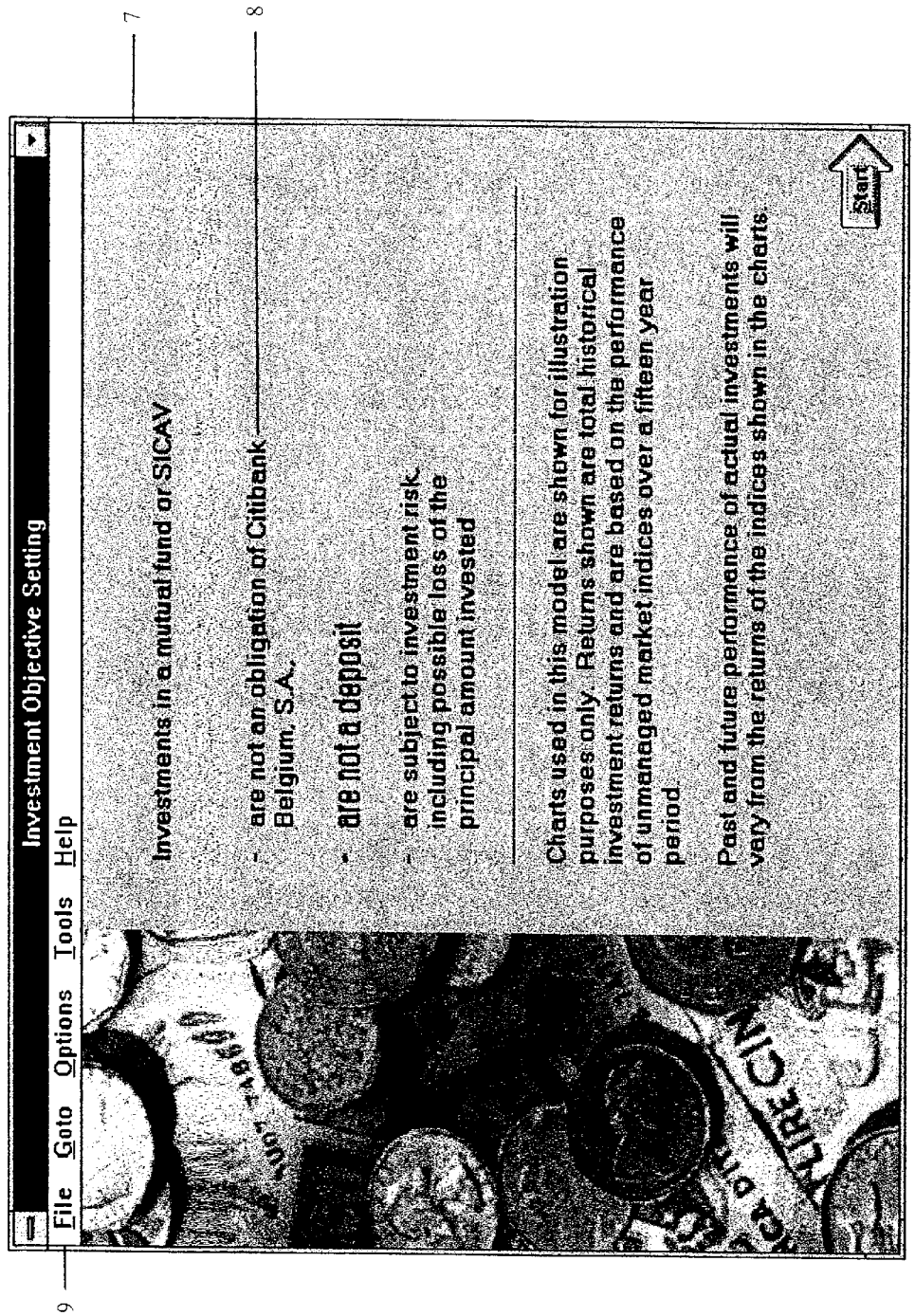
FIG. 8 is a screen containing disclaimer information.

After signing on, step S1 of FIG. 3, the user receives a legal disclaimer, step S2 (disclaimer), as required by the country in which the user is located. FIG. 8 illustrates the window 7 for this disclaimer, and the area 8 in which the disclaimer appears.

At this point in the system, the user may either proceed through the normal steps of operation, or, as shown in FIG. 8, the user may use the pull-down menus 9 at the top of the window 7.

Figure 9:
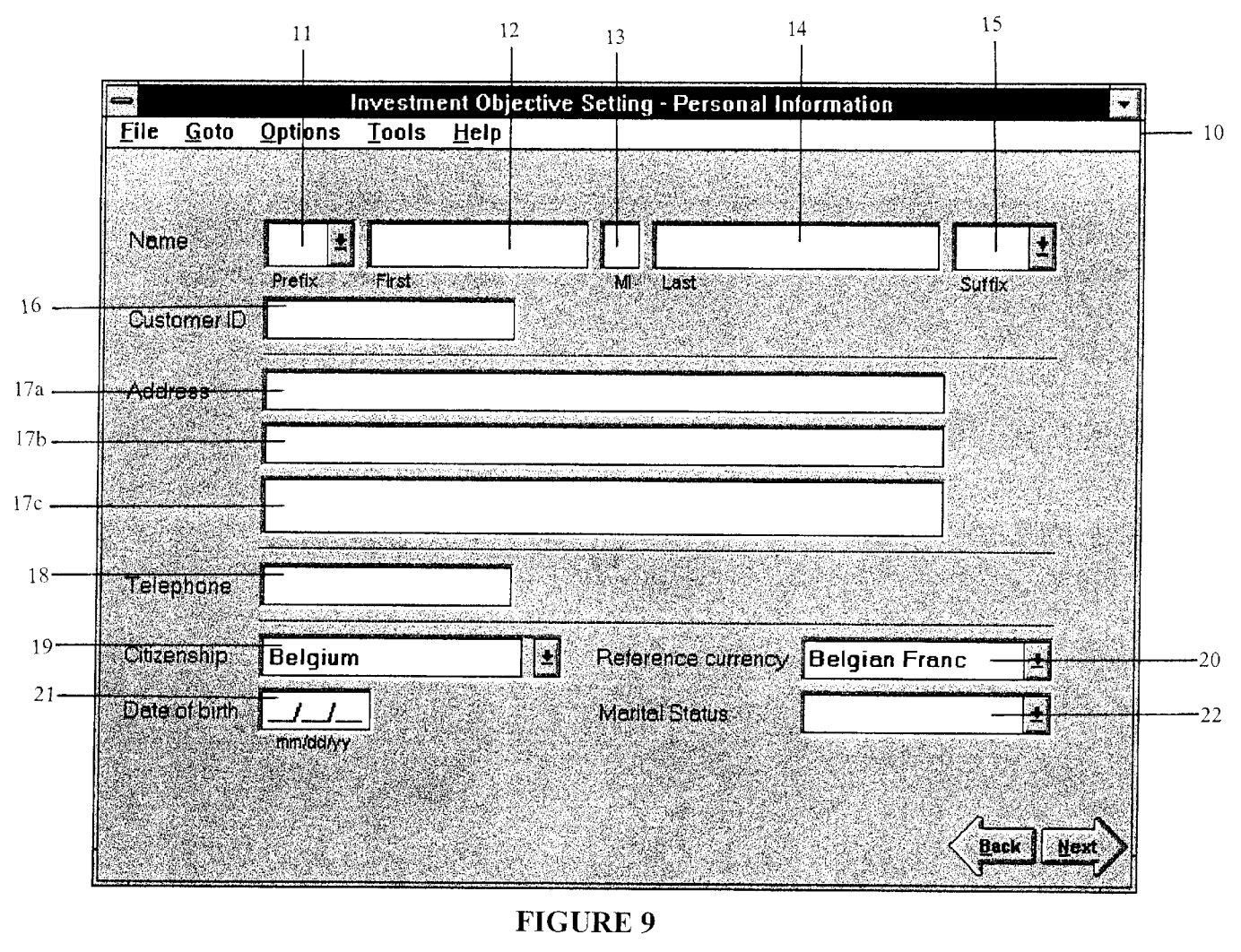
Figure 10:
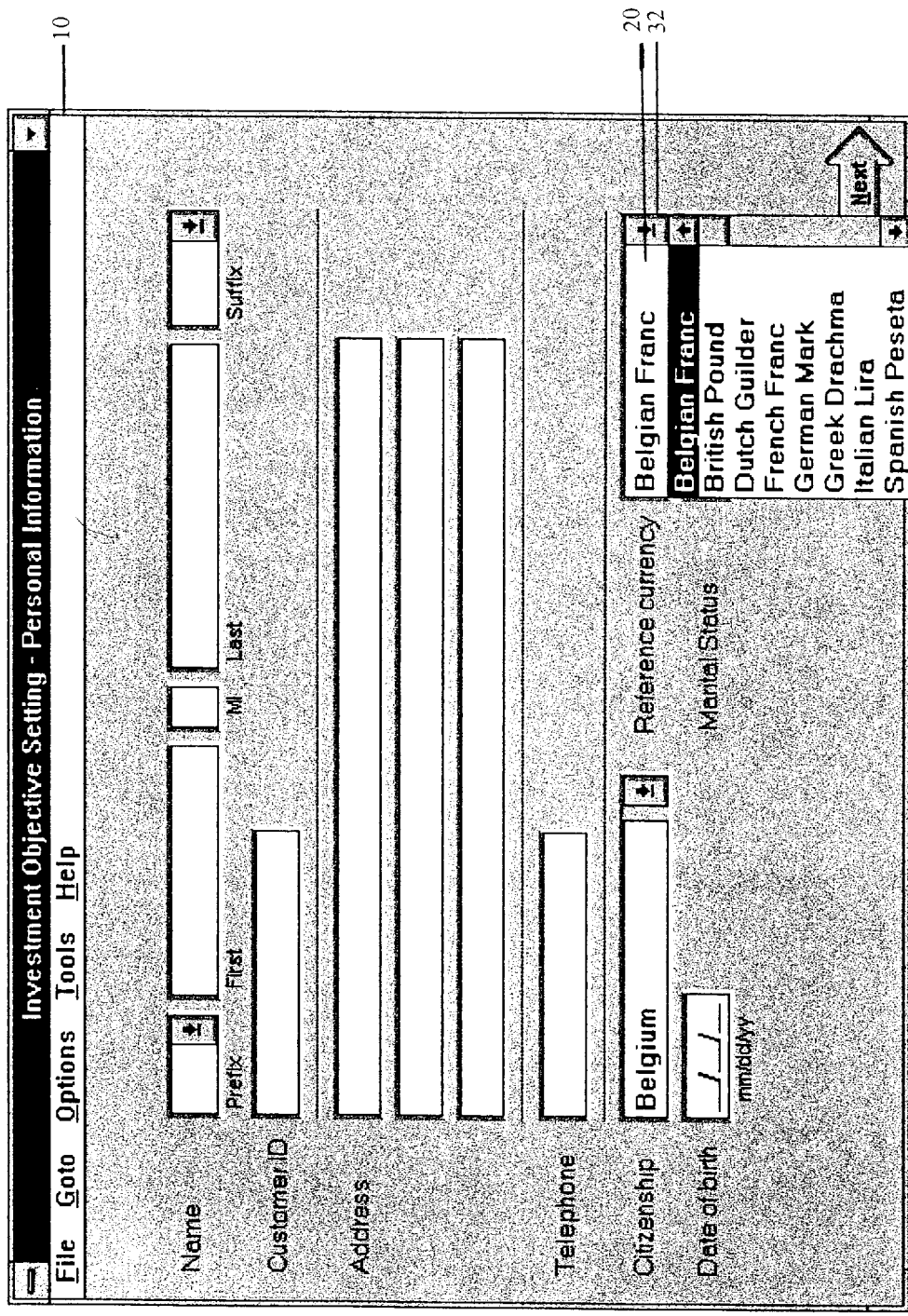
FIG. 10 is a sample screen of additional menu information for user identification.

In step S3 (aboutyou) of FIG. 3, the system prompts the user for identification information. As shown in FIG. 9, this information is presented within a window 10 and includes input areas for name prefix 11, first name 12, middle initial 13, last name 14, and suffix 15. Also included are a customer ID line 16, an address area 17*a*, 17*b*, and 17*c*, a telephone line area for input 18, and areas for citizenship 19, reference currency 20, date of birth 21, and marital status 22. As shown in FIG. 10, for each of the items that includes a menu (designated by an arrow selection; e.g., arrow 32 for reference currency 20), the user may choose an answer from the menu list 33.

Figure 11:
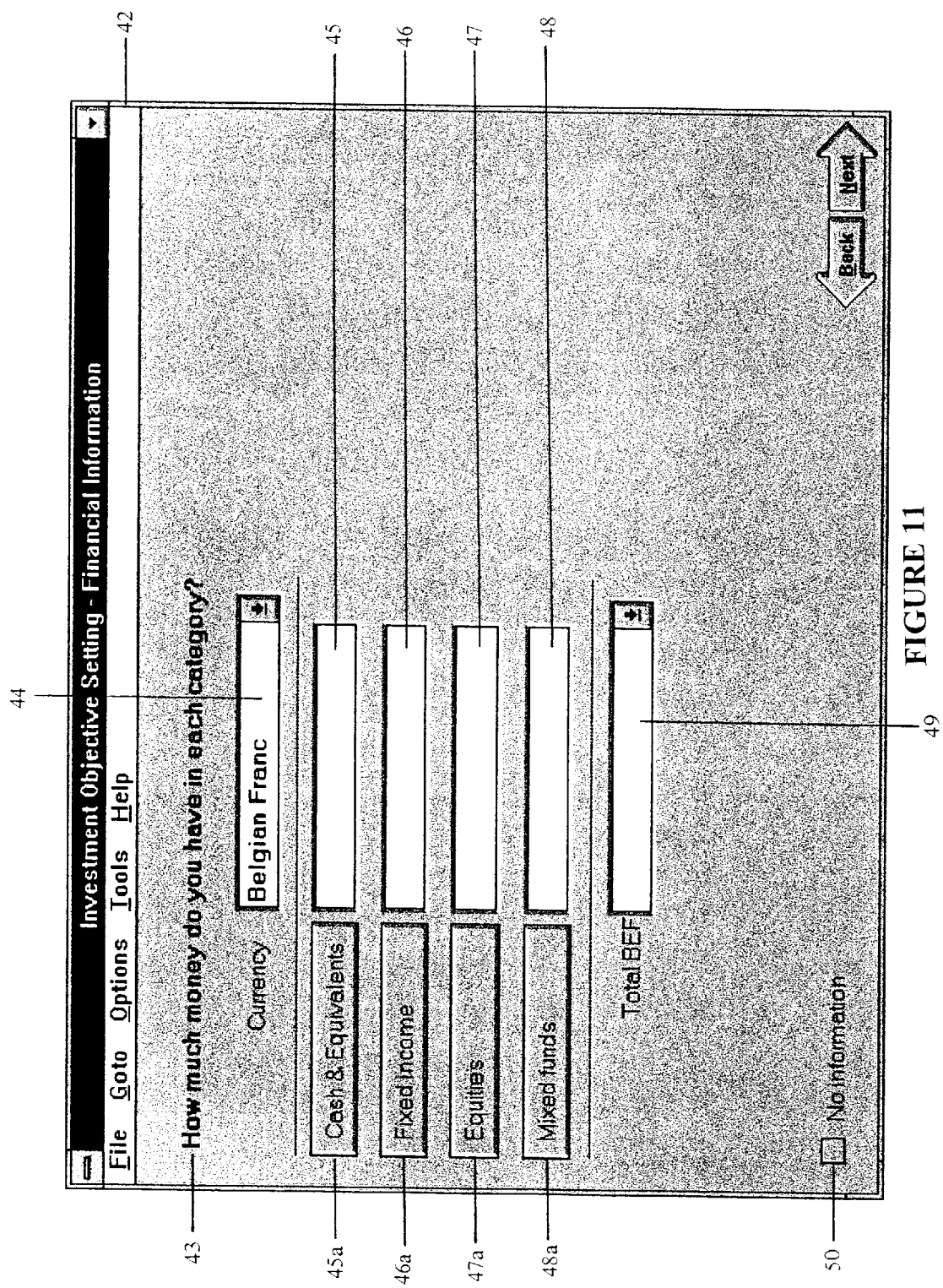
FIG. 11 is a customer asset information screen.

In step S4 (assets) of FIG. 3, the user provides information about the customer's assets. As shown in FIG. 11, a window 42 contains a prompt 43 for monetary asset information. This information includes currency type selection 44, and breakdown information on cash and equivalents 45, fixed income 46, equities 47, mixed funds 48, and total currency equivalent 49. A user may skip this information by selecting the "no information" button 50.

As each of the categories of assets is selected 45a, 46a, 47a, 48a, a pop-up window appears for breakdown information. As shown in FIG. 12, when cash and equivalents 45a is selected, a pop-up window 52 appears, containing the currency selection 53, and input areas for certificates of deposit (CD's) of 1 year or less 54, checking 55, insured money market funds 56, savings 57, United States Treasury bills (US T-Bills) 58, and other 59. A running total 60 of these assets also appears.

As shown in FIG. 13, when fixed income 46a is selected, a pop-up window 62 appears, containing the currency selection 63, and input areas for CD's (over 1 year) 64, bond funds 65, fixed annuities 66, index funds 67, municipal bonds 68, unit investment trusts 69, United States government bonds 70, zero coupon bonds 71, and other 72. A running total 74 of these assets also appears.

Similar to FIGS. 12 and 13, pop-up windows appear for equities 47a and mixed funds 48a.

Figure 14:
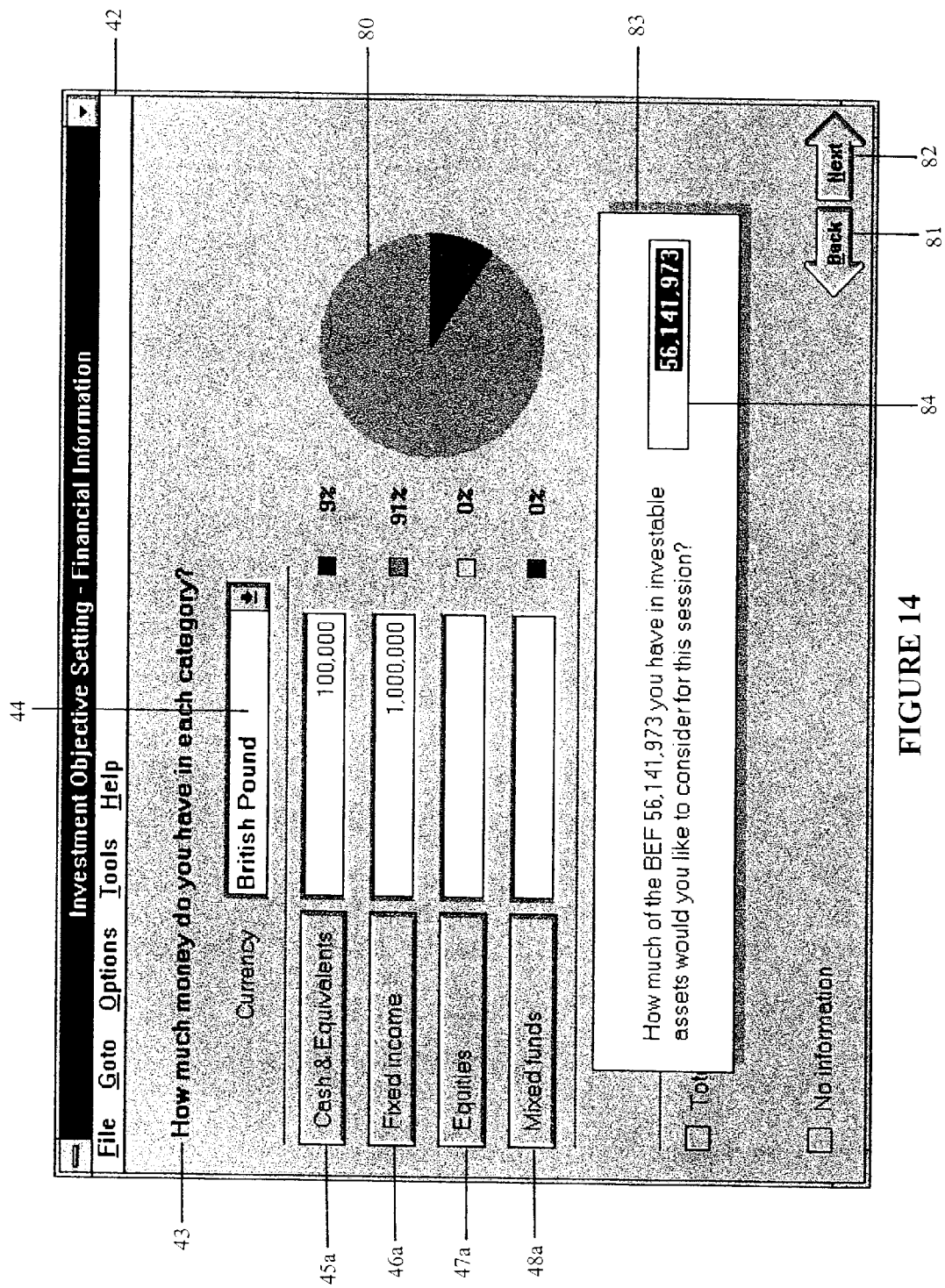
FIG. 14 is a screen of graphical analysis of asset information.

As monetary amounts are entered, as shown in FIG. 14, a color coordinated pie chart 80 appears, with pie elements corresponding to each of the categories and amounts selected. In step S5 (assets entered?) of FIG. 3, the system determines whether asset information has been entered by the user. If asset information has been entered, after the user selects the "next" 82 button or "enter", a pop-up menu 83 appears, and the system requests the user to select an amount to invest 84. The amount to invest decision is step S6 of FIG. 3.

The system then proceeds to the investment profile determination step S7. If no asset information was entered by the user in step S5, the system proceeds directly to the investment profile determination step S7.

In step S7 (invprof) shown in FIG. 15, the user selects from a window 85 a portion of assets for investment 86 and whether to treat the investment as a single allocation 87 or as separate allocations for each goal 88. In step S8 (single goal?), the system determines whether the user selected to treat the investment as a single amount or to track multiple goals. If the user selected to treat the money as a single amount, the system proceeds to step S13 (Income need?) for determination of the customer's income need. If the user chose to track multiple goals, the system proceeds to step S9 (invgoals pop-up) for identification of goals using the goals identification pop-up menu.

Figure 16:
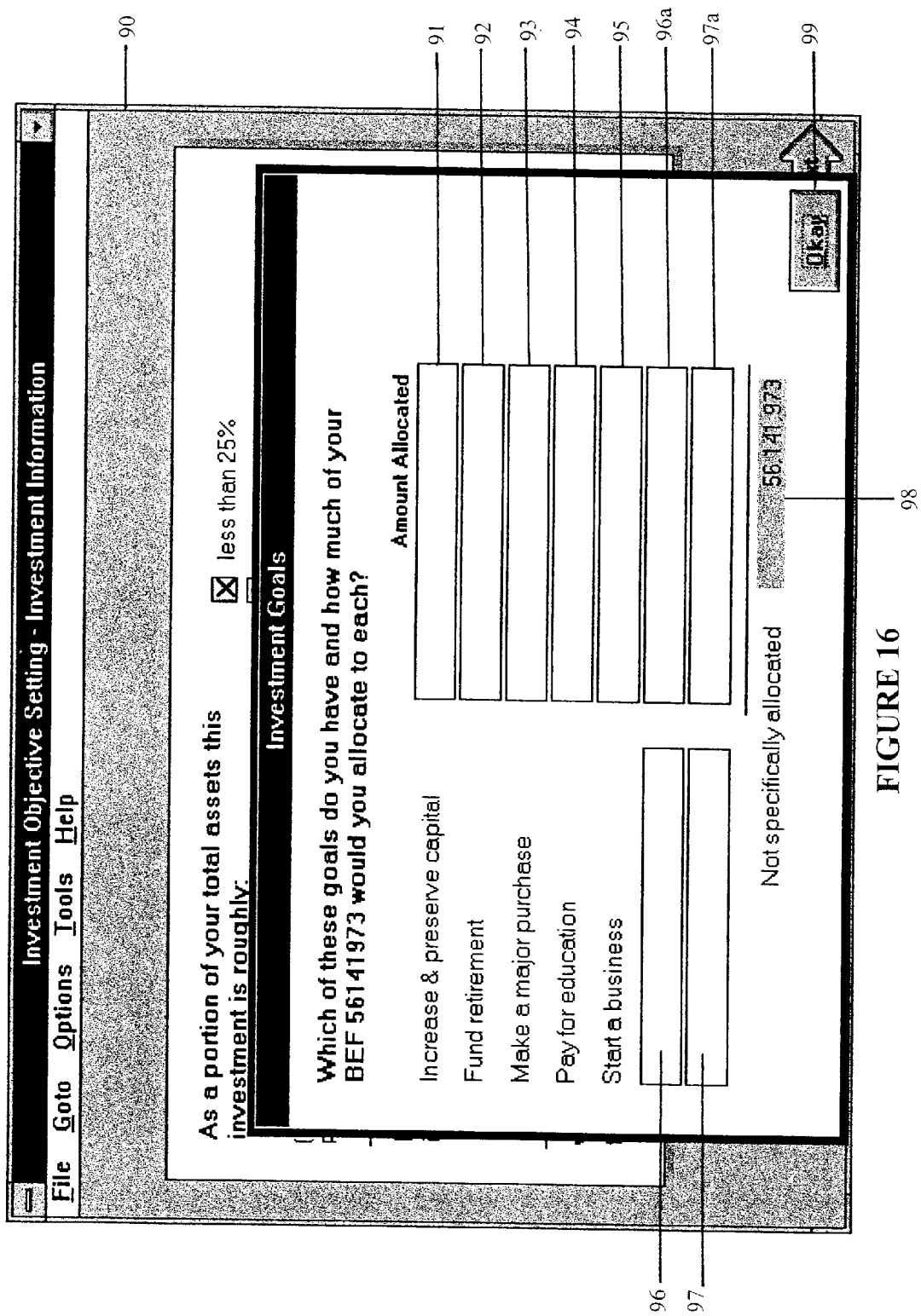
FIG. 16 is a pop-up window for investment goals selection.

As shown in FIG. 16, within step S9, five common goals are automatically included within the investment goals window pop-up 90 that appears if multiple goals are selected: 1) increase and preserve capital 91; 2) fund retirement 92; 3) make a major purchase 93; 4) pay for education 94; and 5) start a business 95. In addition, the customer can specify additional goals as desired 96 and 97, and allocate among these goals 96a and 97a. Any non-allocated funds are automatically tallied as "not specifically allocated" 98. If the user allocates more that the available funds, the system automatically asks the user to adjust the allocation. When the customer is satisfied with the allocation, the user selects the okay button 99 to proceed to step S10.

Figure 17:
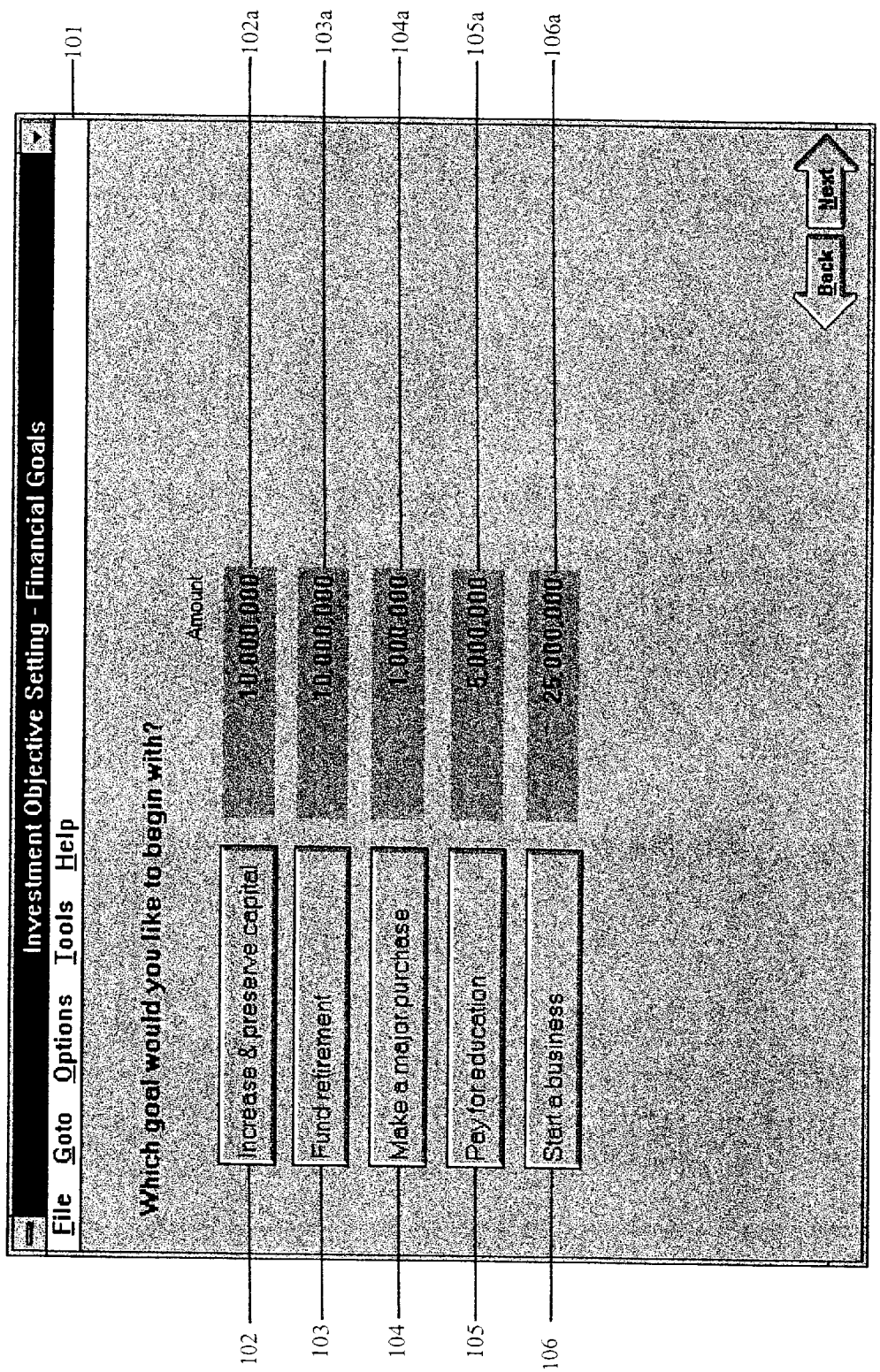
FIG. 17 is a goals menu.

Step S10 (wichgoal) comprises a goals menu. As shown in FIG. 17, the window 101 displays a goals menu that includes each of the goals 102, 103, 104, 105, and 106 for which the customer has indicated an investment amount 102a, 103a, 104a, 105a, and 106a. As shown in FIG. 3, the system then determines S11 (1st time?) if it is the customer's first time through the system. If yes, the system proceeds to step S13. If no, then the system proceeds to step S12 (chgprof) (see below), which allows changing of existing values by proceeding to step S24 (therec).

Figure 18:
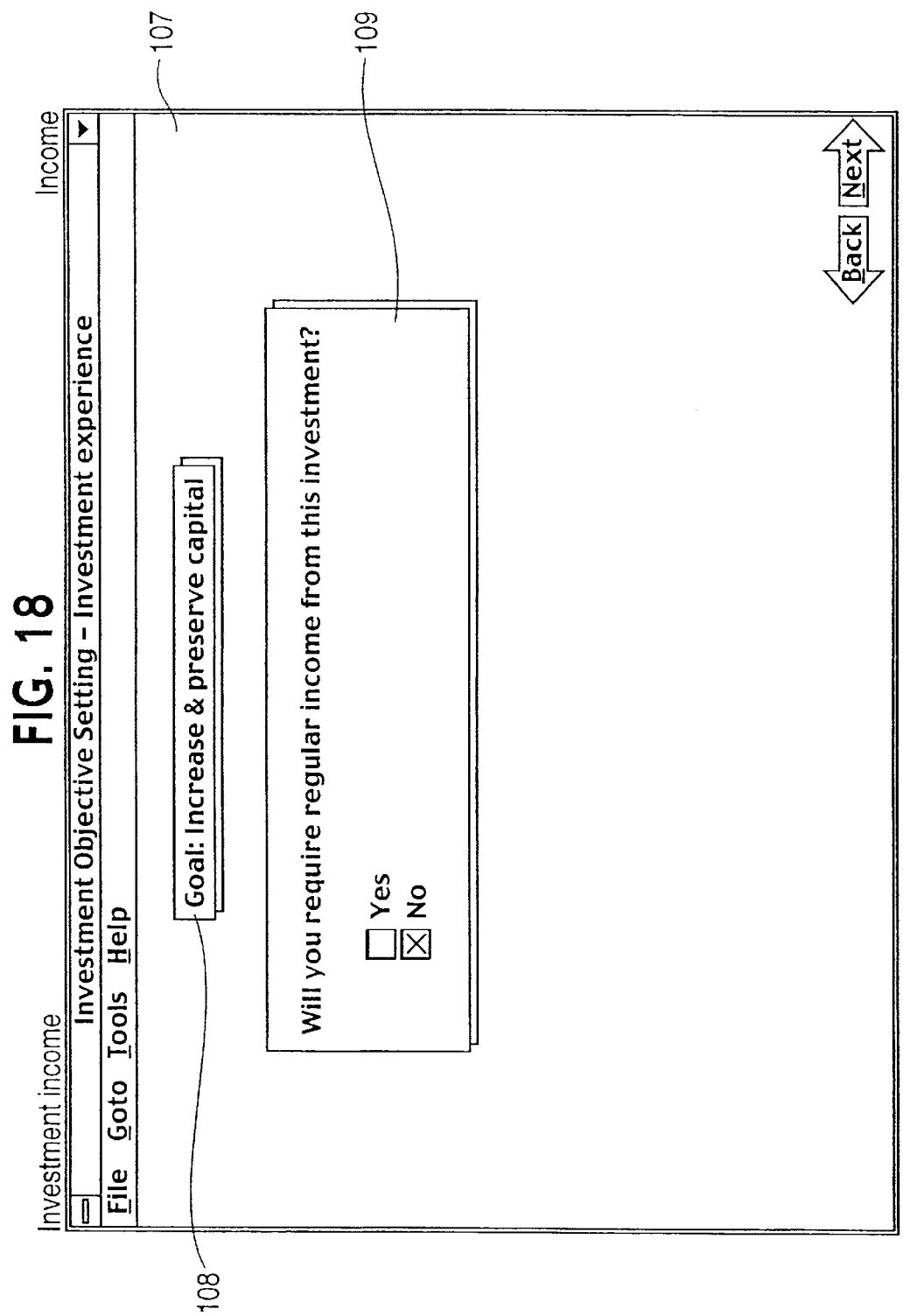
FIG. 18 is an income needs selection screen.

In step S13 (FIG. 4), the user provides information about income needs for the first goal selected. FIG. 18 illustrates the window 107 for determining income need for a particular goal selected 108. The user selects "yes" or "no" for the requirement of regular income using the pop-up box 109 for the goal 108. If the user selects no, the system proceeds to step S17 for determination of investment time horizon.

Figure 19:
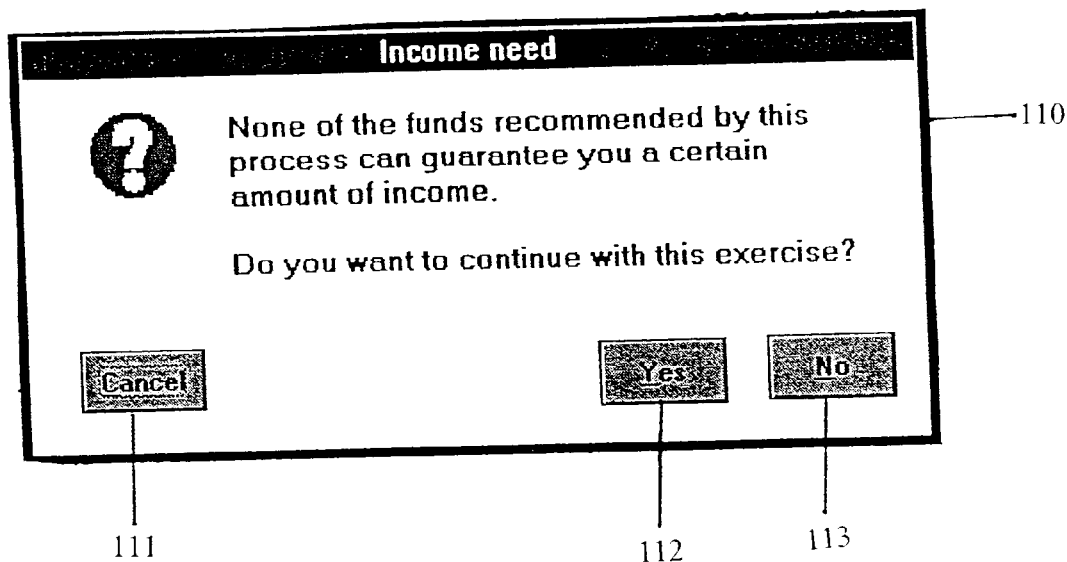
FIG. 19 is a pop-up window for user approval for proceeding in the absence of meeting income need selected.

If the user selects yes in step S13, the system proceeds to step S14 (income need warning). As shown in FIG. 19, a pop-up window 110 appears, which also contains step S15 (Continue?). The user can select to cancel the selection 111; the user can select "yes" 112 to continue with the exercise despite the fact that the system cannot guarantee the income requested, in which case the system proceeds to step S17 (timis); or the user can select "no" 113, after which the system proceeds to step S16 (Exit processing), which ends the session.

Figure 21:
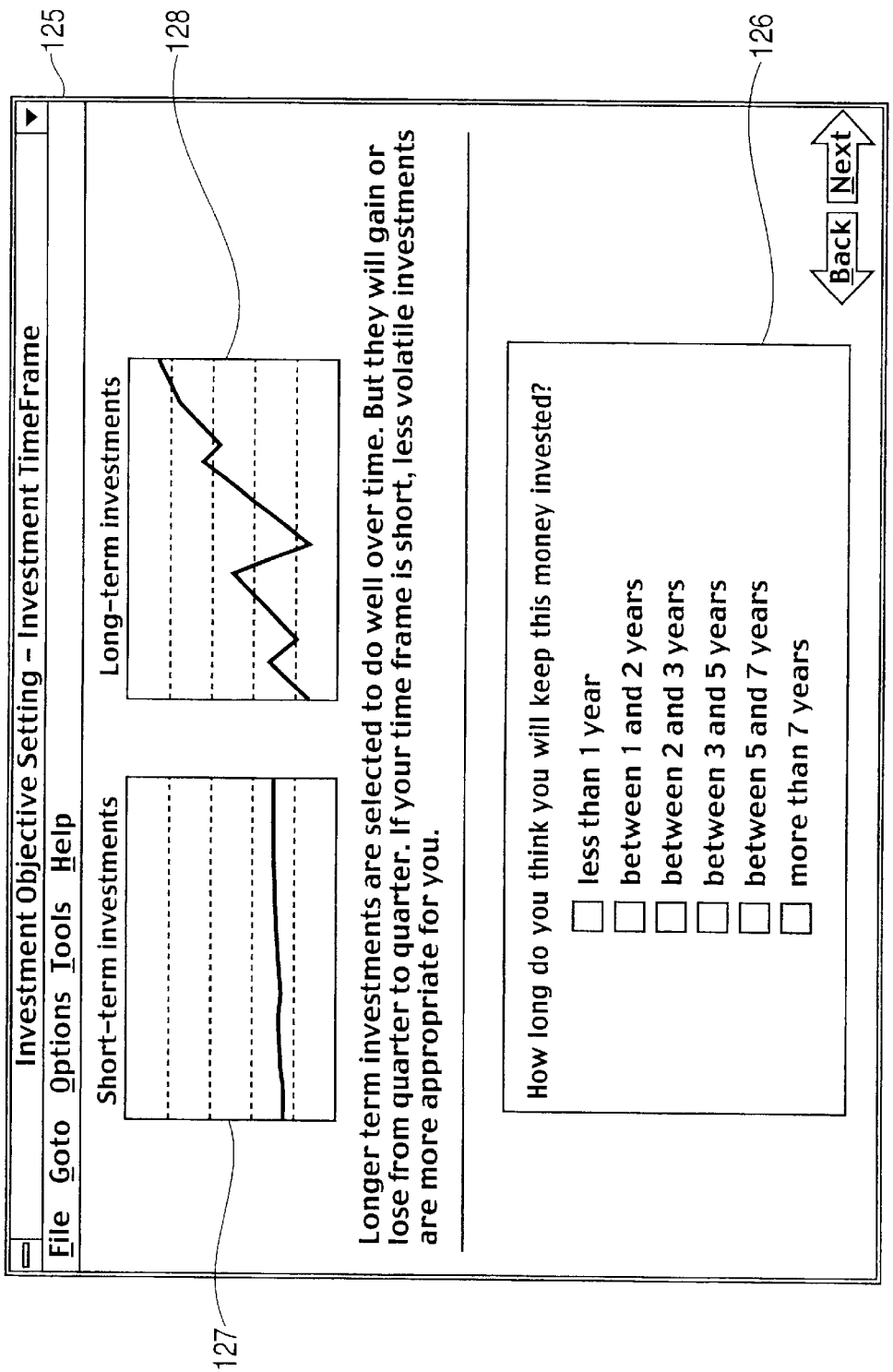
FIG. 21 is an illustrative investment timeframe window.

In step S15, the system queries the user regarding the customer's preferred time frame for investment for the goal selected. FIG. 21 illustrates the investment timeframe window 125 for the goal selected. The user may choose an investment timeframe 126 for a variety of time periods, such as from less than 1 year up to more than 7 years. Illustrative investment profiles 127 and 128 are shown at the top of the window. After the user has selected a timeframe, the system proceeds to step S18 (relation).

Figure 22:
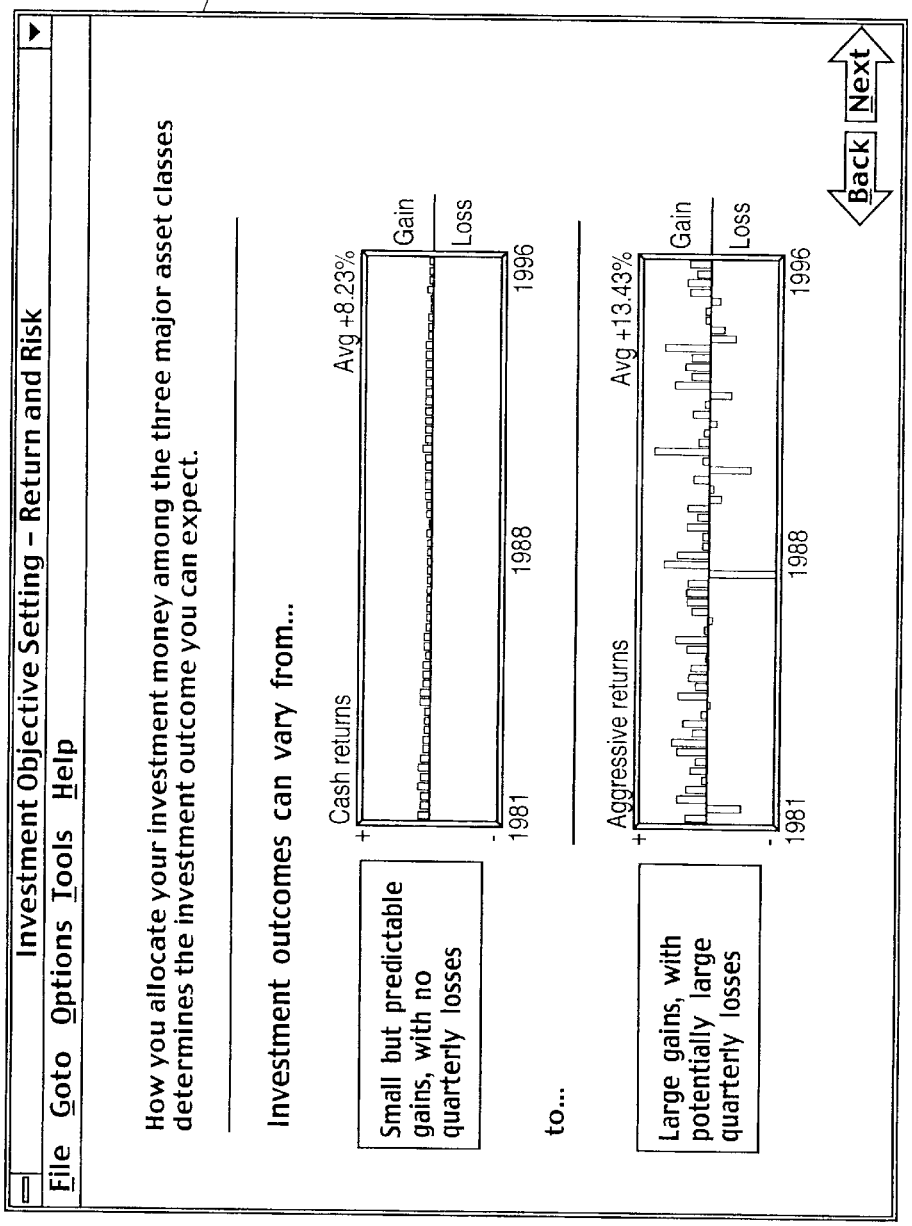
FIG. 22 is a screen of investment outcome information.

In step S18 the system provides information on the risk/return relationship. FIG. 22 contains the window 130 showing investment outcome information. For example, the system may illustrate graphically the difference between income from small but predictable quarterly gains versus income from large quarterly gains with potentially large quarterly losses. The system then proceeds to step S19 (risret).

Figure 23:
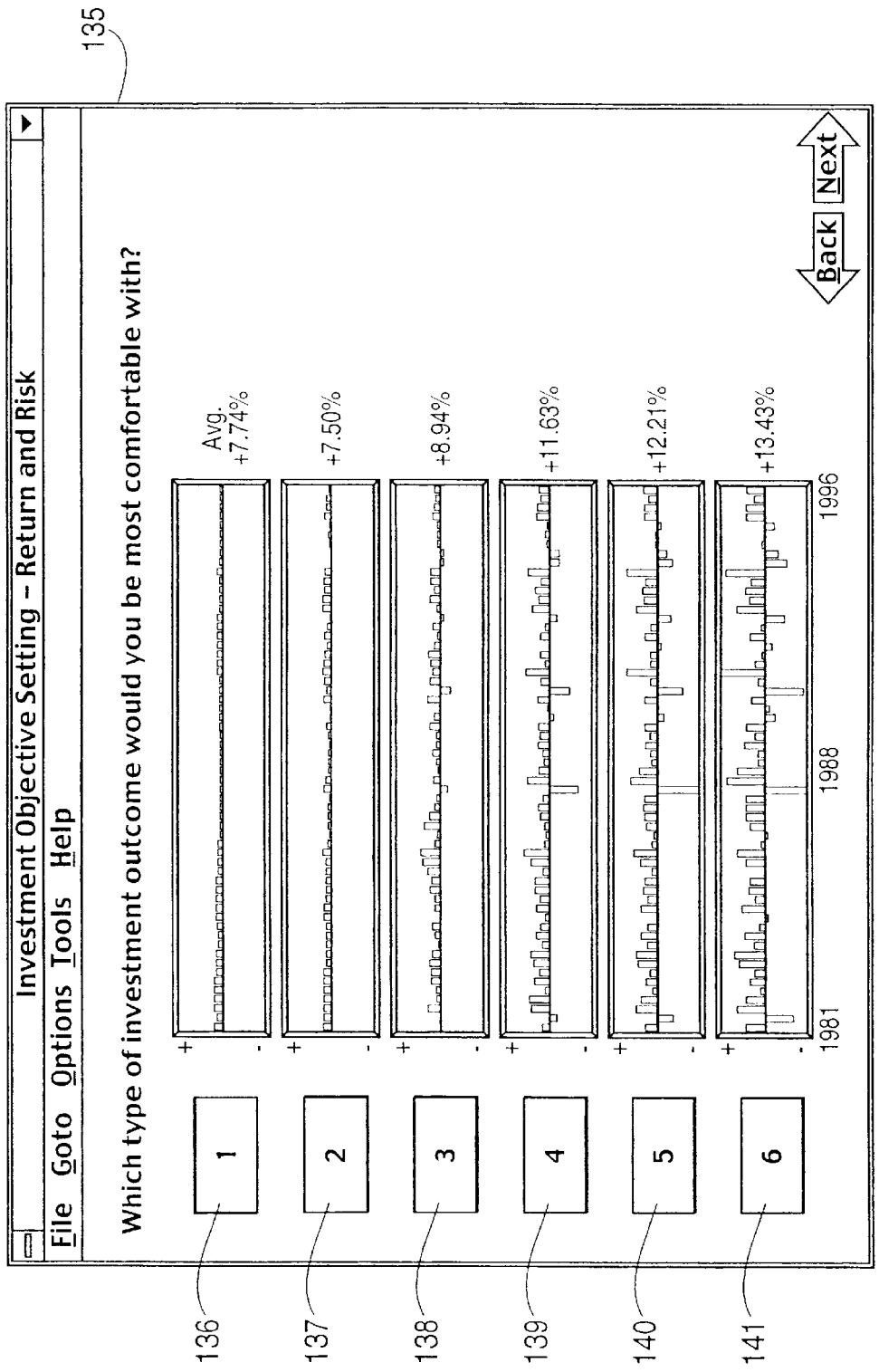
FIG. 23 is a screen illustrating investment outcomes from which a user may select.
Figure 24:
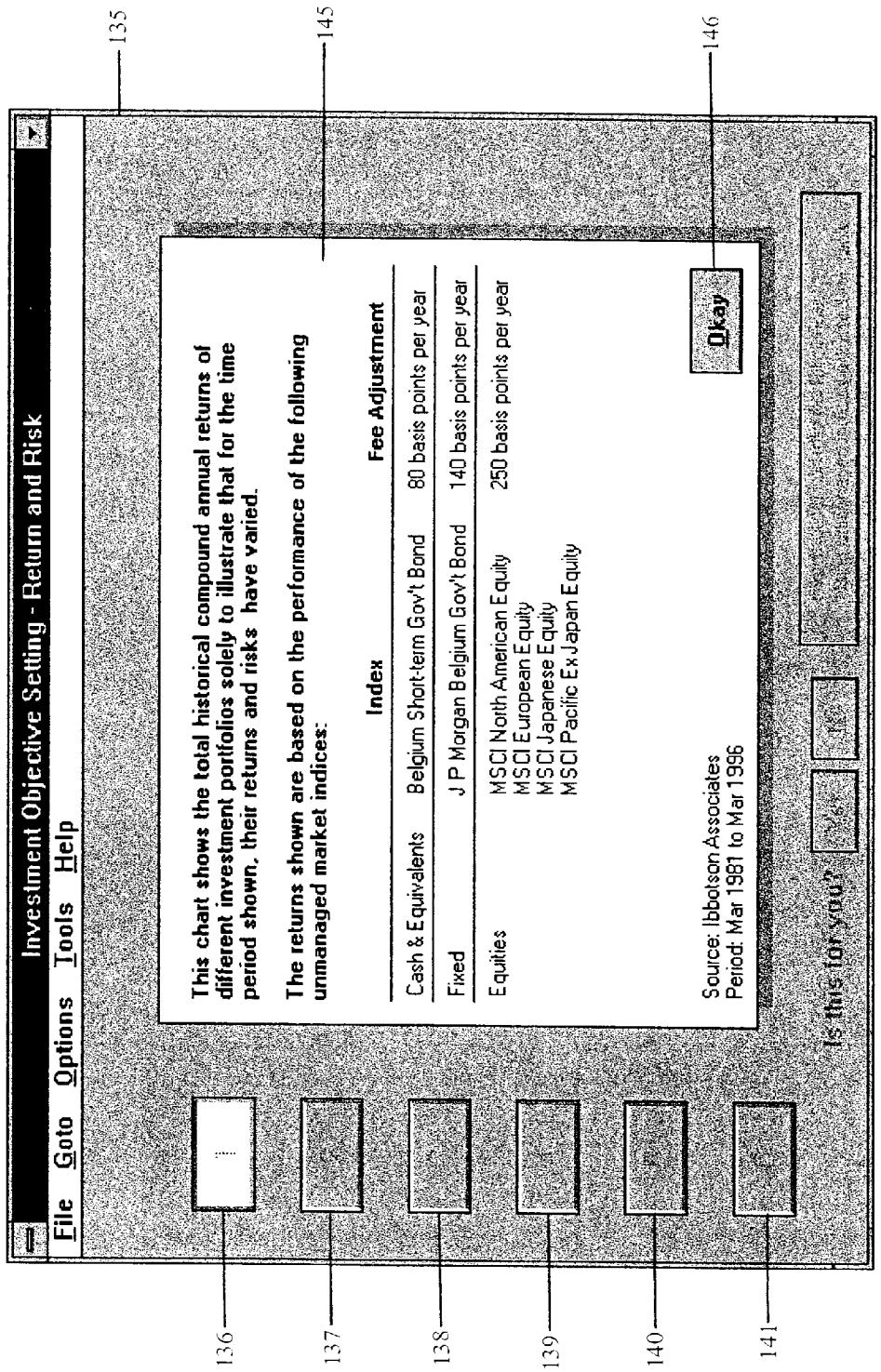
FIG. 24 is an example pop-up window on information for a selected risk/return relationship.
Figure 25:
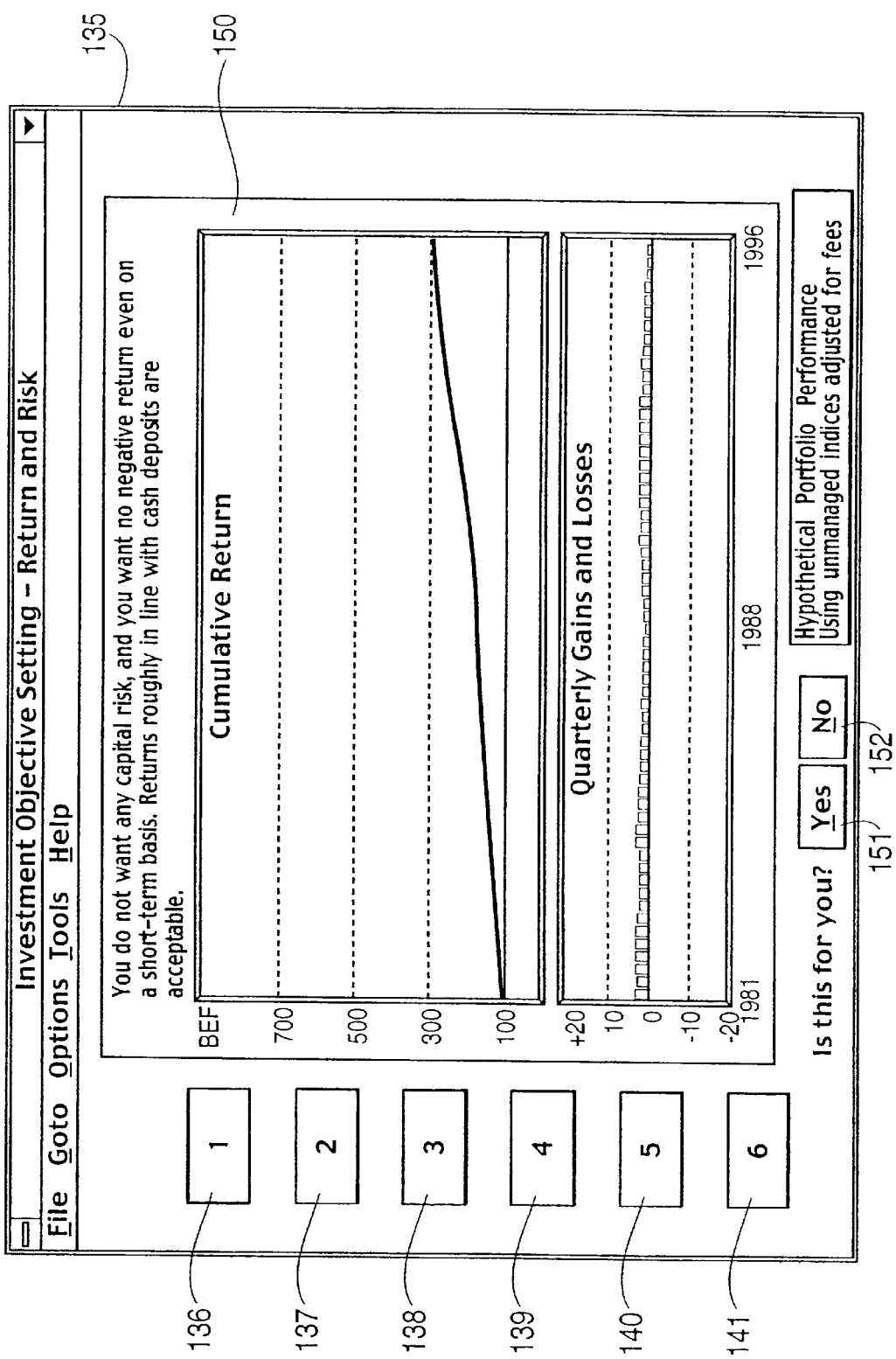
FIG. 25 is a pop-up window of detailed performance information for a selected risk/return option.

In step S19, the customer reviews each potential risk/returns and selects a risk/return relationship that best describes the customer. FIG. 23 illustrates the investment outcomes from which the user may select. A window 135 contains six options for investment outcome, with graphical profiles of each. The number of options for investment income may vary, for example, by country. By selecting a button 136, 137, 138, 139, 140, or 141 corresponding to one of the outcomes, the customer may learn more about that outcome. For example, as shown in FIG. 24, selecting the first button, 136, produces first a pop-up window 145 providing information relating to that option. After the user selects the "okay" button 146, a second pop-up window 150 (shown in FIG. 25) appears, which contains detailed performance information for the option selected. In step S20 (FIG. 4), the user may select this option by choosing the "yes" button 151, or continue reviewing options by selecting the "no" button 152.

Figure 4:
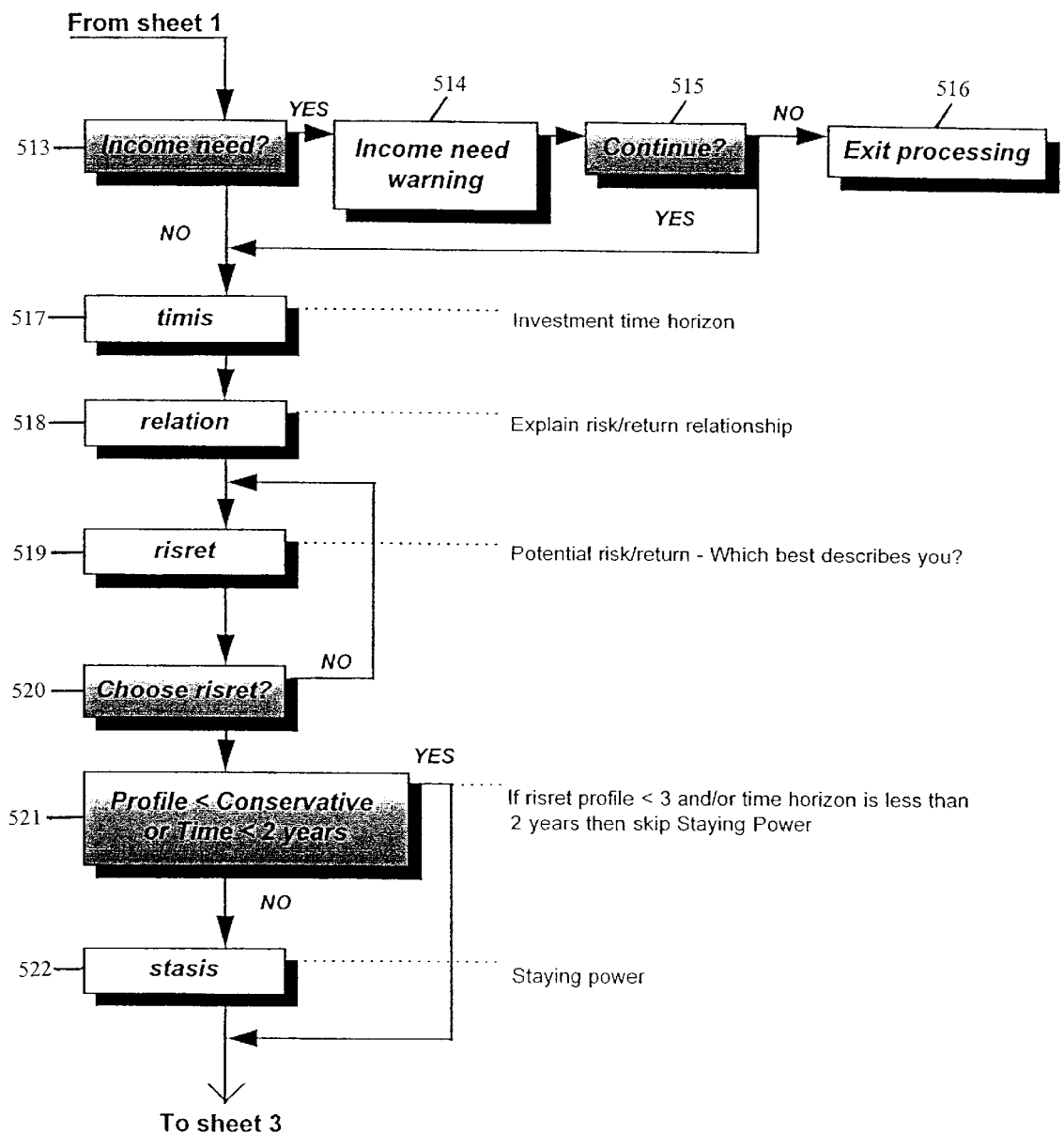

After a risk/return relationship has been selected, the system proceeds to step S21 (Profile<Conservative or Time<2 years), shown in FIG. 4, in which the system queries the user with regard to whether the customer prefers a less conservative profile (cash return or preserves capital) or a time frame of less than 2 years. If the user has selected these options, then the system proceeds to step S23 (expis), shown in FIG. 5. If the customer does not prefer one of these options, the system proceeds to step S22 (stasis).

Figure 26:
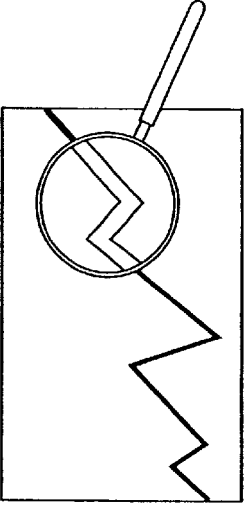
FIG. 26 is a screen illustrating investment staying power.

In step S22, the user is queried regarding staying power. Staying power is the user's ability to maintain an investment even in the face of an undesirable result in the short-term with the hope that the long-term investment will become satisfactory. FIG. 26 illustrates the investment staying power window 155. The user selects among several possible options 156 to the query: "Will you stay with an investment that goes down?" After the user selects a staying power response, the system proceeds to step S23.

Figure 27:
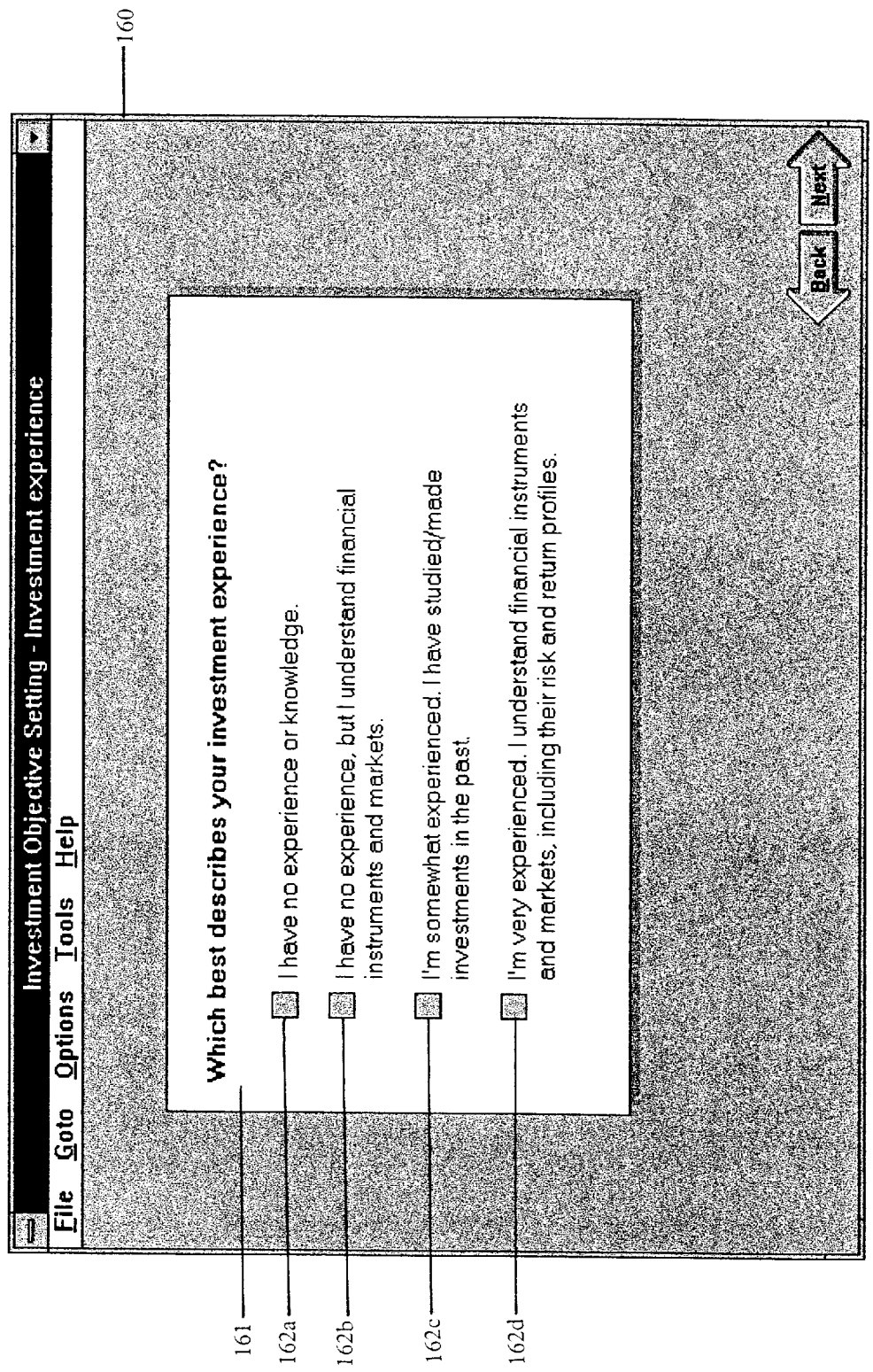
FIG. 27 is a screen containing query information about user investment experience and results.

In step S23, the system queries the user regarding investment experience and results. As shown in FIG. 27, the window 160 contains a query 161 asking the user about investment experience. As shown, the initial question 161 asks the user to characterize the customer's experience corresponding to one of four levels 162a, 162b, 162c, or 162d.

Figure 5:
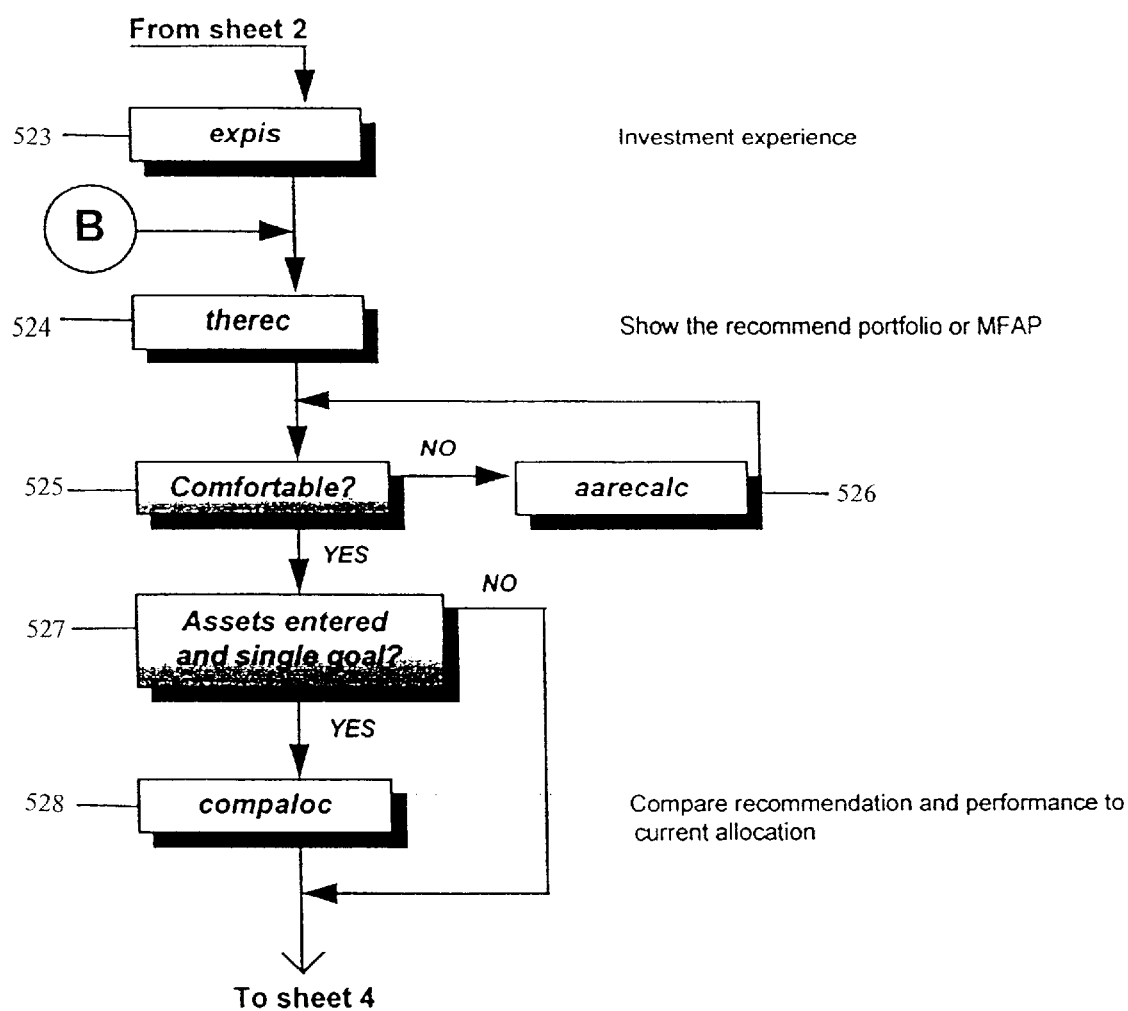
Figure 28:
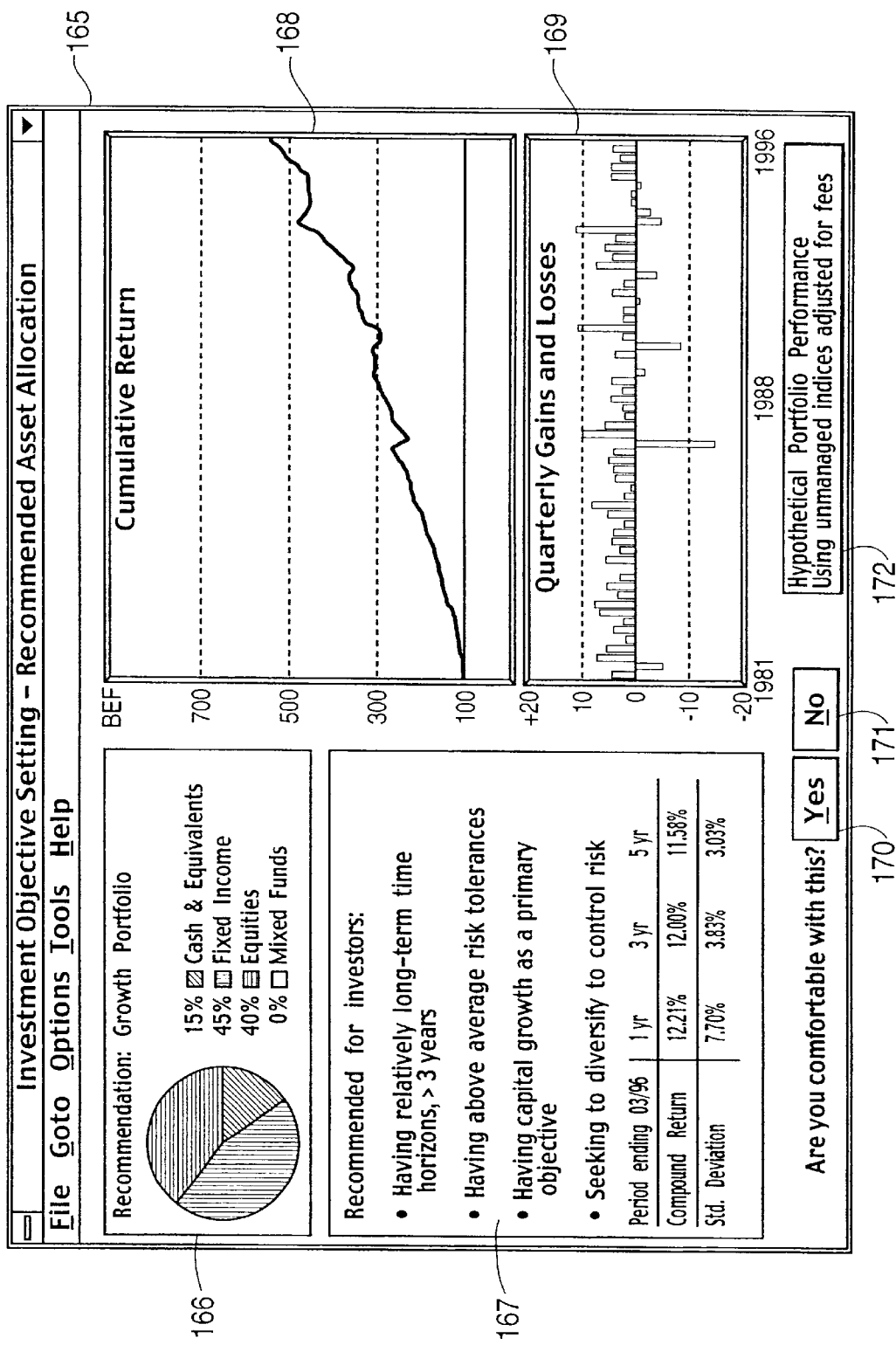
FIG. 28 is a screen presenting a recommended investment portfolio.
Figure 29:
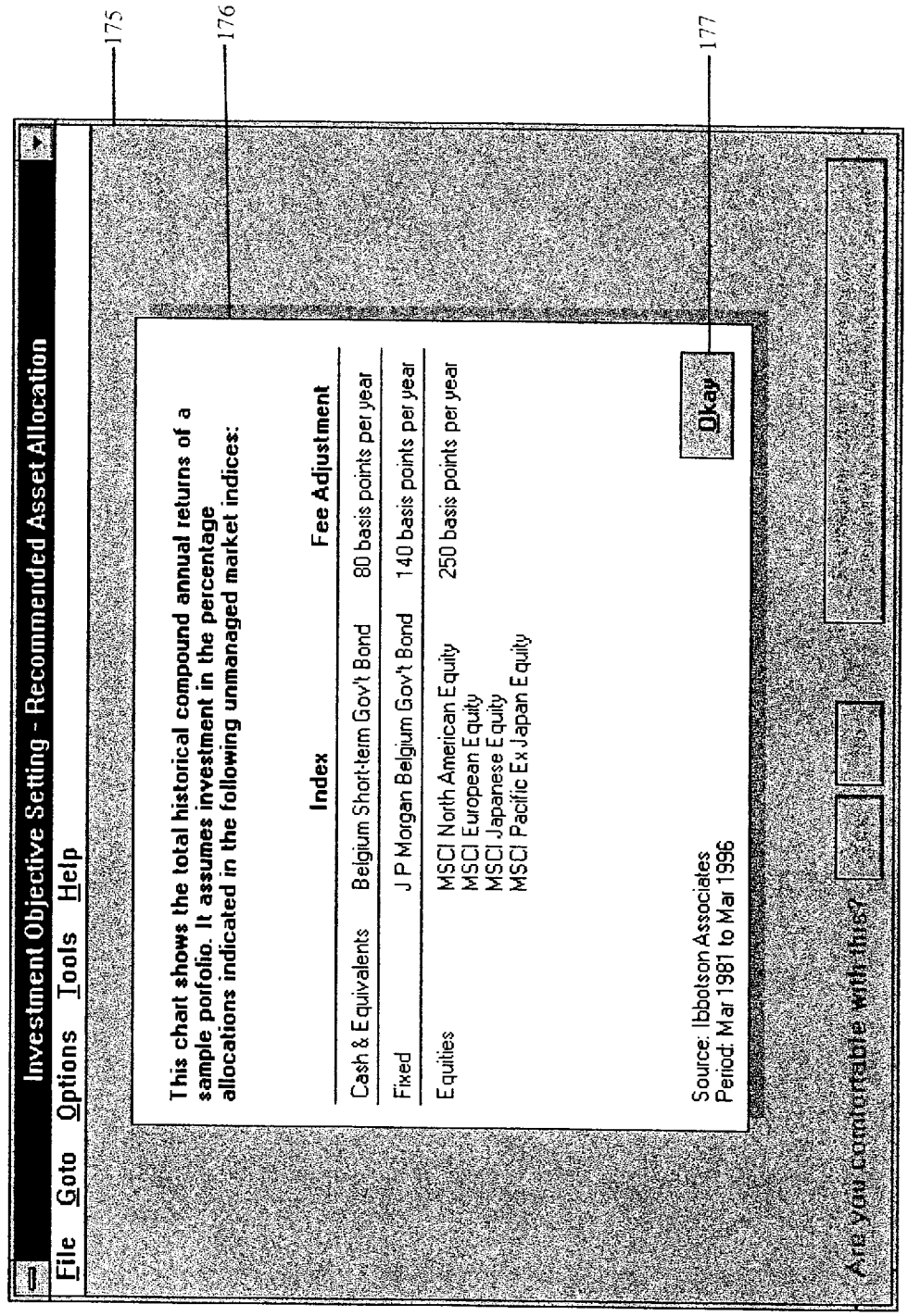
FIG. 29 is a screen of a sample investment portfolio.

The system then proceeds to step S24 (therec), in which the system recommends a portfolio based on a system of matching the user's preferences with predetermined portfolio options, as described further below, and then to step S25, shown in FIG. 5, in which the system asks the user whether the customer is comfortable with the portfolio recommended. As shown in FIG. 28, the recommended portfolio is presented in a window 165. It includes a recommended distribution of investment 166, brief summary of investor preference and performance of investment 167, graphical presentation of cumulative return 168, and graphical presentation of quarterly gains and losses 169. In step S25 (Comfortable?), the user then indicates whether the customer is comfortable 170 or not comfortable 171 with the portfolio recommended. The user may also select the button 172 that presents a hypothetical portfolio performance. As shown in FIG. 29, selecting this button produces a window 175 containing a sample portfolio 176.

Figure 30:
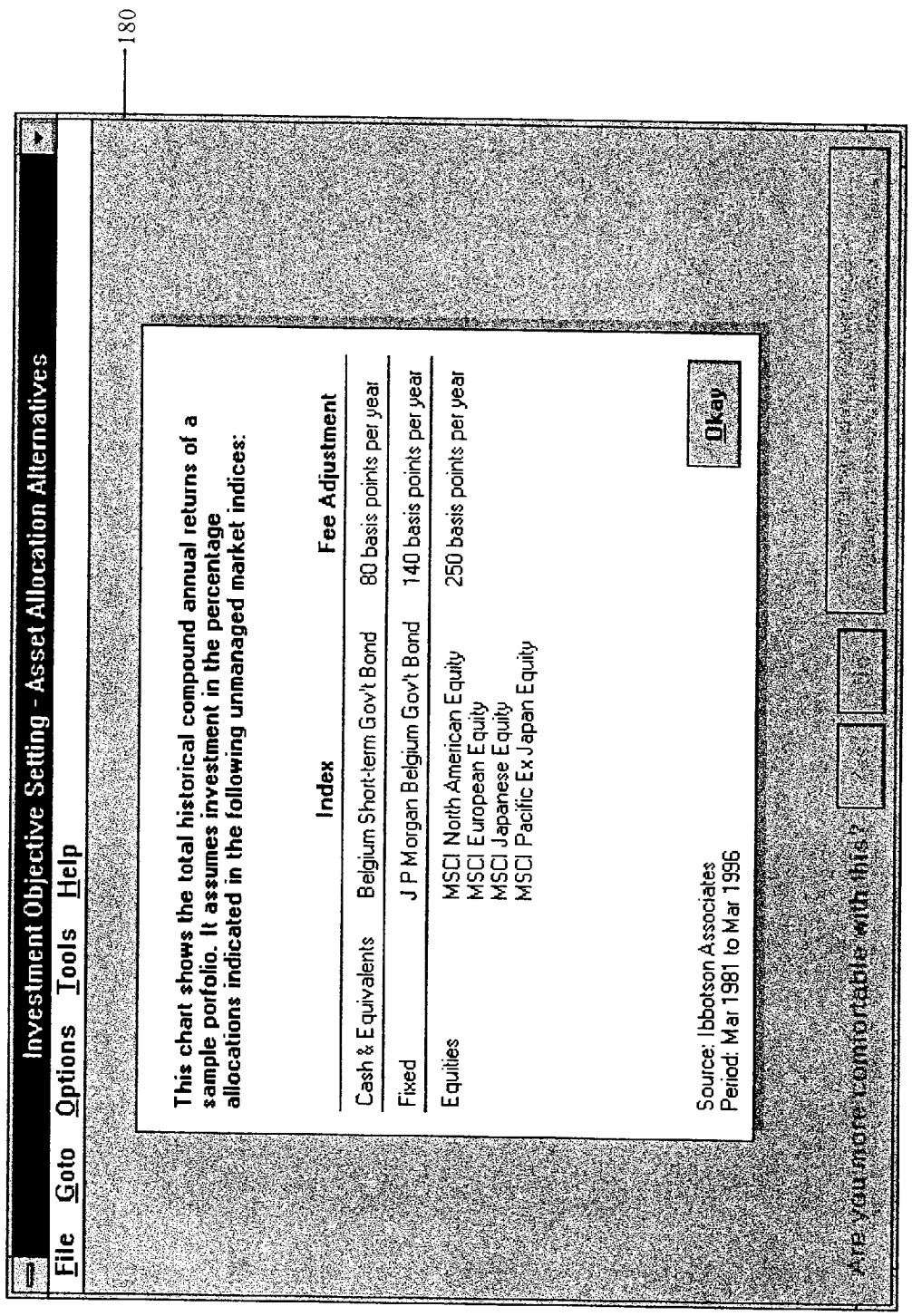
FIG. 30 is a screen containing an alternative asset allocation.

If the user selects "no" 171 to the question, the system proceeds to step S26 (aarecalc), which presents another asset allocation alternative, similar to that presented in FIG. 30; see window 180.

Figure 31:
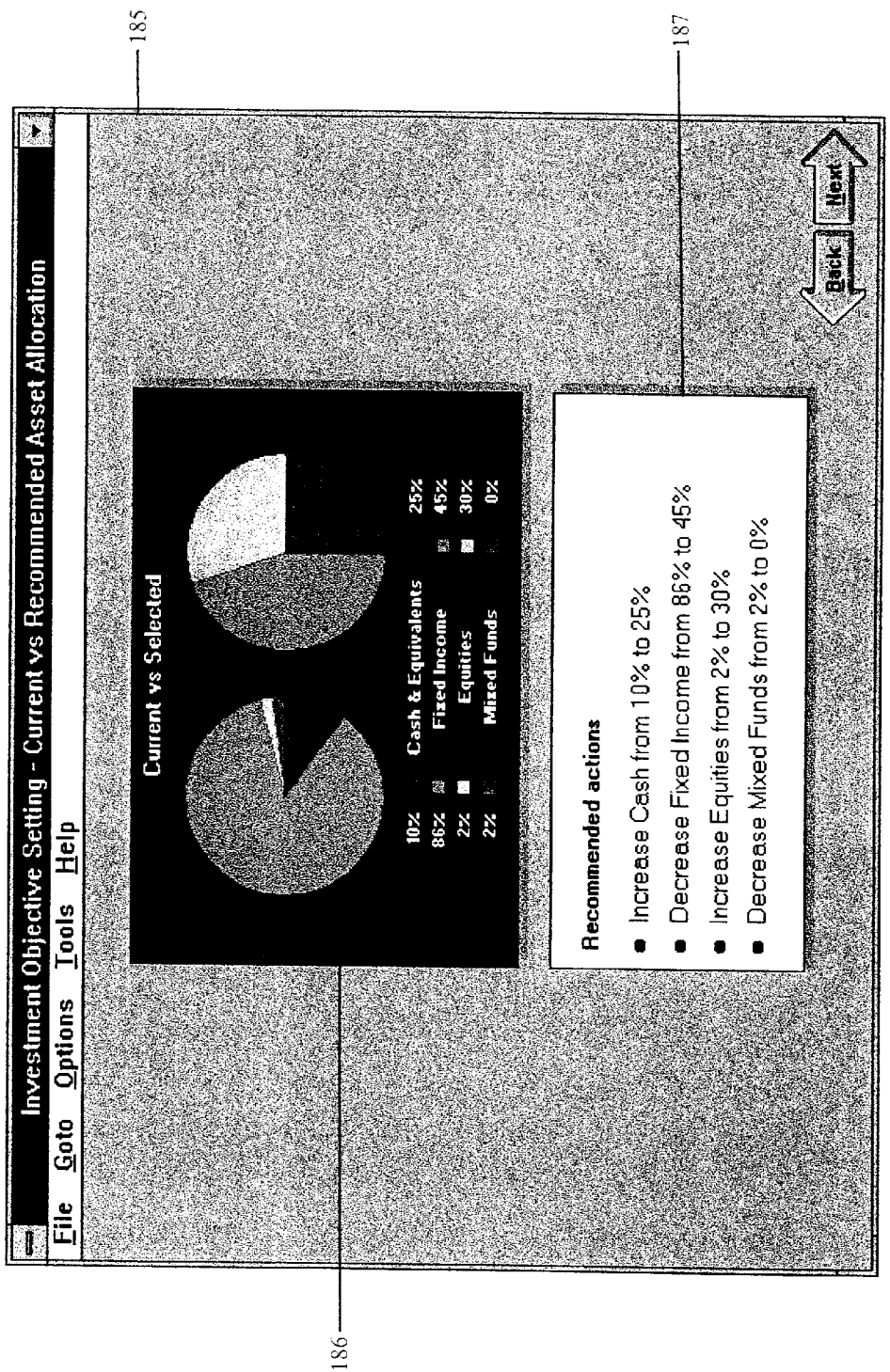
FIG. 31 is a screen comparing current versus recommended asset allocations.

Once the user selects "yes" (e.g., 170 of FIG. 28) to the allocation alternative comfort question, the system proceeds to step S27 (Assets entered and single goal?) for asset analysis. If the user has entered assets and a single goal, the system proceeds to step S28 (compaloc) to compare current customer assets to the recommended allocation. As shown in FIG. 31, a window 185 presents chart comparisons of current versus recommended asset allocation 186 and a summary of recommended changes 187. The system then proceeds to step S29 (Riskclass? Portfolio 1,2,3), shown in FIG. 6. If the user has not entered this information or has not selected a single goal (in step S27), the system proceeds directly to step S29.

In step S29, if the recommended allocation is a Risk Class fund or CitiSelect, then the system proceeds to step S30 (goldprod). If not, the system proceeds to step S35 (Risk class product descriptions).

Figure 32:
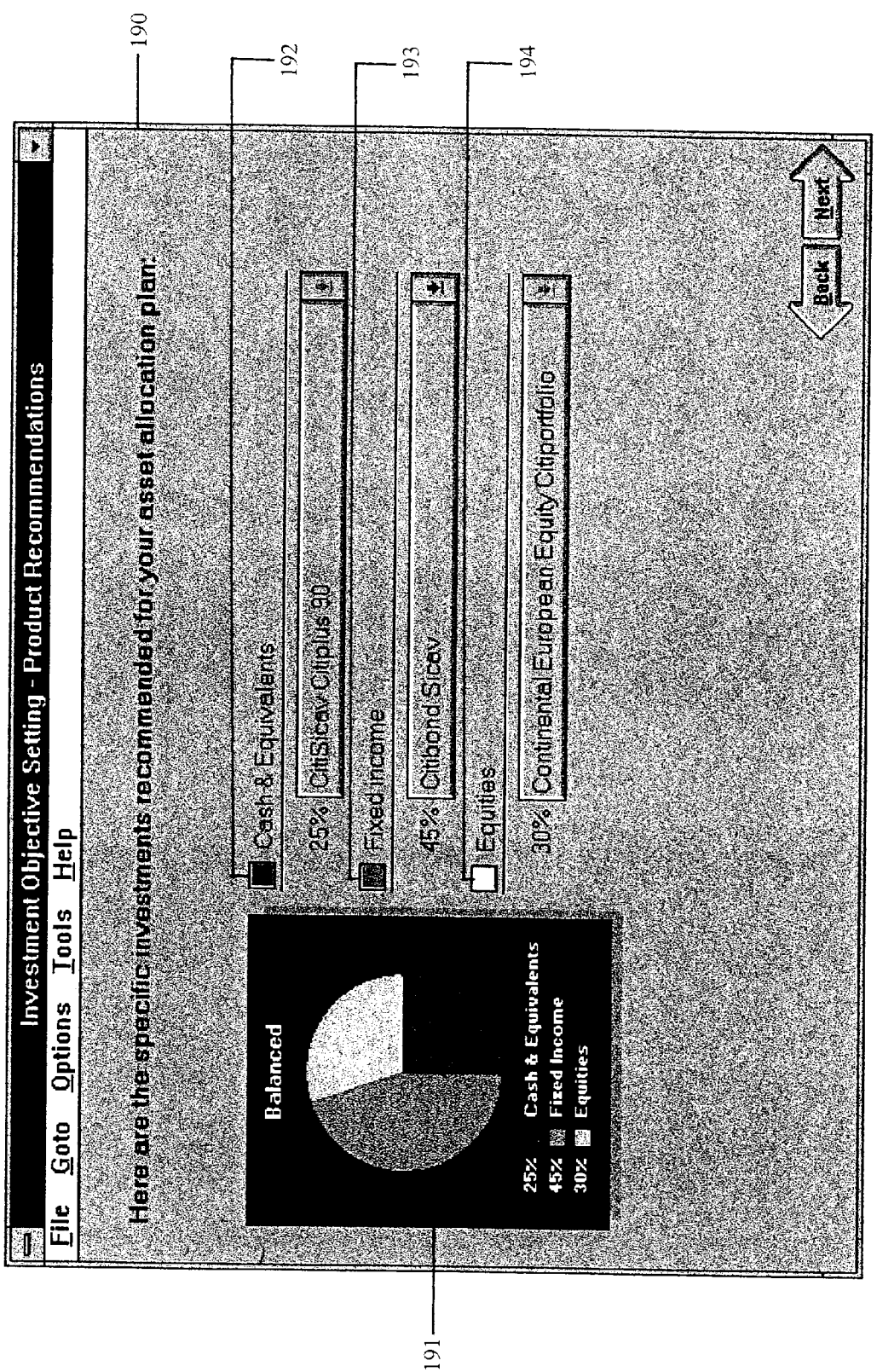
FIG. 32 is a screen of information on specific investments recommended for a selected allocation plan.

In step S30, as shown in FIG. 32, the system provides the user with a window 190 of information on specific investments recommended for the selected allocation plan. Information provided includes a chart of the allocation plan 191 and a breakdown 192, 193, 194 in types specific investments to meet the plan. Selecting any one of the types of specific investments (e.g., fixed income 193), produces a pop-up menu of options. For example, selecting the arrow for fixed income 193, produces the pop-up window 195, shown in FIG. 33.

Figure 33:
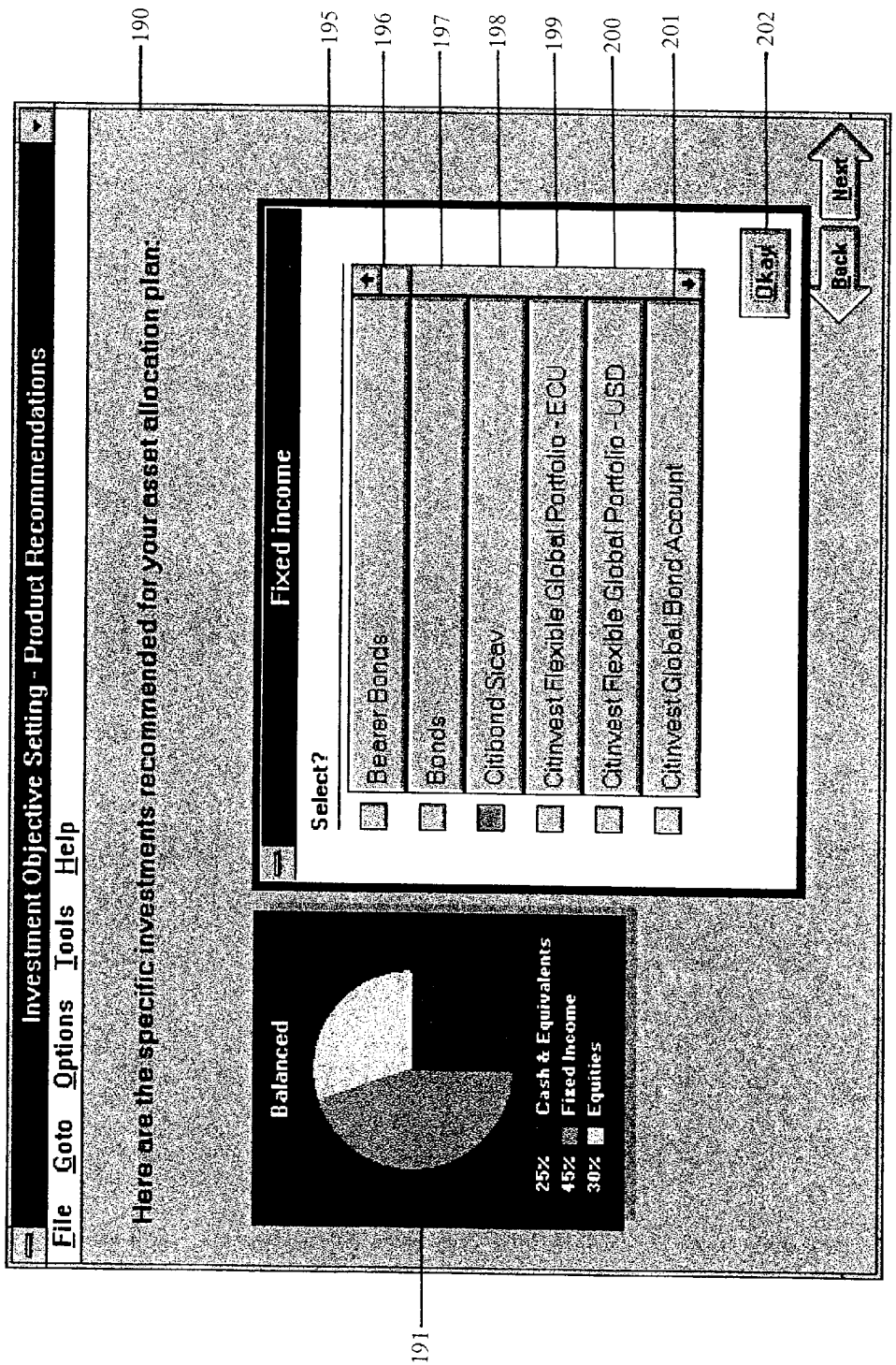
FIG. 33 is a screen of menu choices for fixed income types.

The user may select one of the choices 196–201, shown in FIG. 33, and then the "Okay" button 202, to learn more information about a particular type of item. For example, selecting Citinvest Flexible Global Portfolio—ECU 199 in the example shown, produces another pop-up window 205, shown in FIG. 34. The user can read additional pop-up information by selecting tabs for Description 206 (step S31 (funddes) of FIG. 6), Investment Objectives 207 (step S32 (fundobj) of FIG. 6), Performance 208 (step S33 (fundper) of FIG. 6), and Details 209 (step S34 (details) of FIG. 6). After the user has completed review of this information, the user may select "Okay" 210 to return to the main window 190 (return to step S30). After the user has completed the steps, the system then proceeds to step S37 (More goals?).

Figure 6:
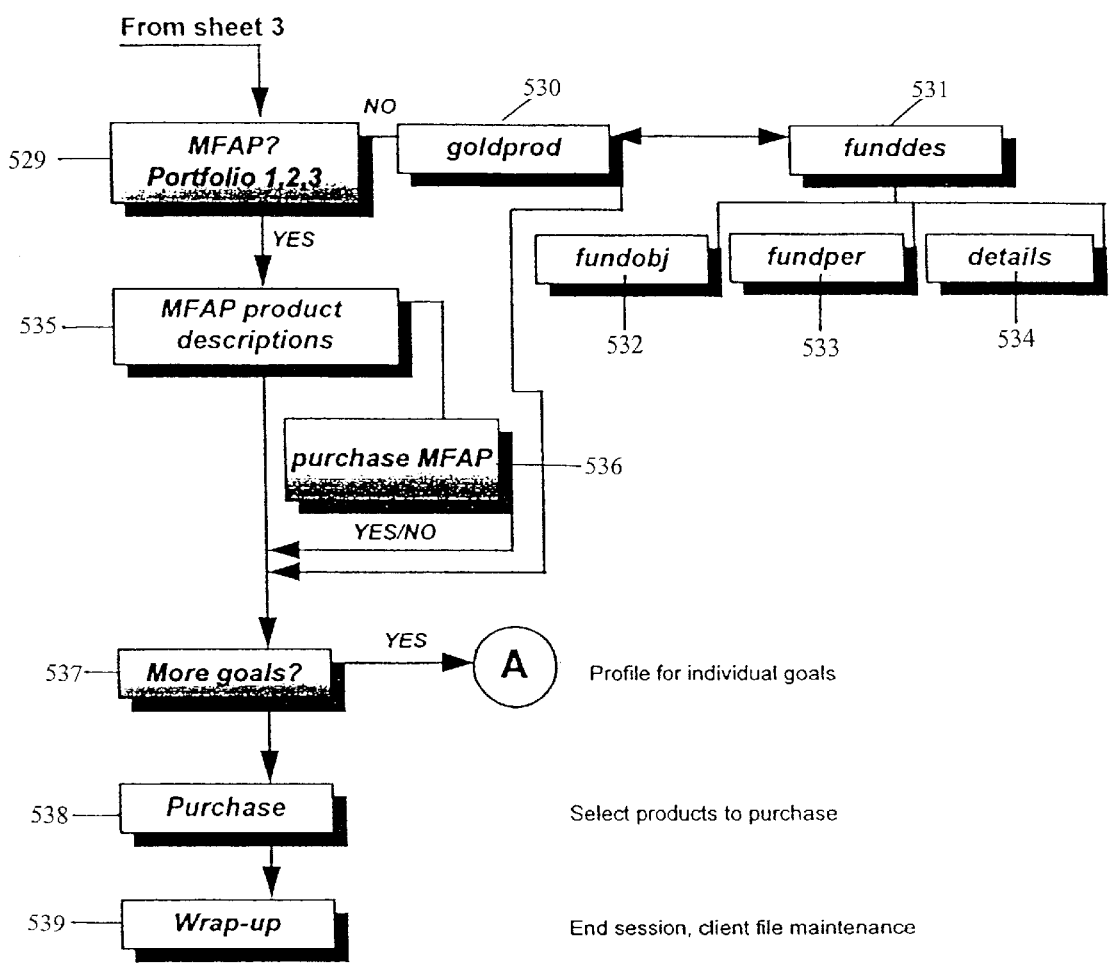
Figure 7:
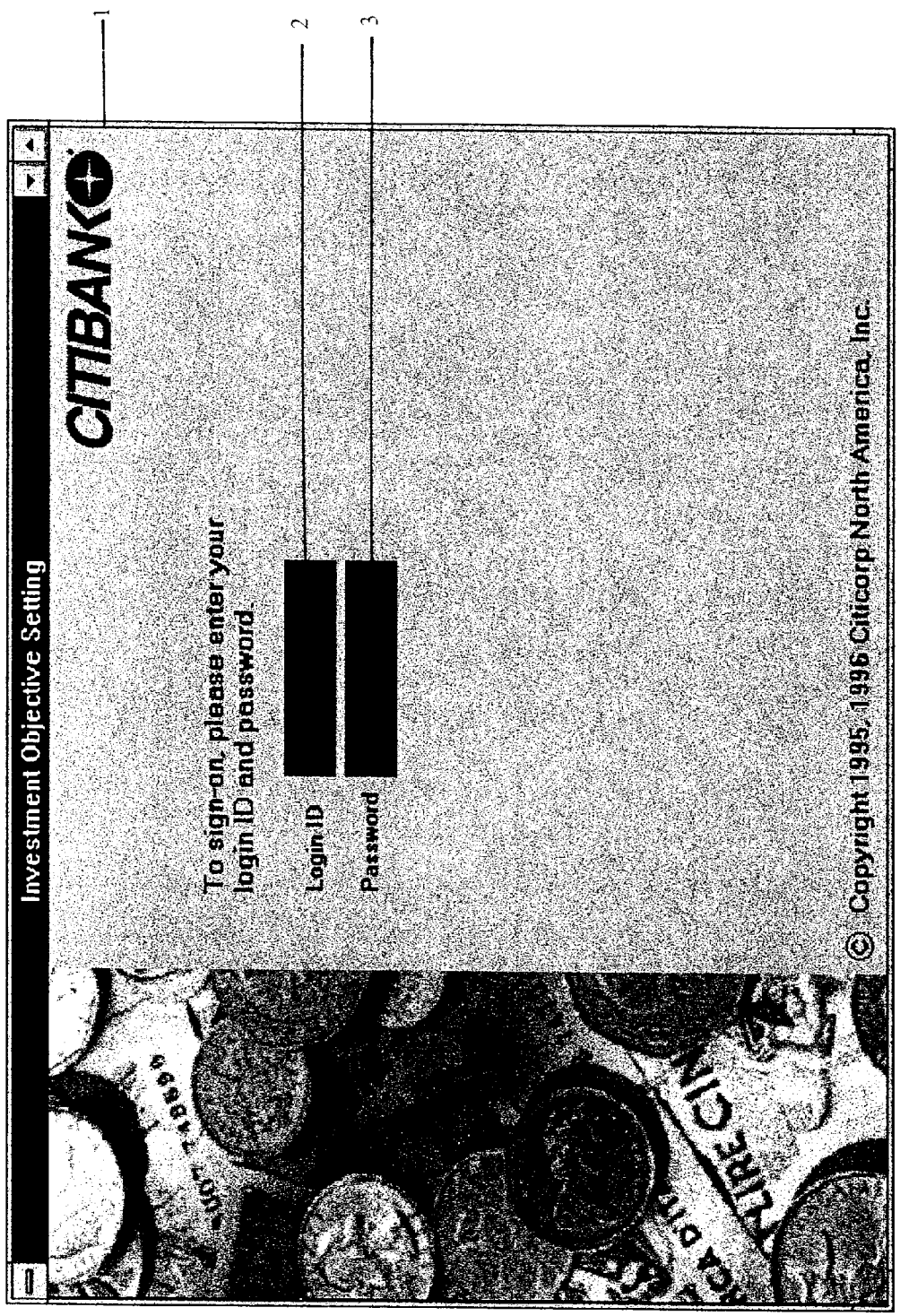
FIG. 7 is the sign-on information screen.
Figure 34:
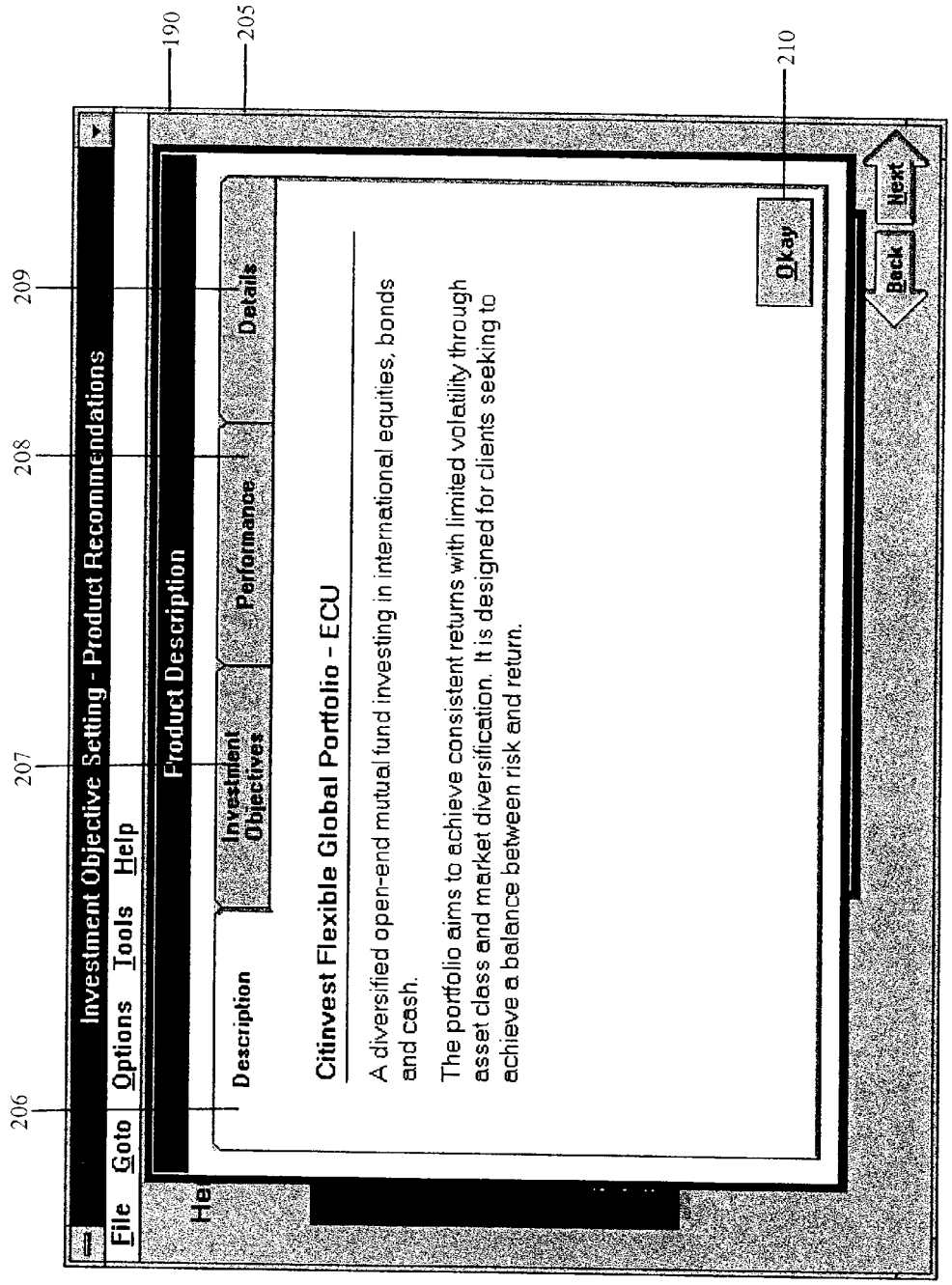
FIG. 34 is a pop-up window of information about a fixed income type selected.
Figure 35:
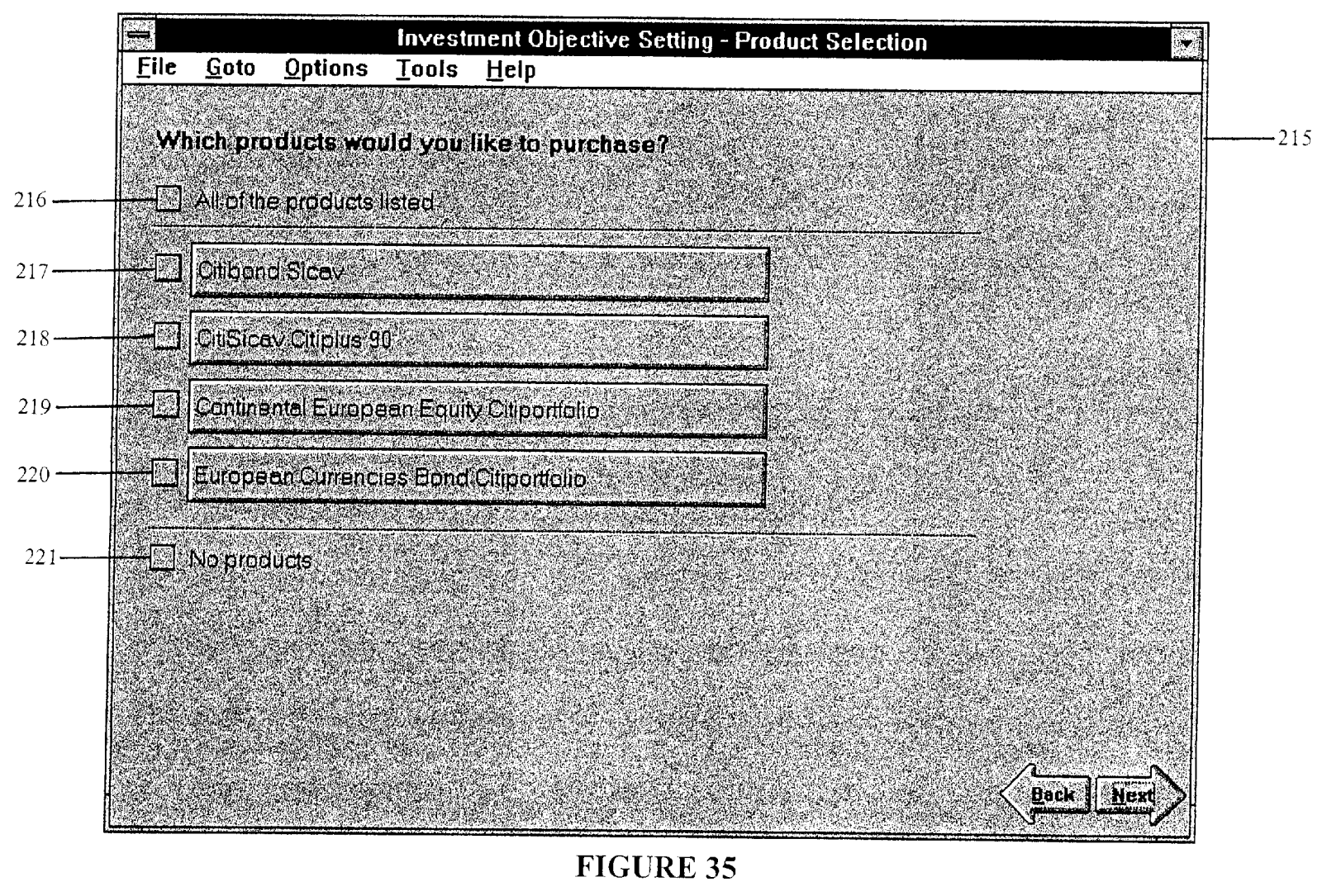

In step S35, shown in FIG. 6, the system describes a list of products for the risk class selected by the customer (as shown in FIG. 34). In step S36 (purchase risk class fund), the user selects among these products. As shown in FIG. 35, step S36 contains an example product selection window 215, with choices to purchase All of the products listed 216, particular products listed 217–220, or No products 221. After the user makes a selection, the system proceeds to step S37.

In step S37, shown in FIG. 6, the system determines whether the customer has more goals to select. If yes, the system proceeds to step S10. In no, the system proceeds to step S38.

In step S38 (purchase), shown in FIG. 6, the system determines a list of products for the risk class selected by the customer. FIG. 35 contains an example product selection window 215, with choices to purchase All of the products listed 216, particular products listed 217–220, or No products 221. After completing purchases, the system proceeds to step S39 (Wrap-up).

Figure 36:
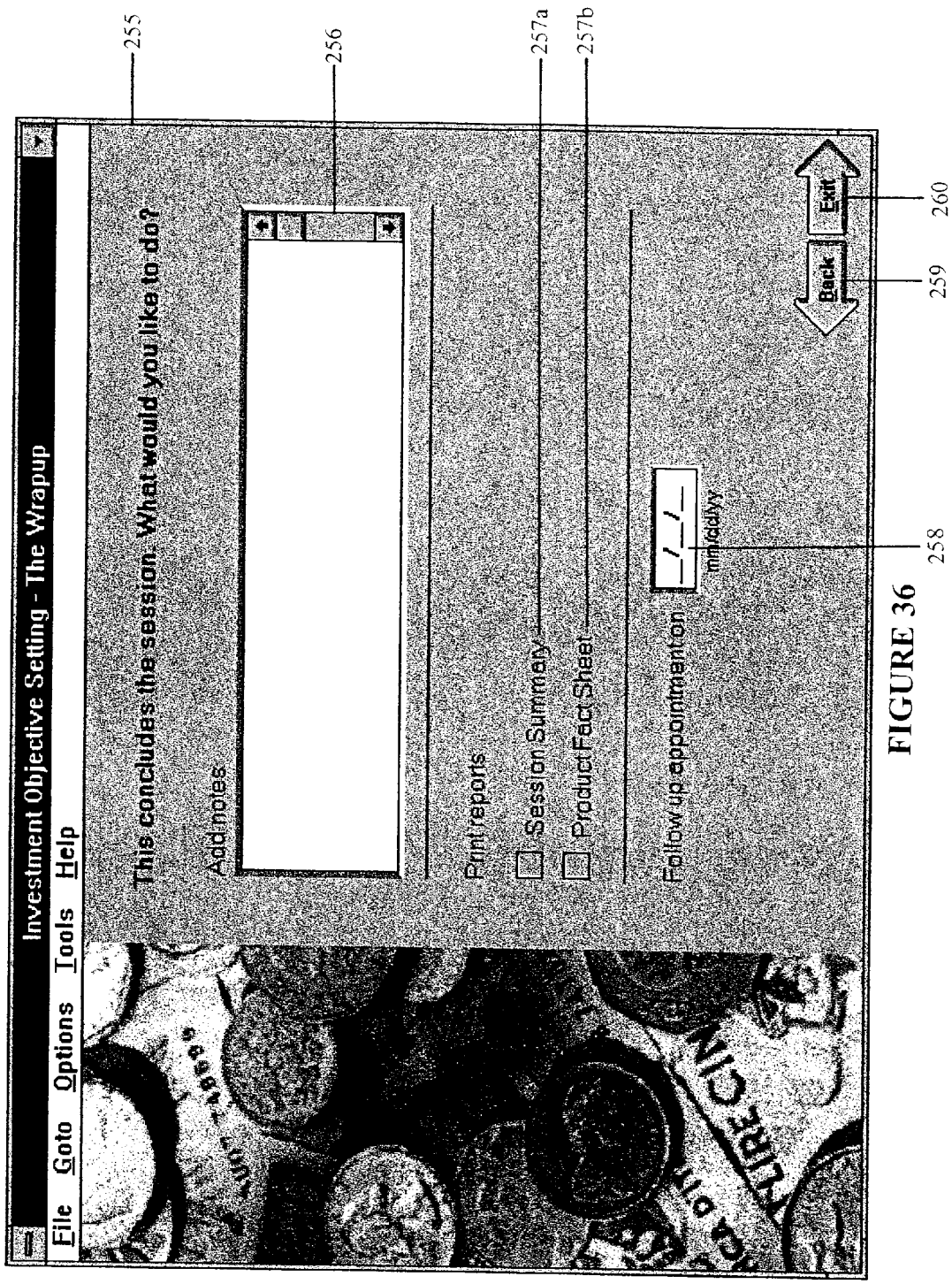
FIG. 36 illustrates the system wrap-up screen.

In step S39 (Wrap-up), the user ends the session and conducts file maintenance. FIG. 36 illustrates the wrap-up screen. A window 255 allows the user to record notes 256 for the session to attach to the saved file. The user has the option to print a session summary 257a or a product fact sheet 257b. The user can select a follow-up appointment date by inputting a date 258. When finished, the user can select the "Back" button 259 to return to step S39 or the "Exit" button 260 to exit the system.

Figure 37:
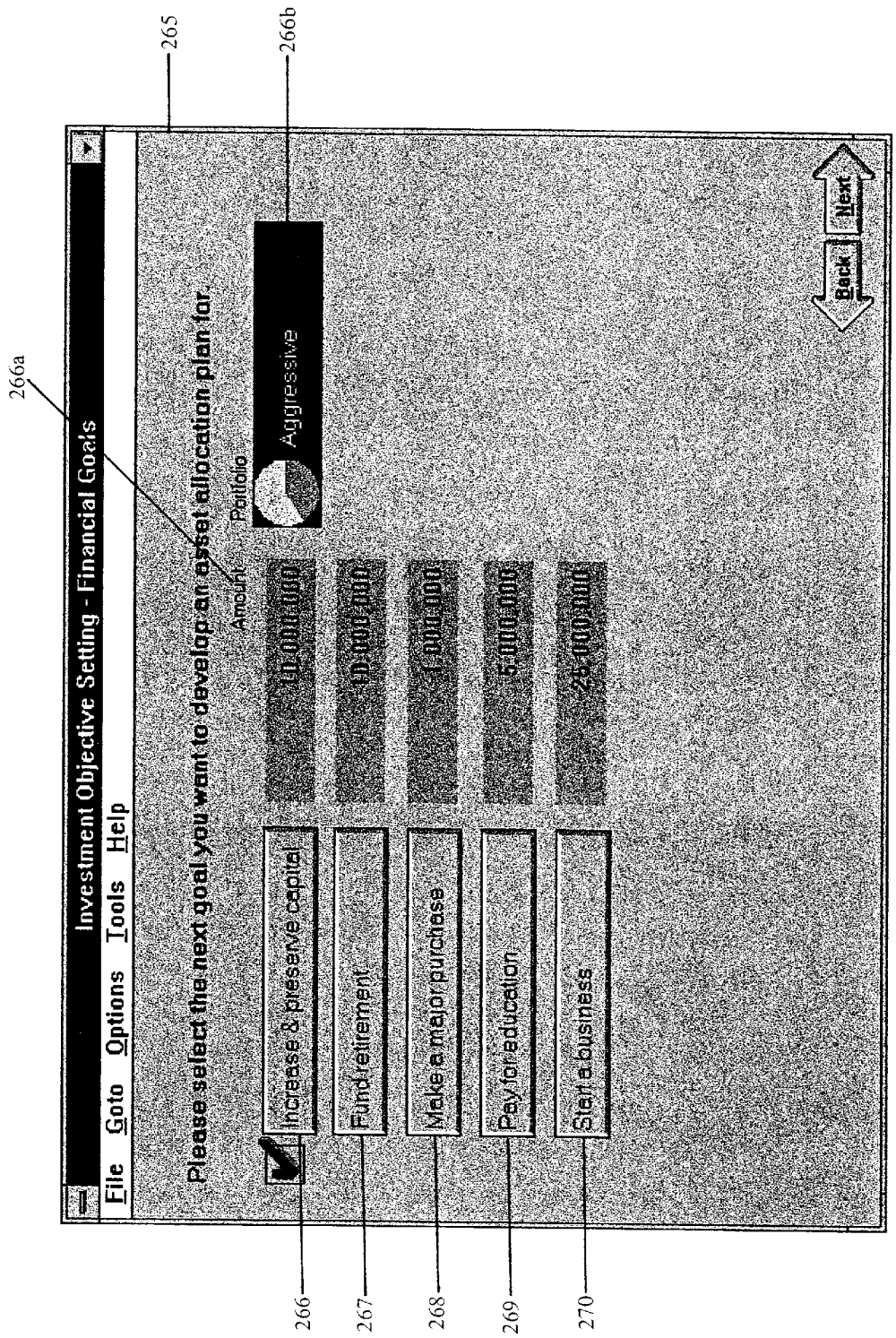
FIG. 37 is a screen containing the asset allocation goals selection menu.

When a returning to step S10 for multiple goals, the system allows an abbreviated method for altering data on each goal. As shown in FIG. 37, the system provides screens containing all the data for each goal. A window 265 displays the goal that has been completed, including Amount 266a and Portfolio type 266b selected. Additional goals 267–270 are present for the use to select from to proceed through the system The system then proceeds normally through step S11 on for each goal selected.

In addition, steps for changing previously inputted information are abbreviated. For example, as shown in FIG. 38, a window 275 allows the user to change values for a particular goal 276. Other values associated with the goal are displayed, including investment amount 277a, income required 277b, timeframe 277c, investment outcome 277d, and saving power summary 277e.

As a further element of an embodiment of the present invention, the system contains data input error screens. These screens require the user to provide, for example, logins that do not exceed the maximum character length, dates within the proper date range, and require such things as inputting data in certain places where necessary (e.g., a customer must check either yes or no the question of whether income is required from investments).

As was indicated with regard to discussion for FIG. 8 above, the user may also use the pulldown menus 9 to proceed through the system.

Figure 39:
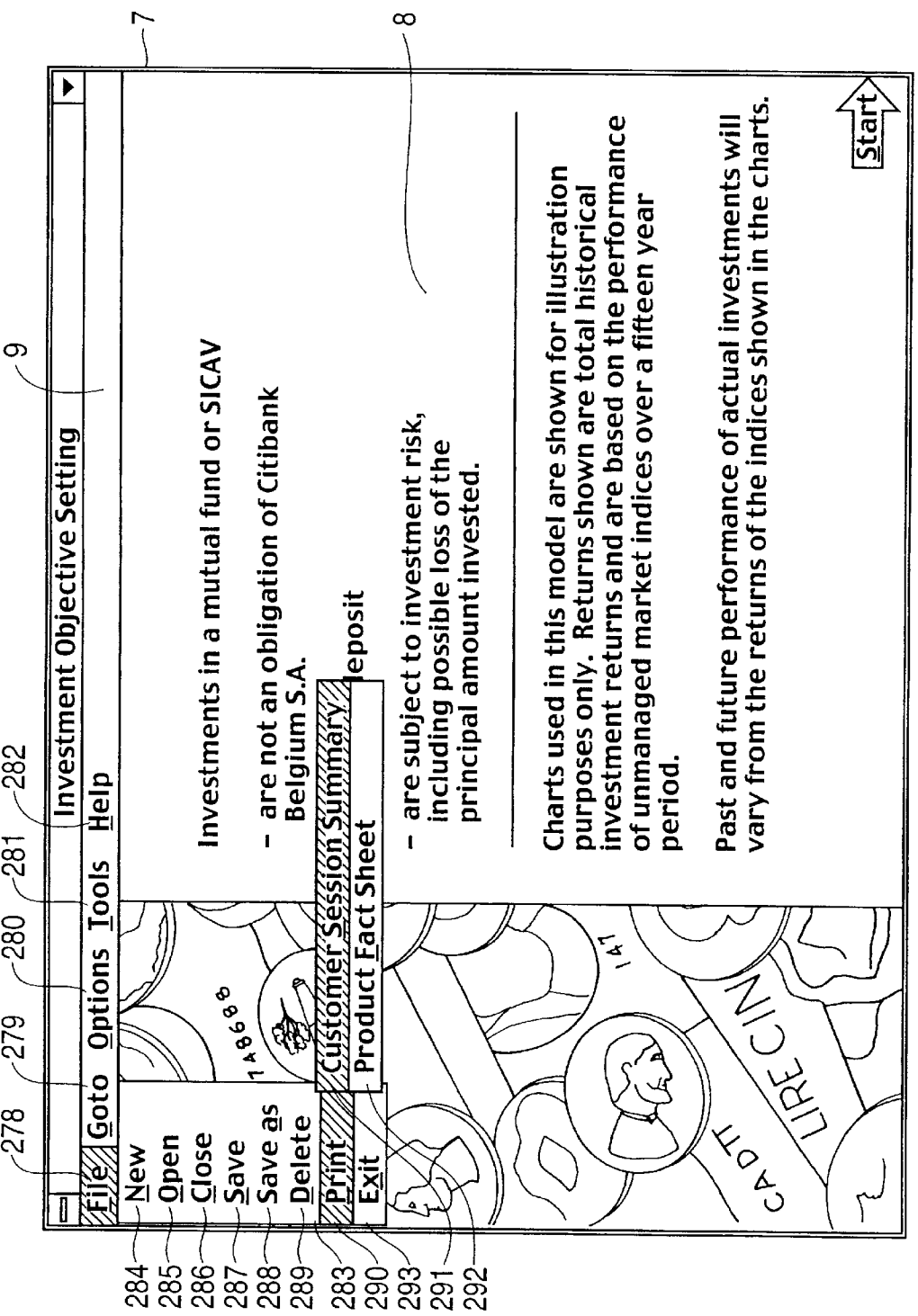
FIG. 39 is a screen illustrating a file pulldown menu bar.

FIG. 39 contains the window 7 with the disclaimer 8 that the user normally sees at step S2 of FIG. 3. The user may select from the pulldown menu bar 9 menus for file 278, Goto 279, options 280, tools 281, or help 282. Within the file 283 menu are options for starting a new 284 file, open 285 an existing file, close 286 the current file, save 287 the current file, save 288 the current file in a different format, delete 289 a selected item, print 290 a user session summary 291 or a product fact sheet 292, or to exit 293 the system.

Figure 40:
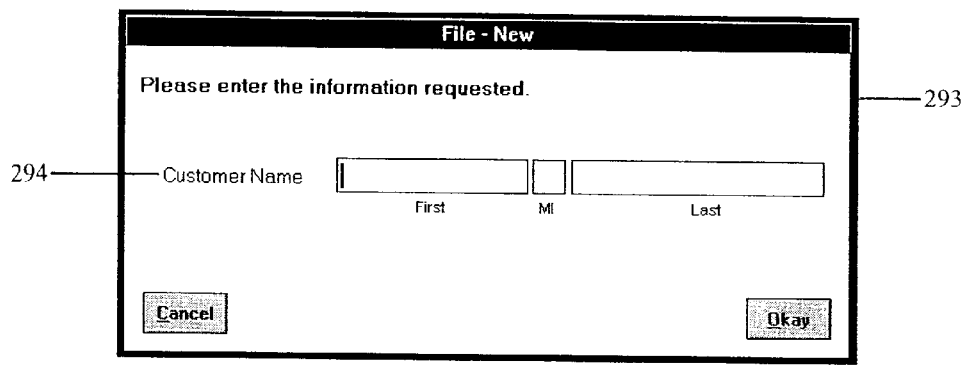
FIG. 40 is a pop-up window for the New menu selection.
Figure 41A:
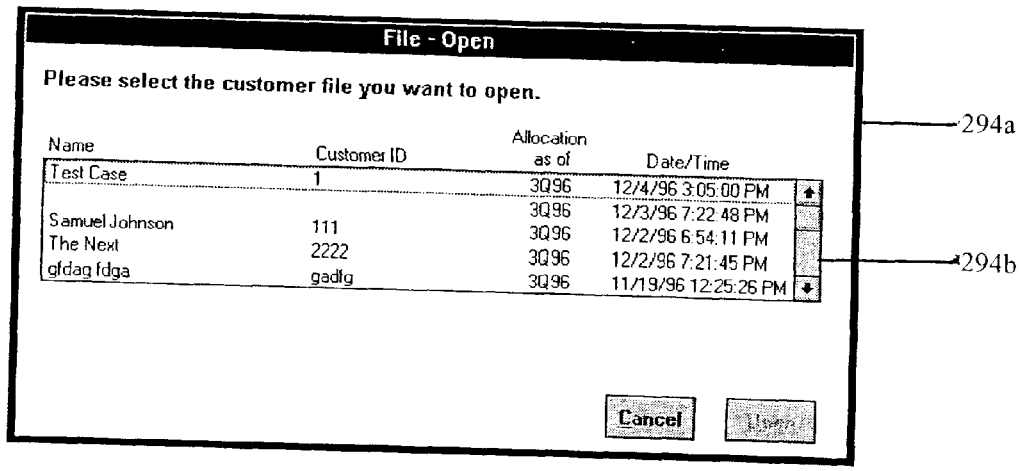
FIG. 41a is a pop-up window for the Open menu selection.
Figure 41B:
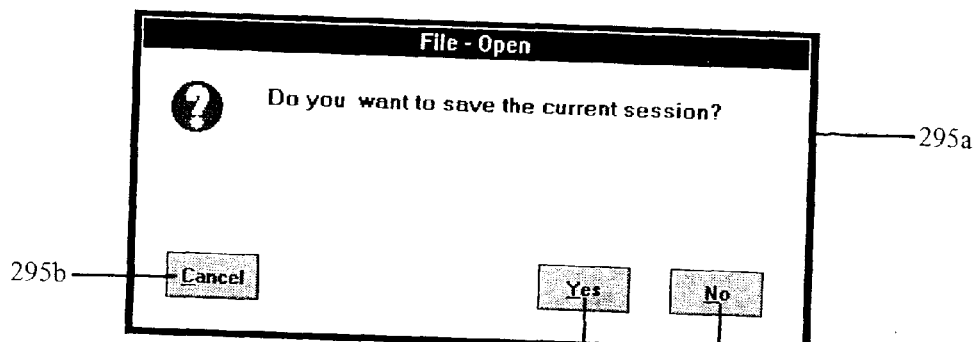
FIG. 41b is a pop-up window for saving an open information file.
Figure 41C:
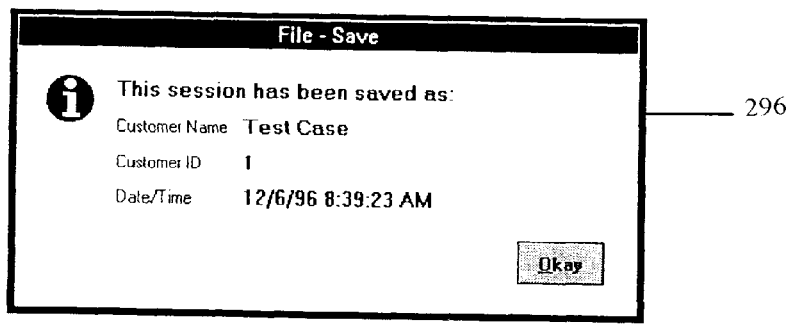
FIG. 41c is a pop-up window of file save information.

FIG. 40 shows the pop-up window 293 that appears if a user selects "New" 284 from the file 278 menu shown in FIG. 39. The user must input Customer Name 294 to proceed. FIG. 41a shows the pop-up window 294a that appears if the user selects "Open" 285 from the file 278 menu shown in FIG. 39. The user selects a customer file from the list presented 294b. If the user is already in session, as shown in FIG. 41b in pop-up window 295a, the system will ask the user whether the user wants to save the current session before opening the new one. The user can select Cancel 295b, Yes 295c, or No 295d. If the user selects Yes 295c, an additional pop-up window 296 appears, shown in FIG. 41c, which provides information on the saved file. Similar pop-up windows for saving appear if the user selects Save 287 or Exit 293 from the File 278 menu shown in FIG. 39.

Figure 42:
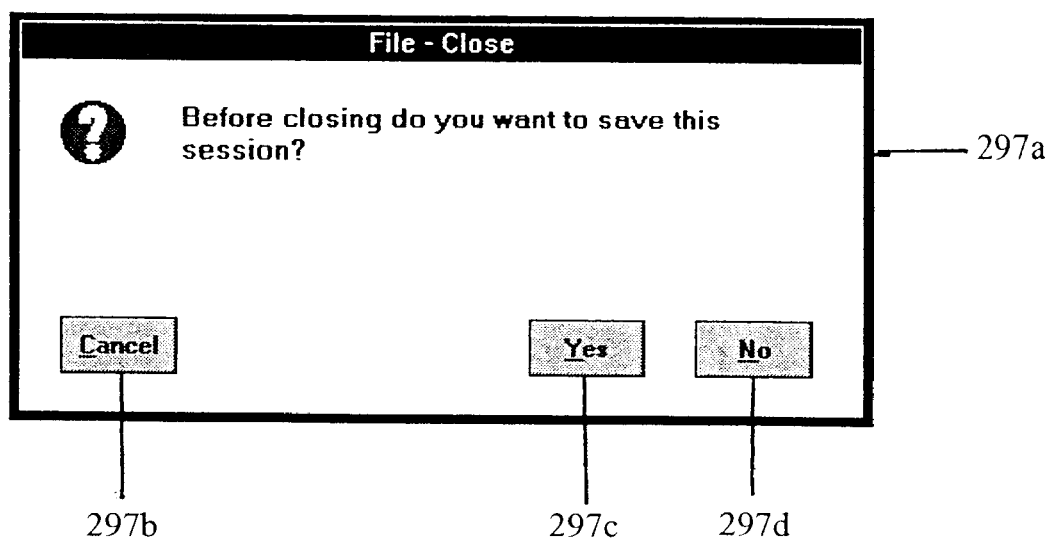
FIG. 42 is a pop-up window for the Close menu selection.

FIG. 42 shows the pop-up window 297a that appears if the user selects Close 286 from the File 278 menu shown in FIG. 39. Similar to the Open 285 option shown in FIGS. 41a–c, the user can select Cancel 297b, Yes 297c, or No 297d.

Figure 43:
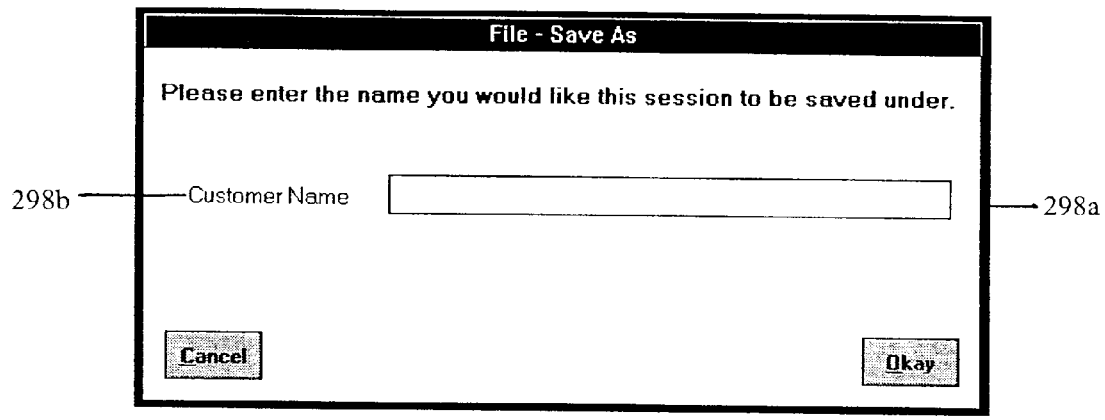
FIG. 43 is a pop-up window for the Save menu selection.

FIG. 43 shows the pop-up window 298a that appears if the user selects Save as 288 from the File menu 278. The user must input a customer name 298b under which to save information.

Figure 44:
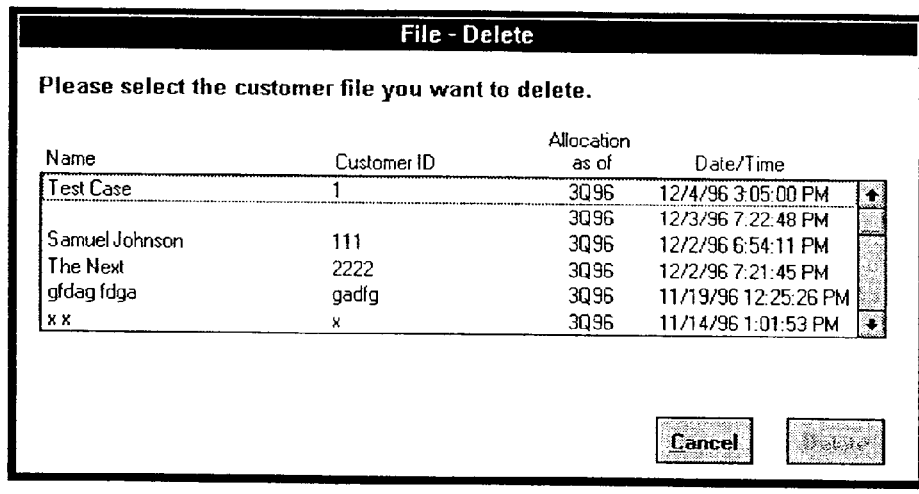
FIG. 44 is a pop-up window for the Delete menu selection.

FIG. 44 shows the pop-up window 299 that appears if the user selects Delete 289 from the File 278 menu shown in FIG. 39.

Figure 45A:
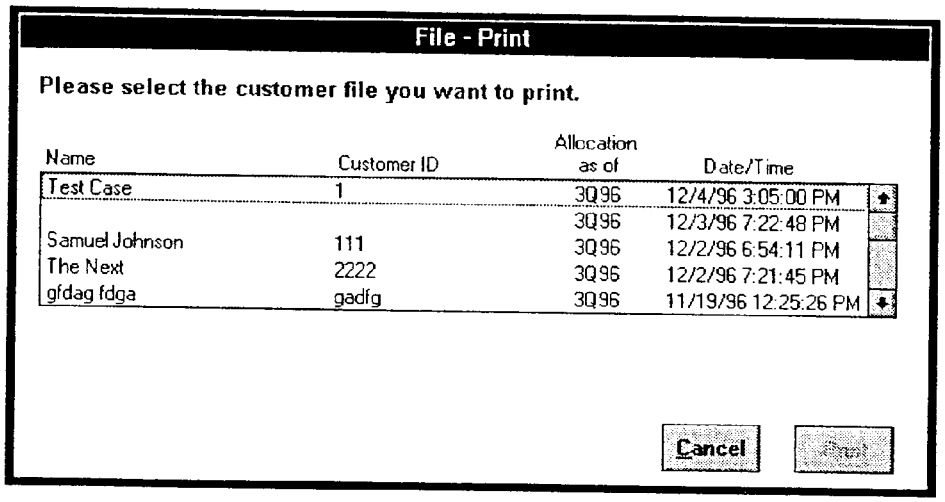
FIG. 45a is a pop-up window for the Customer Session Summary menu selection.
Figure 45B:
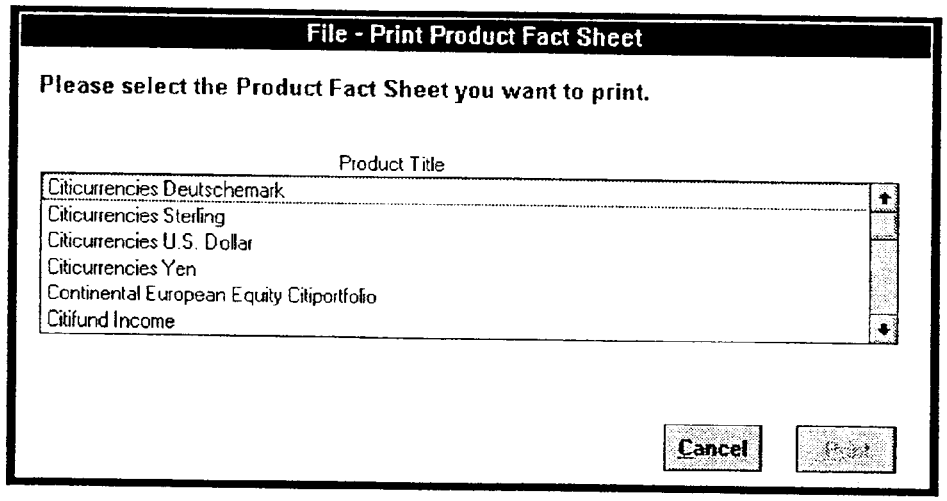
FIG. 45b is a pop-up window for the Product Fact Sheet menu selection.

FIGS. 45a and 45b present pop-up windows that appear, respectively, if the user selects Print 290 Customer Session Summary 291 and Product Fact Sheet 292 from the File 278 menu shown in FIG. 39.

Figure 46:
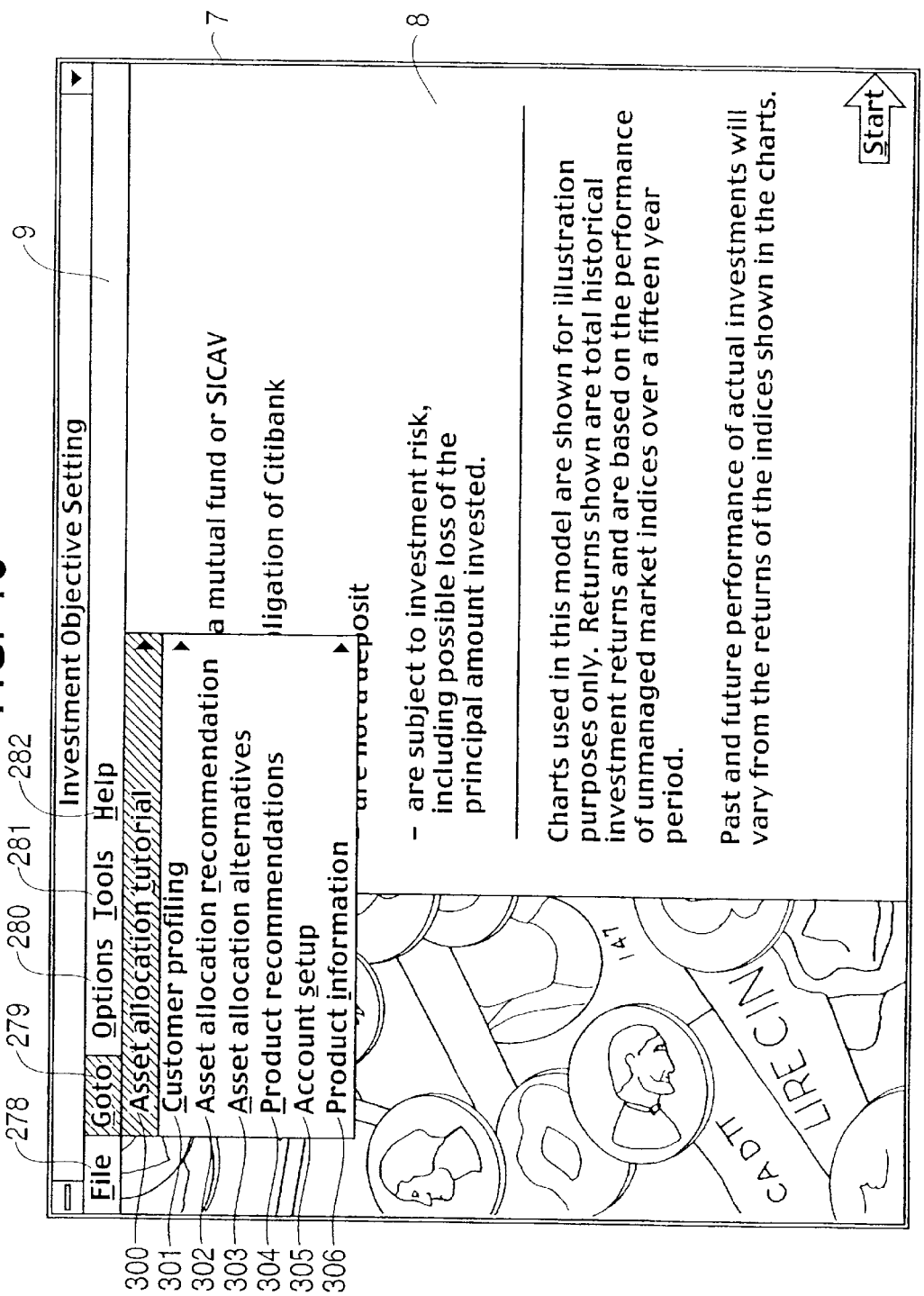
FIG. 46 is a screen illustrating the Goto pulldown menu.

FIG. 46 shows the options within the Goto 279 menu. These options include asset allocation tutorial 300, customer profiling 301, asset allocation recommendation 302, asset allocation alternatives 303, product recommendations 304, account setup 305, and product information 306.

Figure 47:
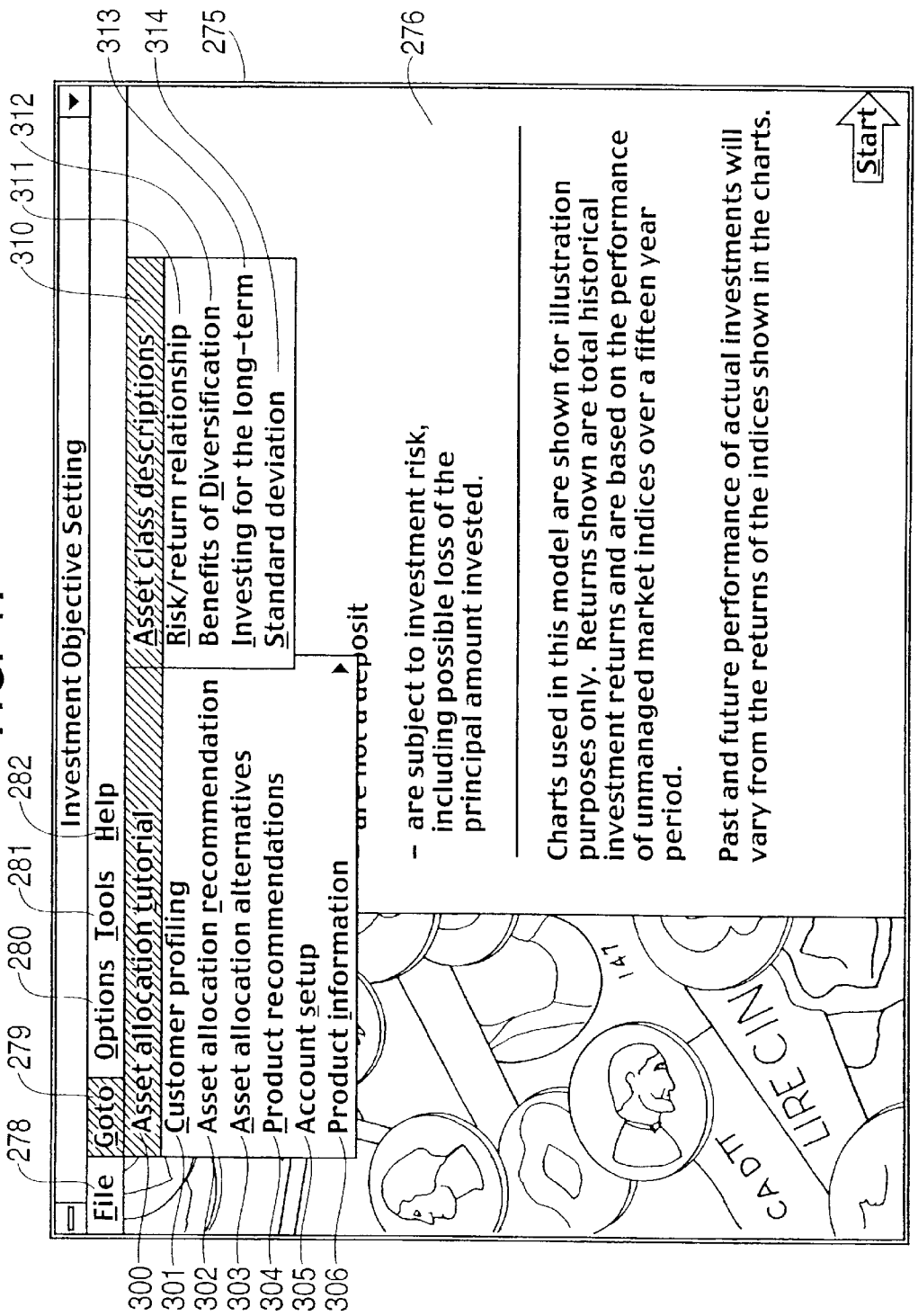
FIG. 47 is a screen showing the Goto menu, Asset allocation tutorial submenu.

FIG. 47 shows the suboptions within the Goto 279 menu when asset allocation tutorial 300 is selected. These suboptions include asset class description 310, risk/return relationship 311, benefits of diversification 312, investing for the long-term 313, and standard deviation 314.

Figure 48:
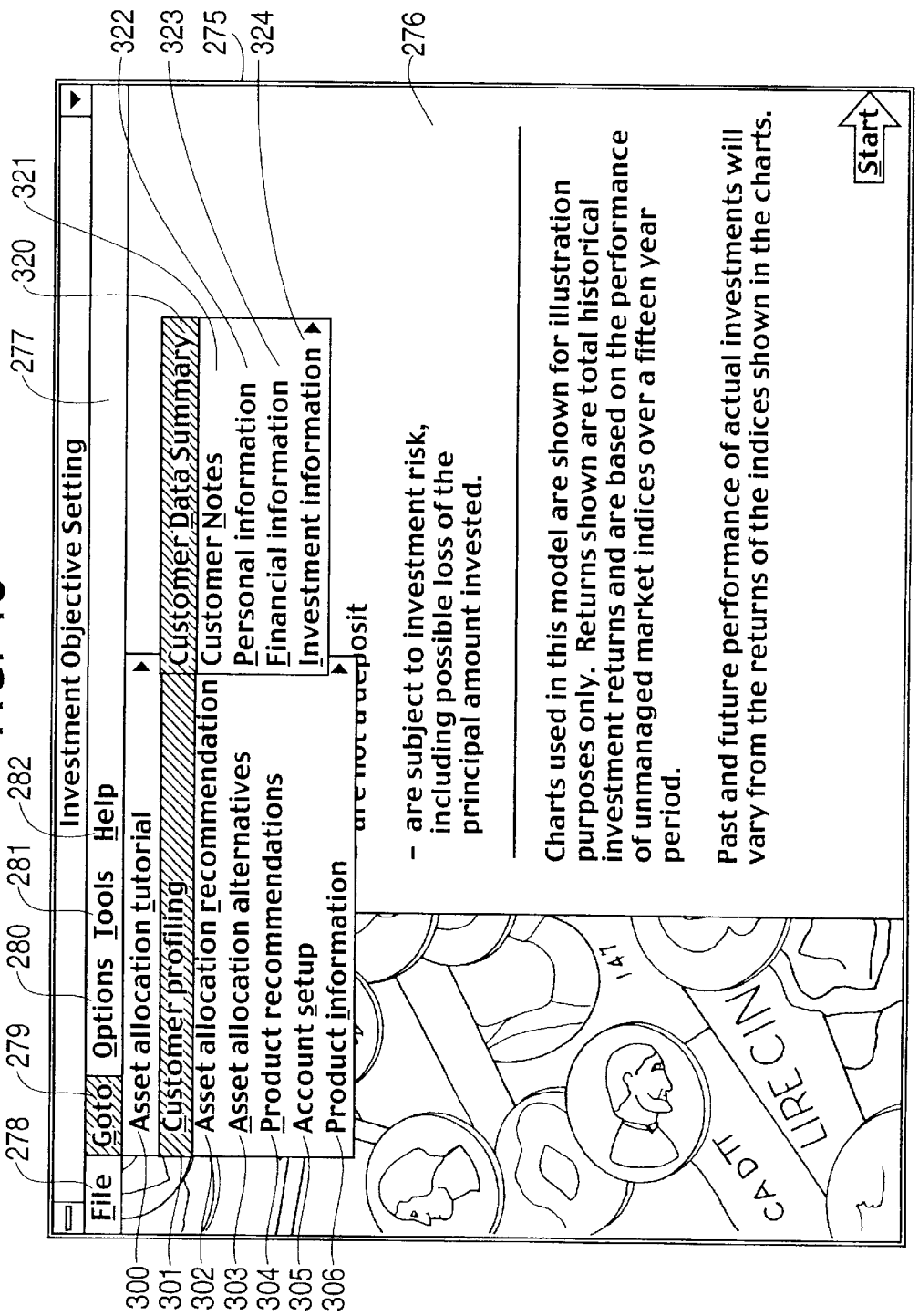
FIG. 48 is a screen showing the Goto menu, Customer profiling submenu.

FIG. 48 shows the suboptions within the Goto 279 menu when Customer profiling 301 is selected. These suboptions include Customer Data Summary 320, Customer Notes 321, Personal information 322, Financial information 323, and Investment information 324. If the user selects customer data summary 320, as shown in FIG. 49, a window 330 appears with tabs for windows for customer information titled Personal 331, Financial 332, and Investment 333. Within the personal information window 331, the user may alter any of the data contained within the window regarding personal information.

Figure 50:
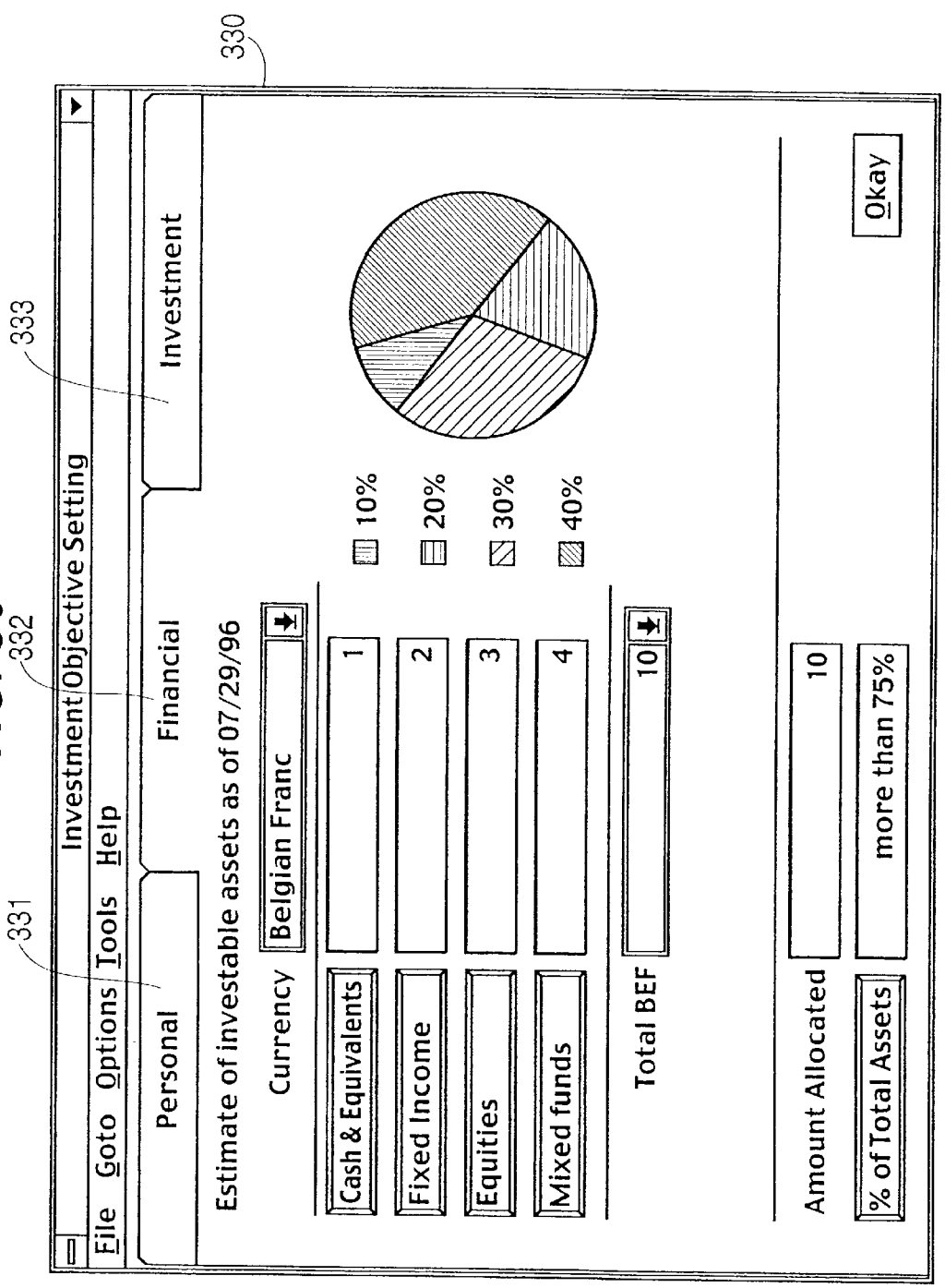
FIG. 50 is a screen of input Financial information.
Figure 51:
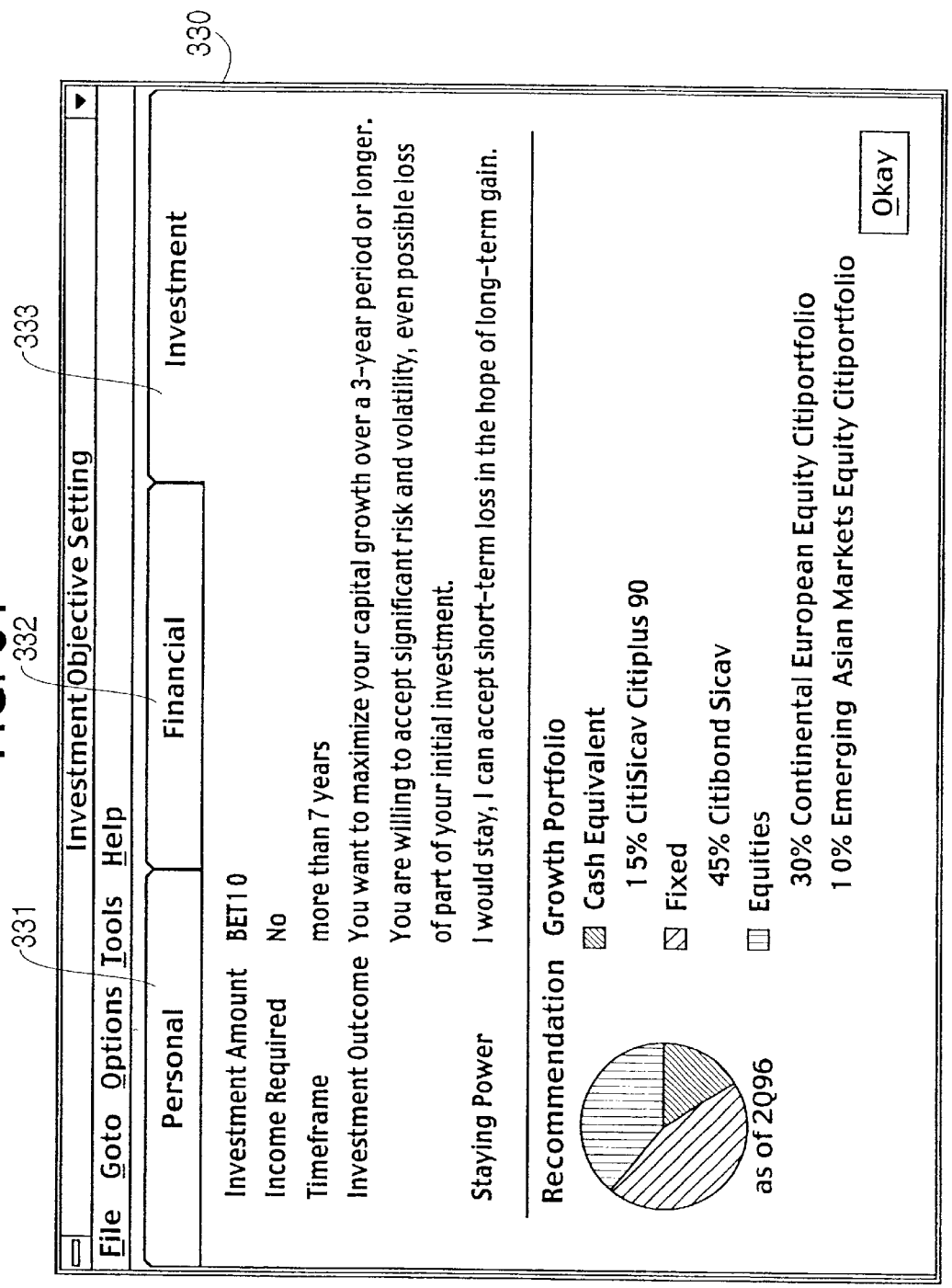
FIG. 51 is a screen of input Investment information.

FIG. 50 illustrates the information provided and changes that may be made by the user regarding Financial 332 information that has been input. FIG. 51 contains the information provided and changes that may be made by the user regarding investment 332 information that has been input.

Figure 52:
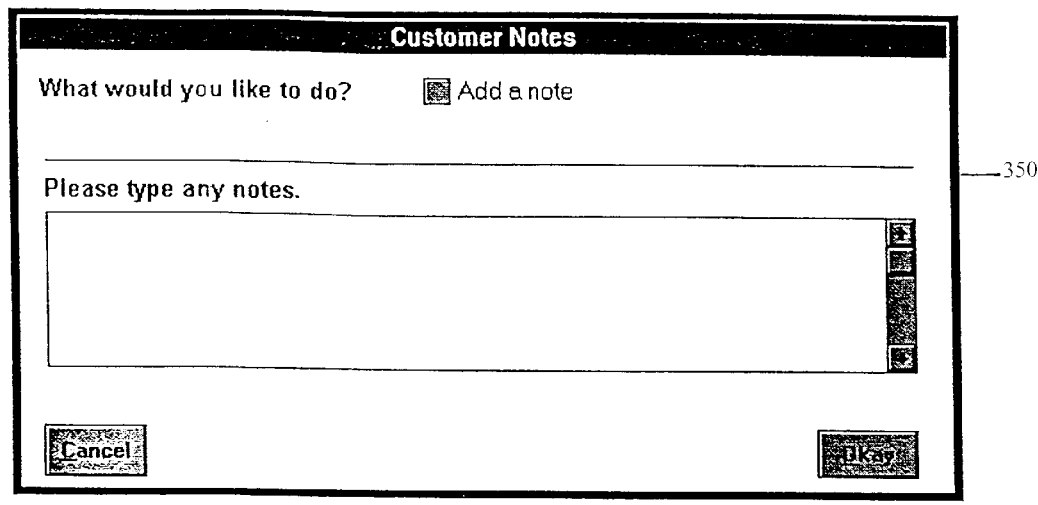
FIG. 52 is a pop-up window for recording notes.

If, in FIG. 48, the user selects customer notes 321, a pop-up window 350, shown in FIG. 52, appears, which allows the user to add a note.

Figure 53:
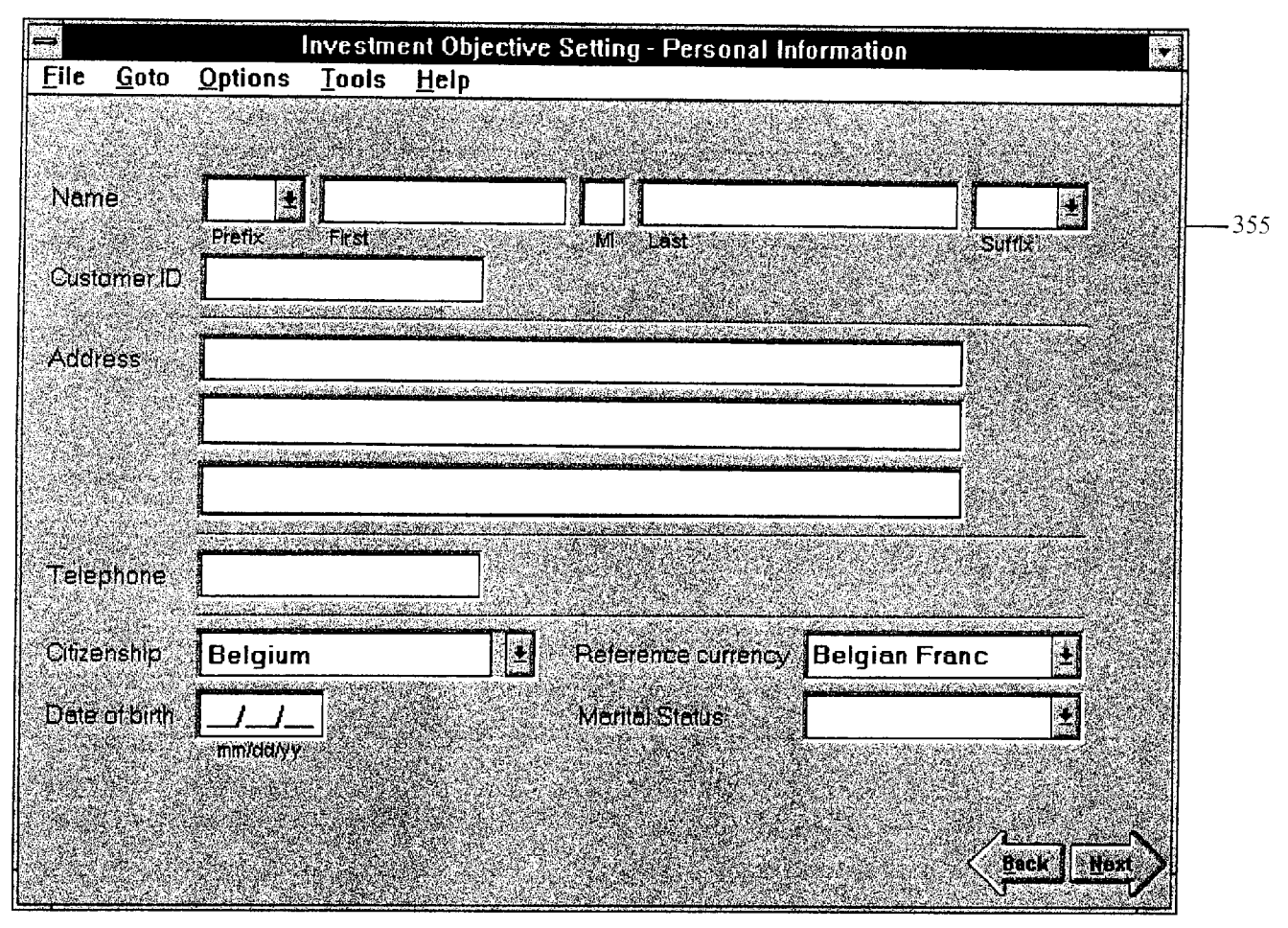

If, in FIG. 48, the user selects personal information 322, a pop-up window 355, as shown in FIG. 53, appears that allows the user to alter any of the customer's personal information.

Figure 54:
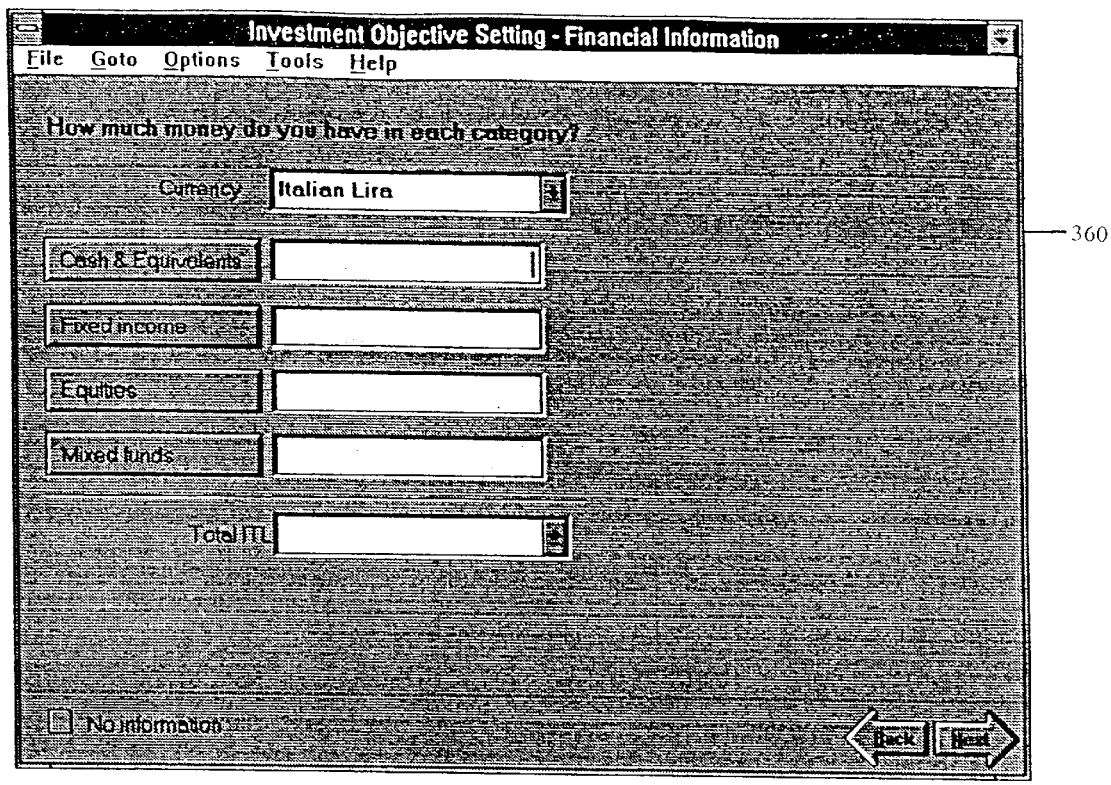
FIG. 54 is a pop-up window for customer Financial information.

If, in FIG. 48, the user selects financial information 323, a pop-up window 360, as shown in FIG. 54, appears that allows the user to alter any of the customer's financial information.

Figure 55:
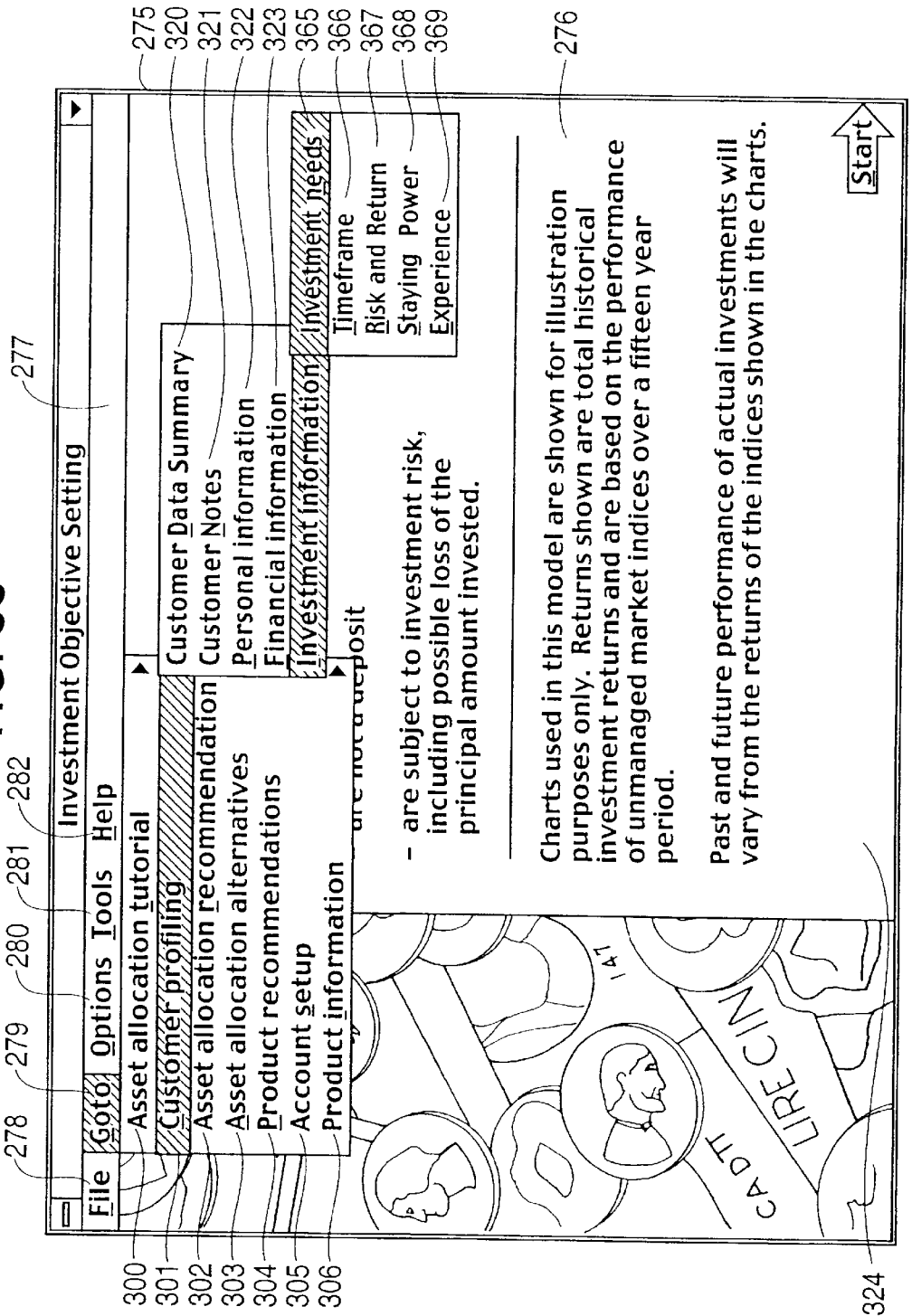
FIG. 55 is a screen showing the Goto pulldown menu, Customer profiling submenu.

FIG. 55 contains the submenu for Investment information 324 within the submenu for Customer profiling 301 of the Goto 279 menu. This Investment information 324 submenu includes Investment needs 365, Timeframe 366, Risk and Return 367, Staying Power 368, and Experience 369.

Figure 56:
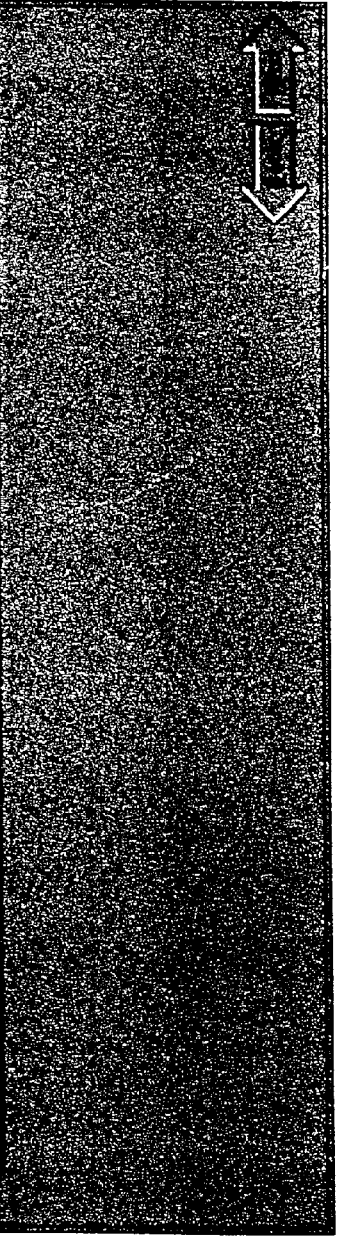
FIG. 56 shows the pop-up window for Investment needs menu selection.

If the user selects Investment needs 365, a window appears, shown in FIG. 56. FIG. 56 contains a window 375 with a pop-up window 376 containing investment needs information for which the user may change selections.

Figure 57:
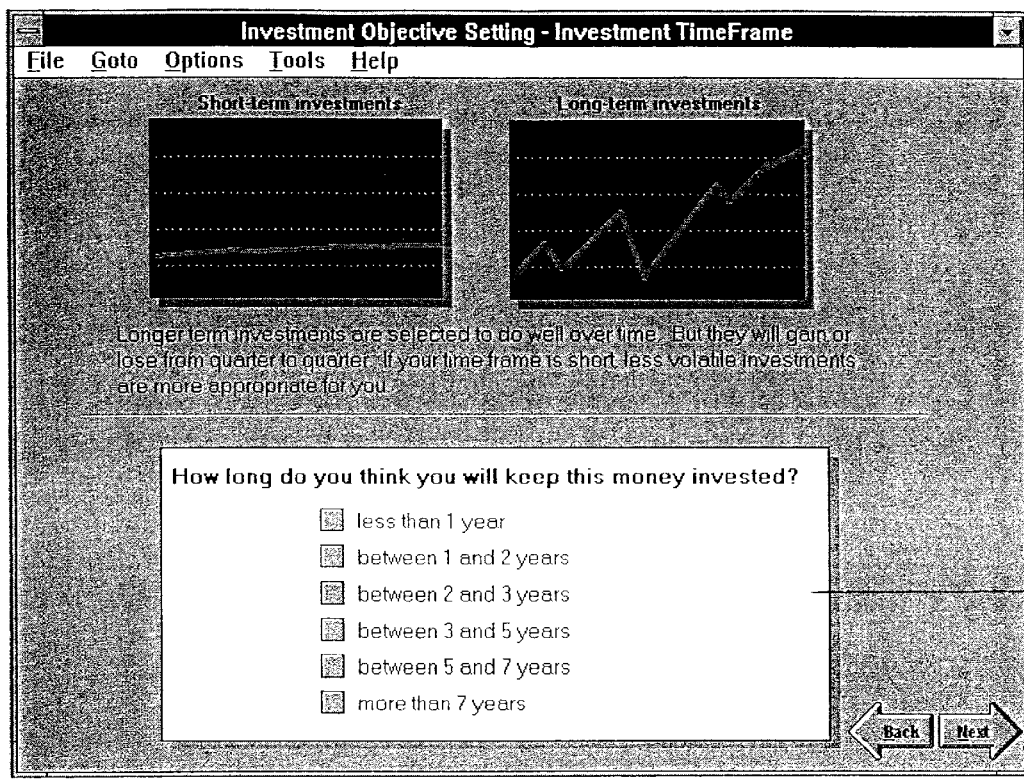
FIG. 57 shows the pop-up window for Investment information menu selection.

In FIG. 55, if the user selects the timeframe 366 option of the investment information 324 submenu, a pop-up window 380 appears, shown in FIG. 57. The user may alter information within this pop-up window 380.

Figure 58:
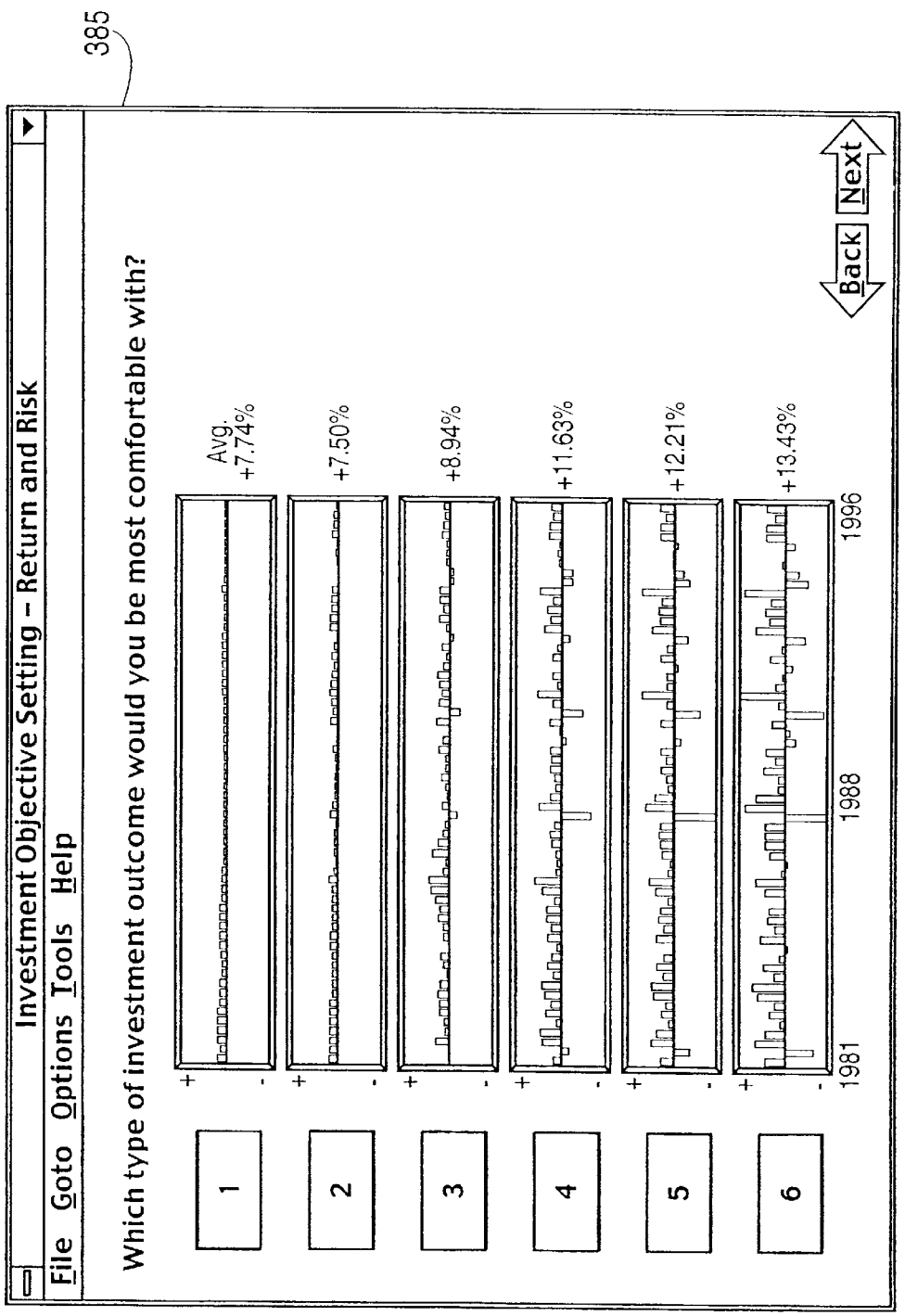
FIG. 58 is a screen showing Risk and Return information.

In FIG. 55, if the user selects the risk and return 367 option of the investment information 324 submenu, a pop-up window 385 appears, as shown in FIG. 58. FIG. 58 illustrates the investment outcomes from which the user may select. A window 385 contains six options for investment outcome, with graphical profiles of each. By selecting a button 386, 387, 388, 389, 390, or 391 corresponding to one of the outcomes, the customer may learn more about that outcome.

Figure 59:
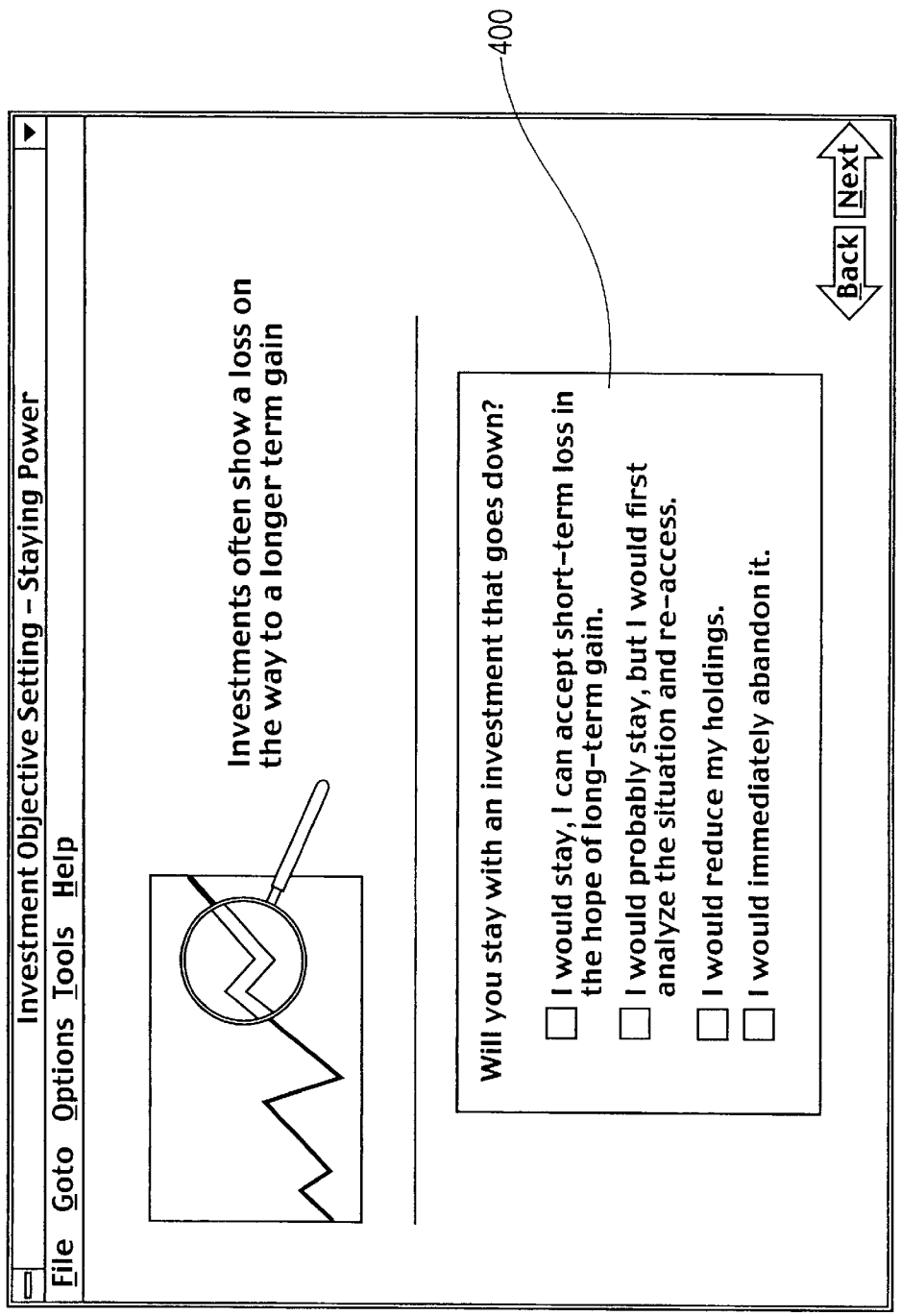
FIG. 59 is a pop-up window for the Staying power menu selection.

In FIG. 55, if the user selects the staying power 368 option of the investment information 324 submenu, a pop-up window 400 appears, shown in FIG. 59. The user may alter information within this pop-up window 400.

Figure 60:
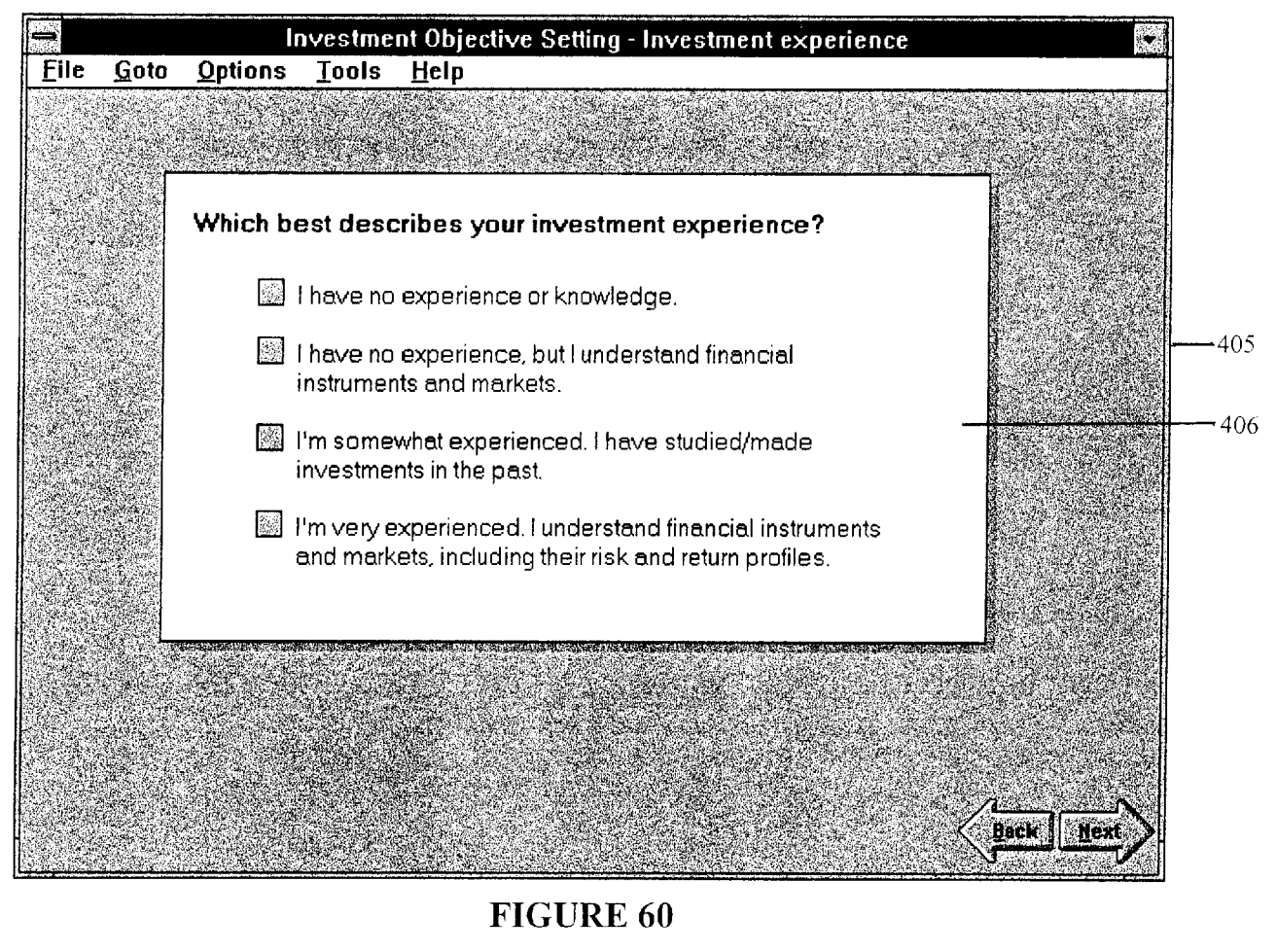

In FIG. 55, if the user selects the experience 369 option of the investment information 324 submenu, a window 405 appears containing a pop-up window 406, shown in FIG. 60. The user may alter information within this pop-up window 406.

Figure 61:
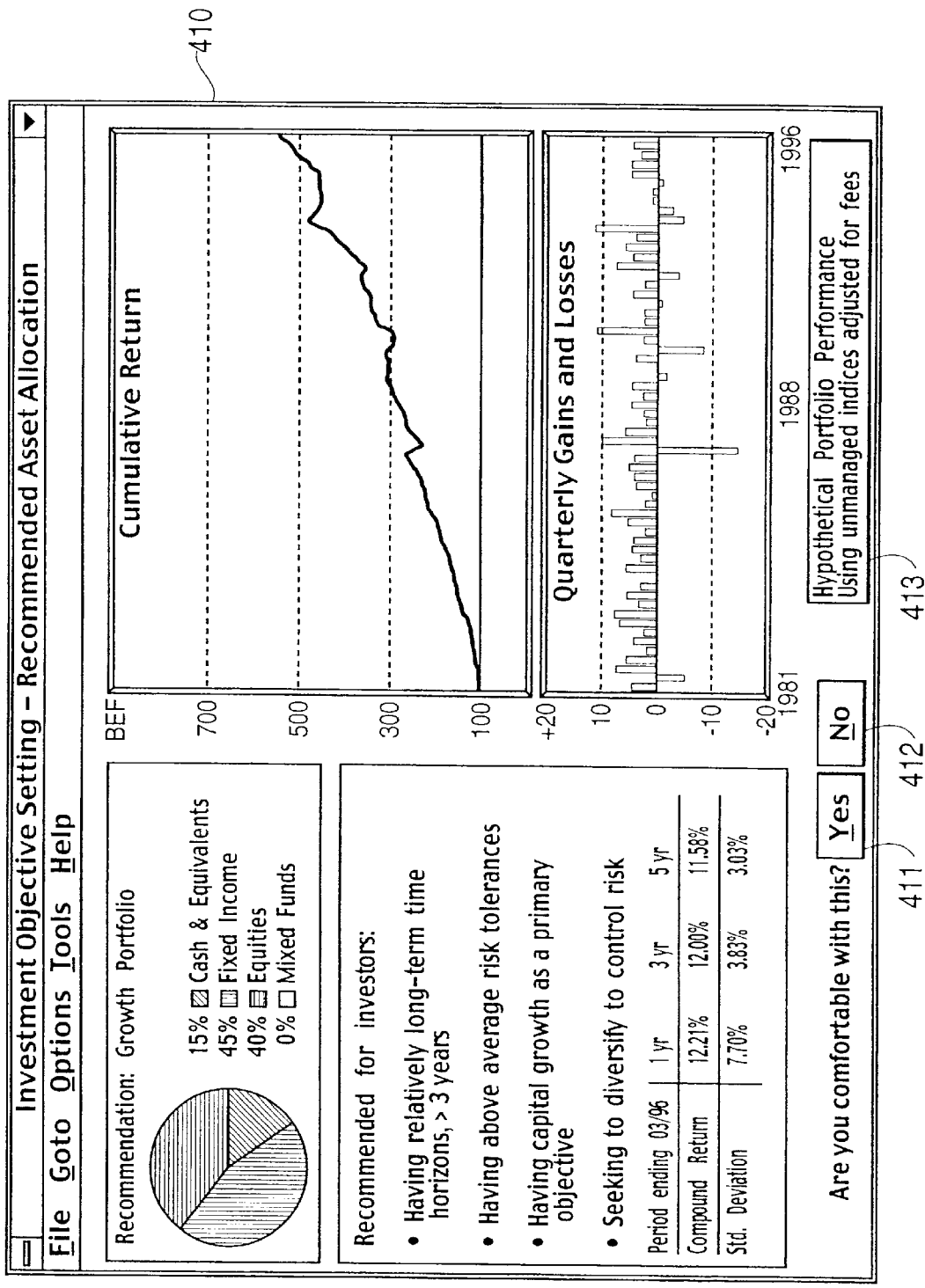
FIG. 61 is a screen for the Asset allocation recommendation menu selection.
Figure 62:
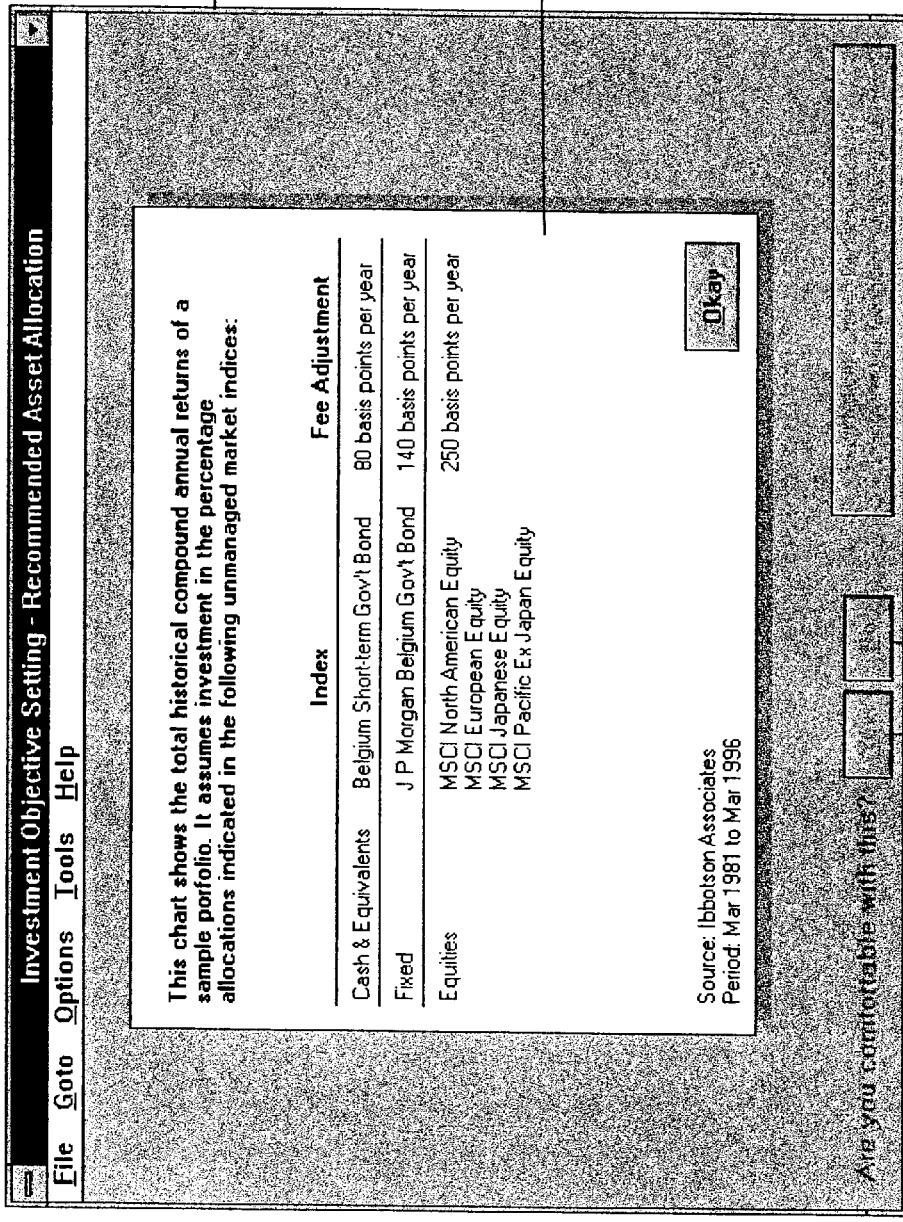
FIG. 62 is a screen illustrating Hypothetical Portfolio Performance for an asset portfolio selected.
Figure 63:
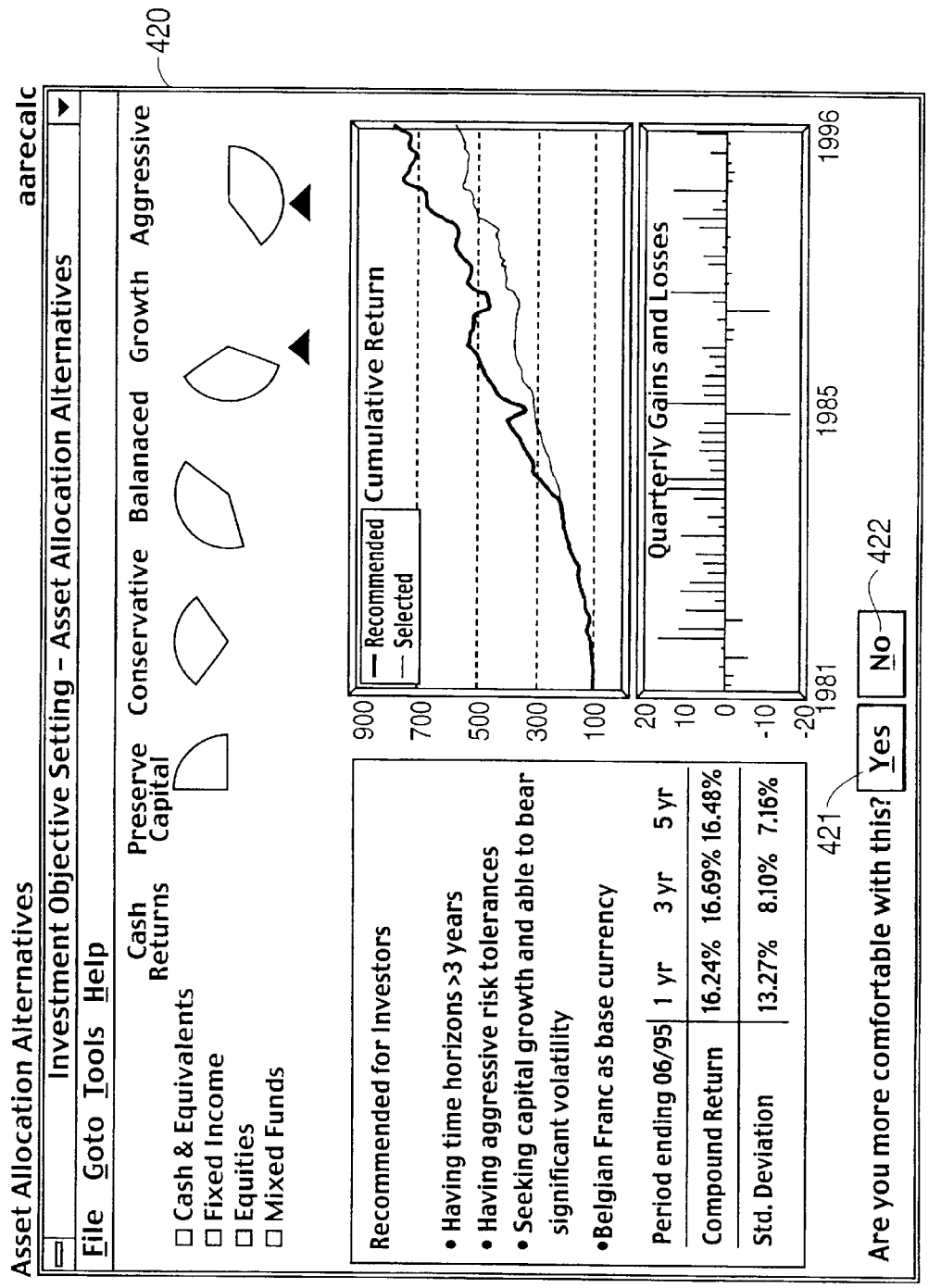
FIG. 63 is a screen containing an additional asset allocation alternative.

In FIG. 46, if the user selects Asset allocation recommendation 302 from the Goto menu 279, a window appears 410, shown in FIG. 61. This window includes information on recommended asset allocation. Also included are button selections in which the user may indicate comfort level with the recommended asset allocation. If the user selects the "Hypothetical Portfolio Performance" button 413, another window 415 appears, shown in FIG. 62. This window 415 contains a pop-up window 416 showing historical performance of a sample portfolio of the recommended allocation. This window also includes button selections in which the user may indicate comfort level with the recommended asset allocation. If the user selects "yes" 417 (indicating comfortable), the system returns to the pulldown menus, shown in FIG. 46. If the user selects "no" 418, the system proceeds to other allocation alternatives, such as the one shown in the window 420 in FIG. 63.

In FIG. 46, the user may also select Asset allocation alternatives 303 (as illustrated above in FIG. 63) directly from the Goto menu 279.

Figure 64:
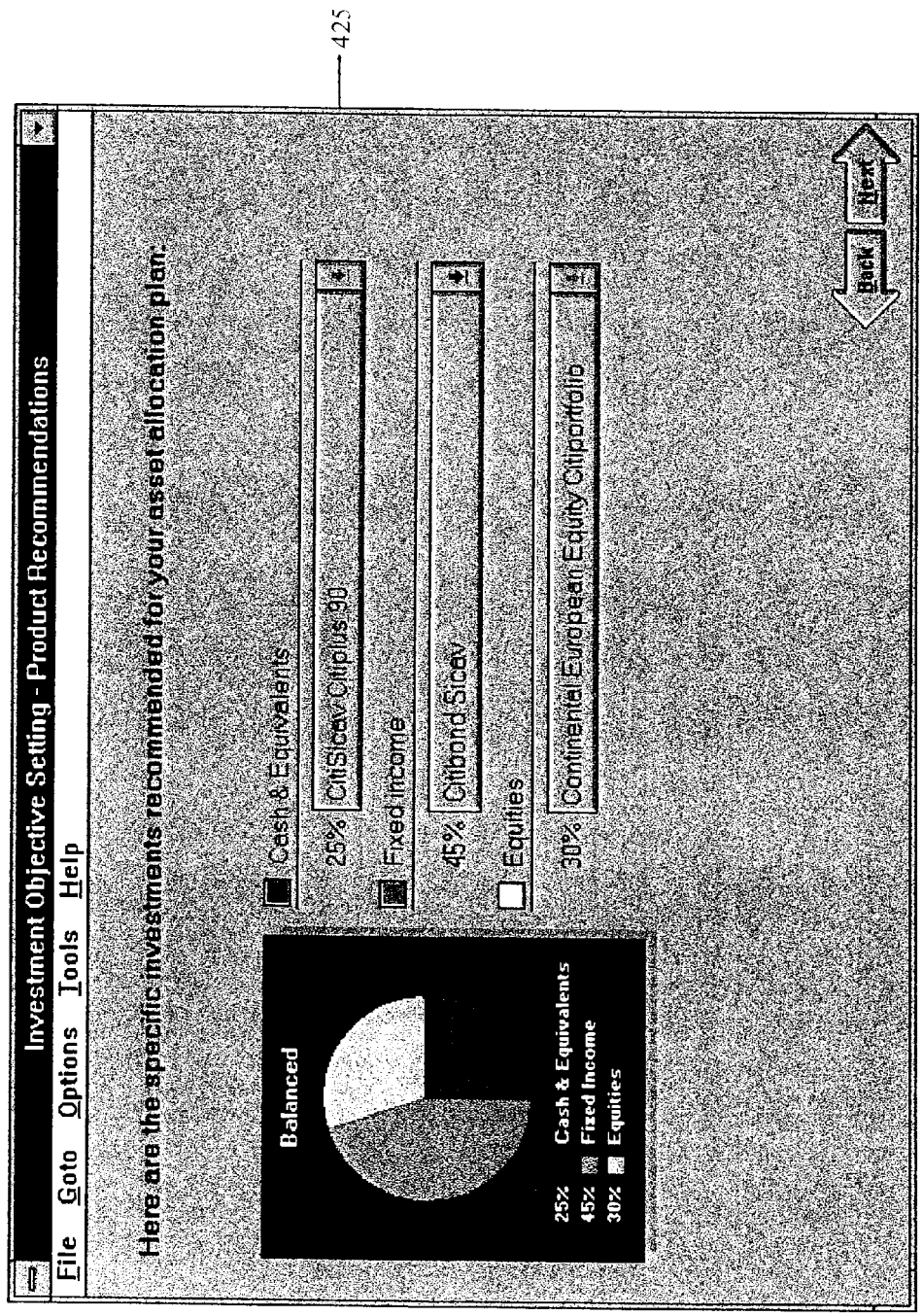
FIG. 64 is a screen showing Product recommendations.

In FIG. 46, the user may select Product recommendations 304 from the Goto menu 279. Upon selection, a window 425 appears, as shown in FIG. 64, containing product recommendations for the asset allocation plan the user has selected.

Figure 65:
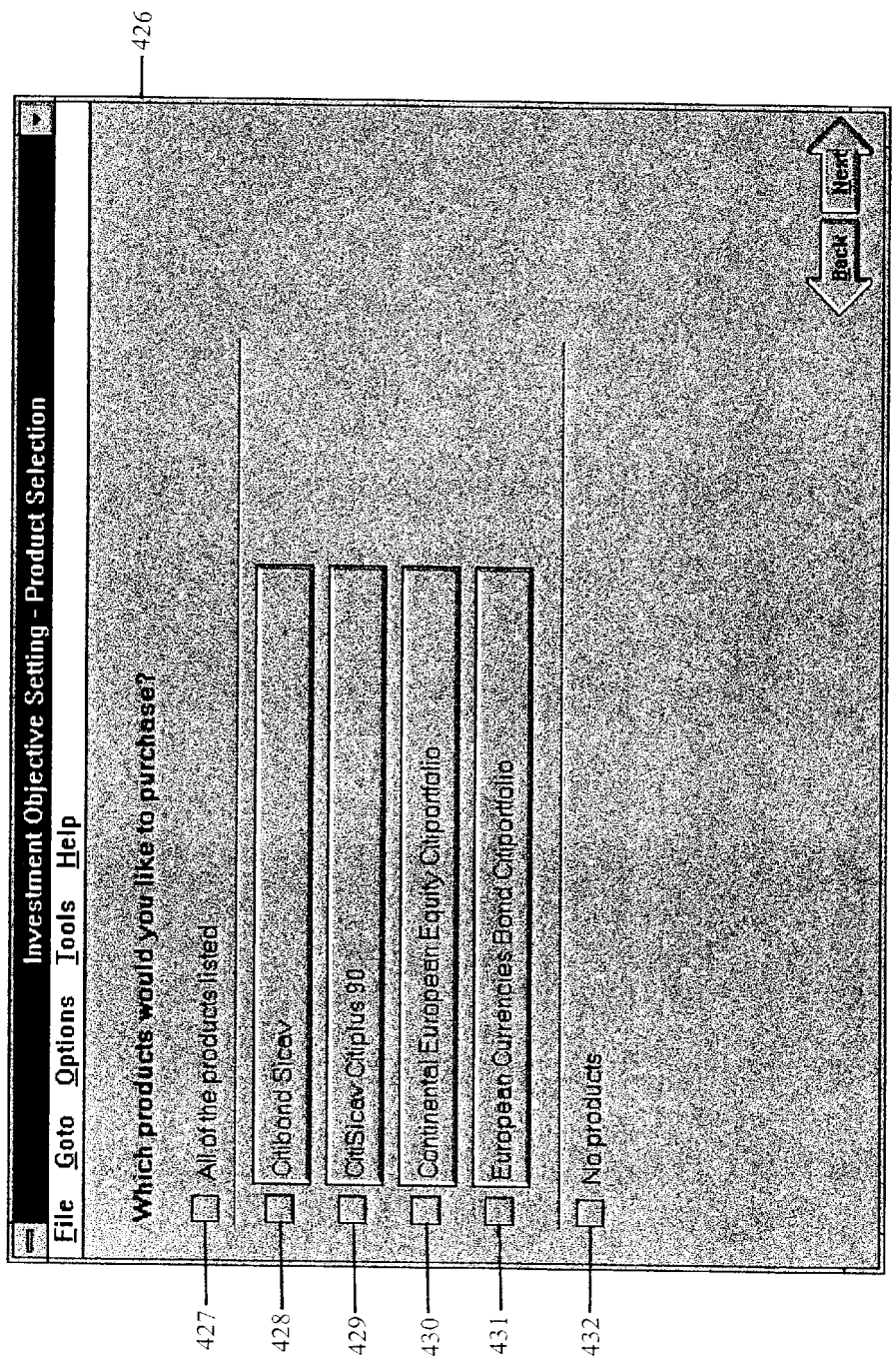
FIG. 65 is a screen showing account setup information.

FIG. 65 contains an example product selection window 426, with choices to purchase All of the products listed 427, particular products listed 429–431, or No products 432.

Figure 66:
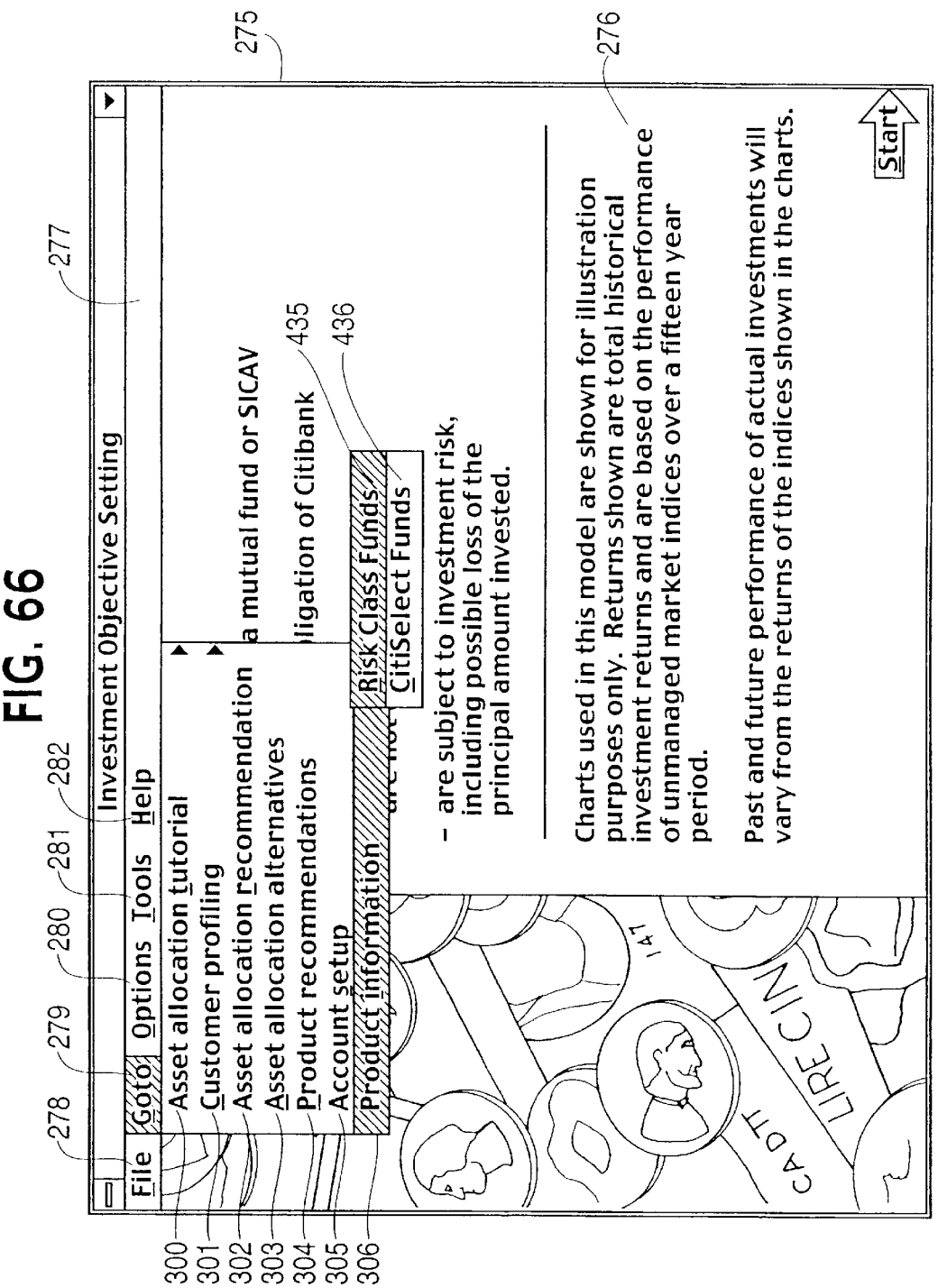
FIG. 66 is a screen illustrating the Goto pulldown menu, Product information submenu.
Figure 67:
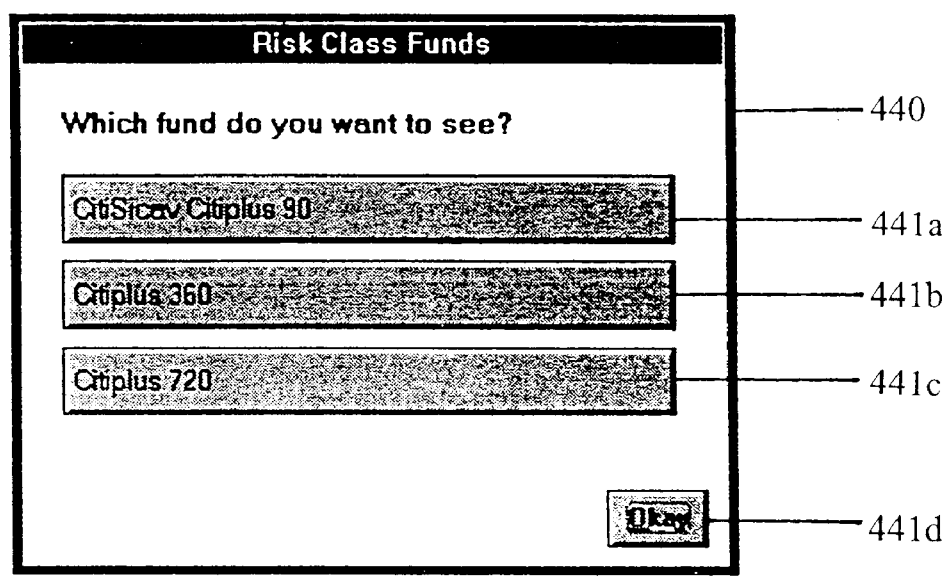
FIG. 67 is a pop-up window for the RiskClass Funds menu selection.
Figure 68:
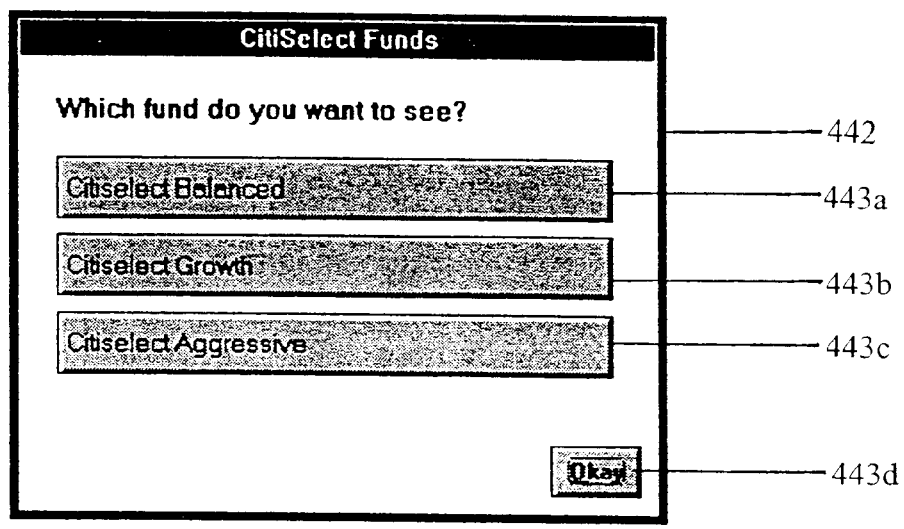
FIG. 68 is a pop-up window for an investment example menu selection.

FIG. 66 contains the pulldown menu for Goto 279, showing the submenu for product information 306. This submenu includes Risk Class Funds 435 and CitiSelect Funds 436. Selecting Risk Class Funds 435 by the user results in a pop-up window 440, shown in FIG. 67. Within this pop-up window 440 are selections for "CitiSicav Citiplus 90" 441a, "Citiplus 360" 441b, and "Citiplus 720" 441c. Selecting "Okay" 441d returns the user to the previous screen 275 (FIG. 66). Similarly, selecting CitiSelect Funds 436 (FIG. 66), results in a pop-up window 442, shown in FIG. 68. Within this pop-up window 442 are selections for "Citiselect Balanced" 443a, "Citiselect Growth" 443b, and "Citiselect Aggressive" 443c. Selecting "Okay" 443d returns the user to the previous screen 275 (FIG. 66).

Figure 69:
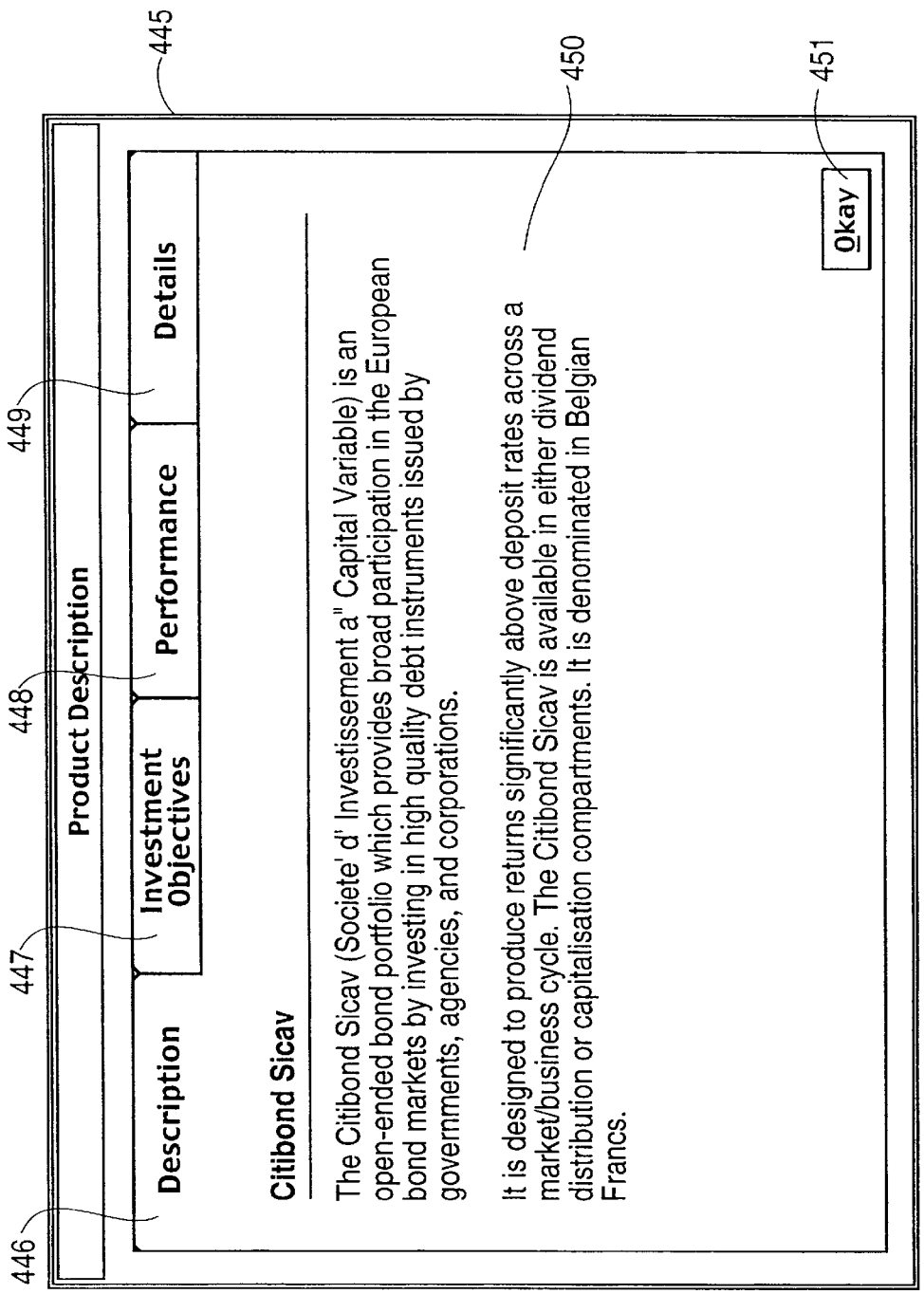
FIG. 69 is a pop-up window for a product information example.

If the user selects one of these options, a pop-up window appears providing more information. For example, selecting "CitiSicav Sitiplus 90" 441, produces the pop-up window 445, shown in FIG. 69. Tab/buttons appear for elements of the information provided on the product. These tabs include description 446, investment objectives 447, performance 448, and details. Selecting description 446 results in the description 450 appearing. Selecting the "Okay" button 451 returns the user to the pulldown menu shown in FIG. 66.

Figure 70:
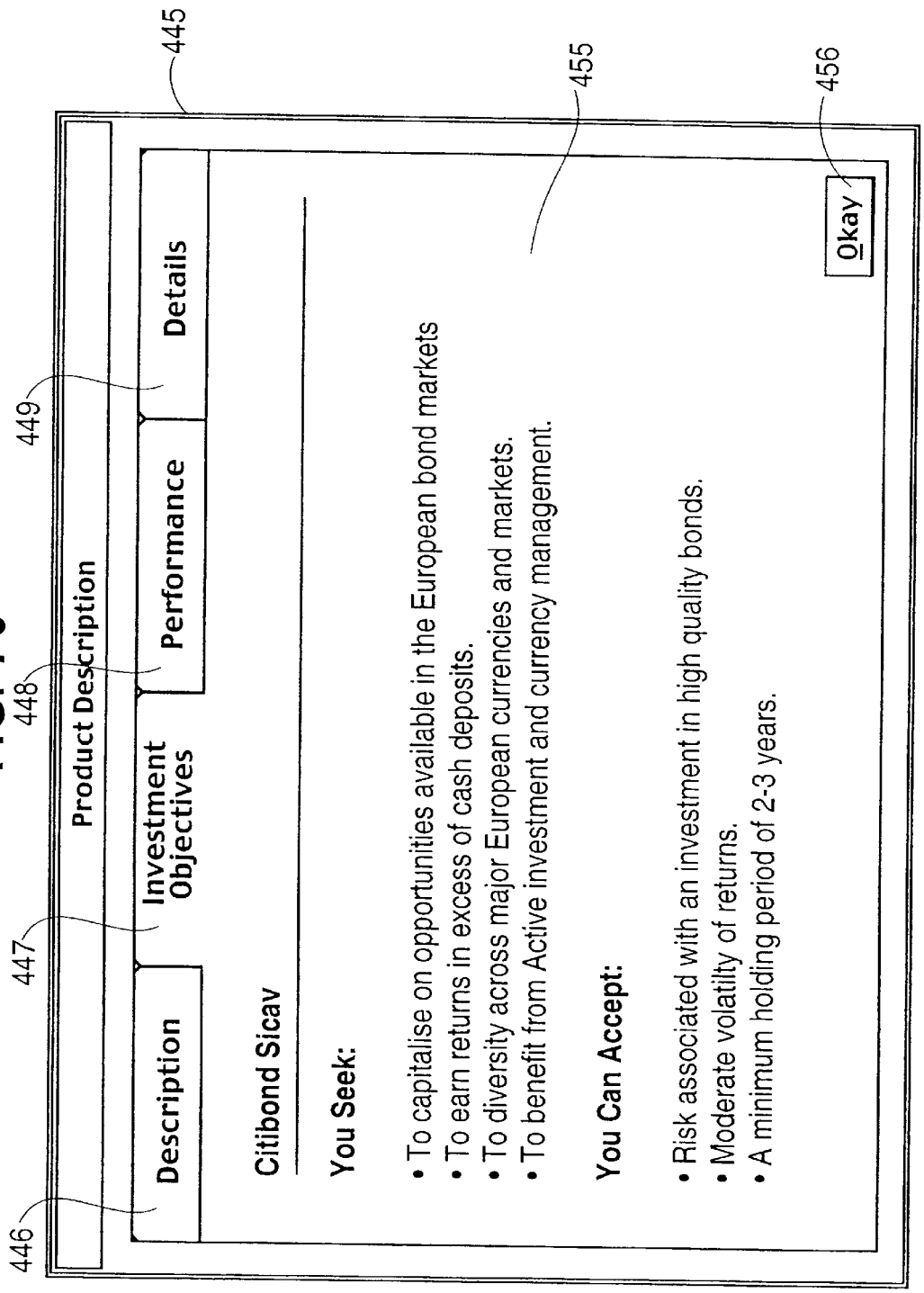
FIG. 70 is a screen showing investment objectives information.
Figure 71:
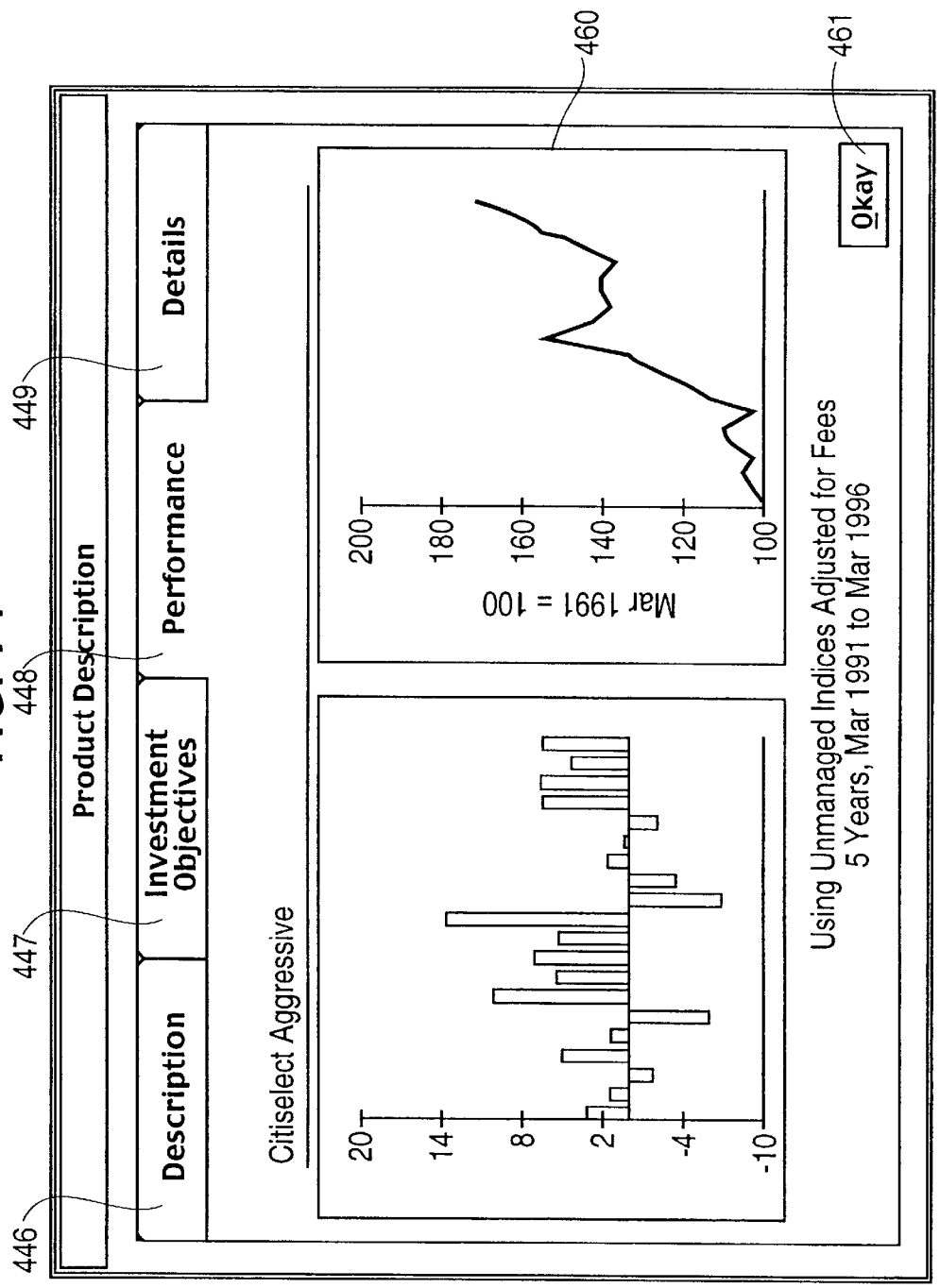
FIG. 71 is a screen containing graphical information for an Investment objective.
Figure 72:
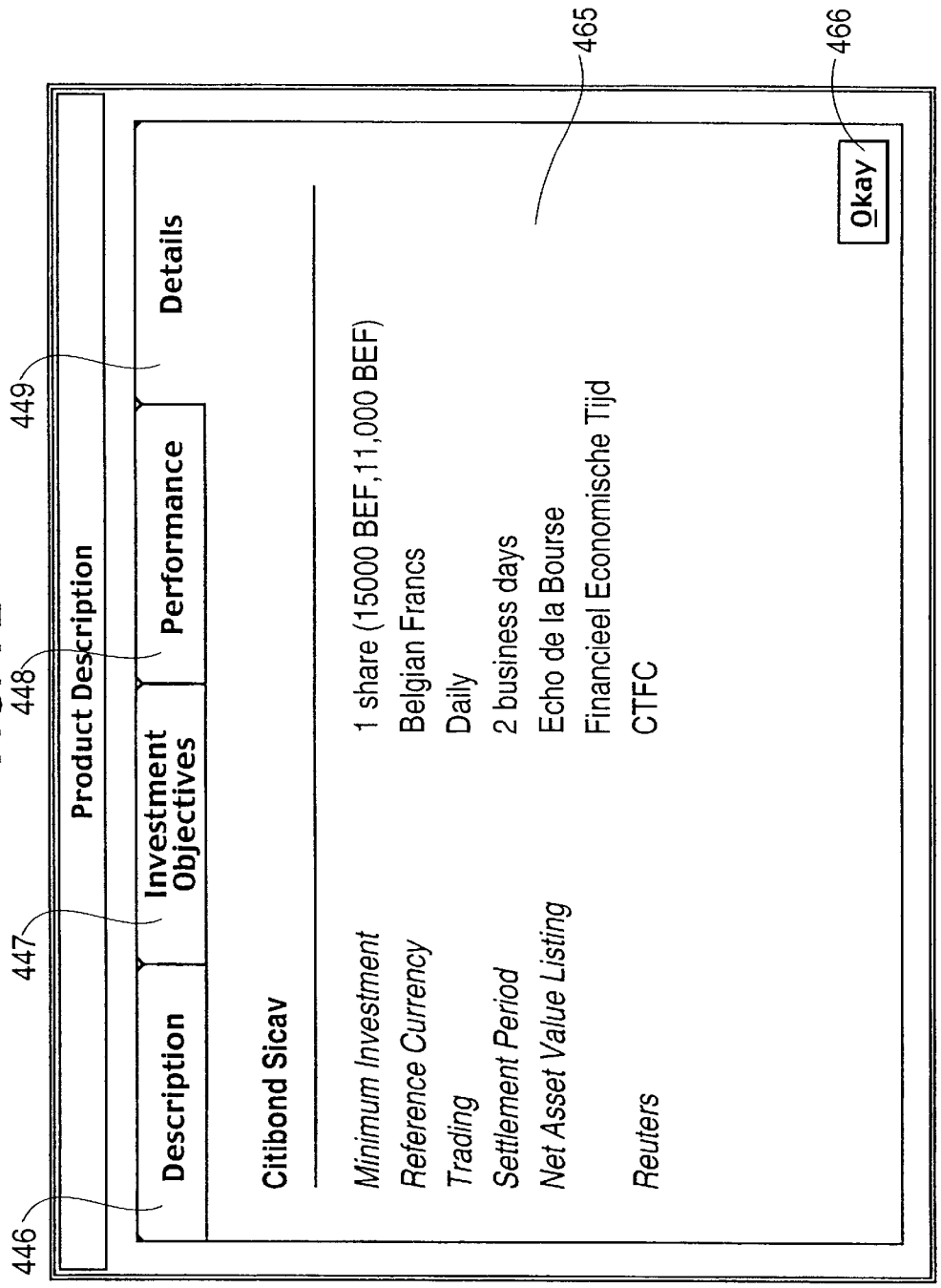
FIG. 72 is a screen of information on details for an Investment objective.

Selecting the tab for investment objectives 447 produces the window shown in FIG. 70, with text 455. Selecting the "Okay" button 456 returns the user to the pulldown menu shown in FIG. 66. Selecting the tab for performance 448, shown in FIG. 71, displays the graphics 460 associated with this tab. Selecting the "Okay" button 461 returns the user to the pulldown menu shown in FIG. 66. FIG. 72 shows the tab for details 449 and corresponding text 465. Selecting the "Okay" button 466 returns the user to the pulldown menu shown in FIG. 66.

Figure 73:
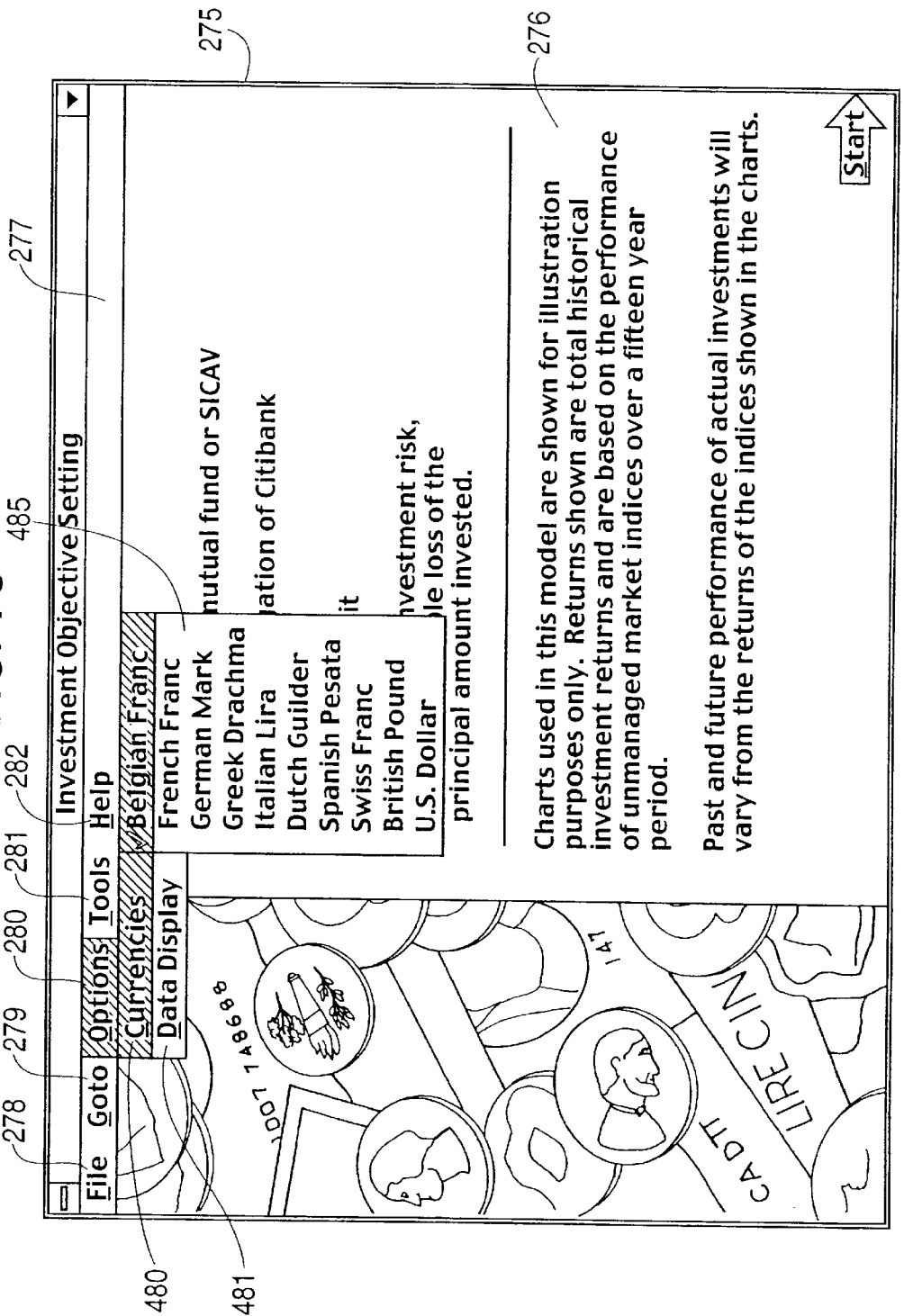
FIG. 73 is a screen containing the Options pulldown menu, submenu for currencies.
Figure 74:
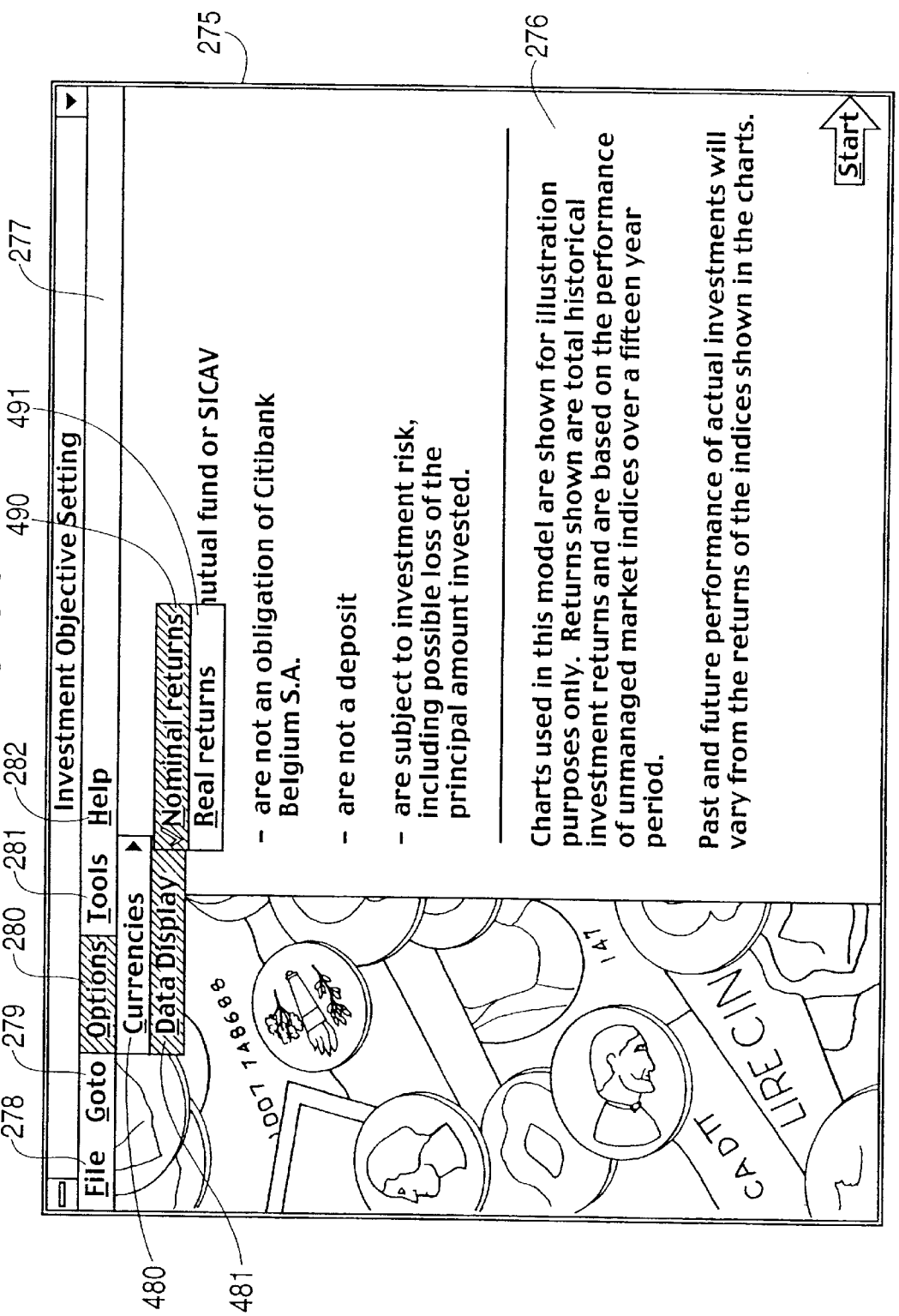
FIG. 74 is a screen containing the Options pulldown menu, submenu for Data display.

FIG. 73 illustrates the currencies 480 submenu 485. The default currency for the system is selected as shown in FIG. 73. FIG. 74 illustrates the data display 481 submenu. The submenu allows the user to select display type default of Nominal returns 490 or Real returns 491.

Figure 75:
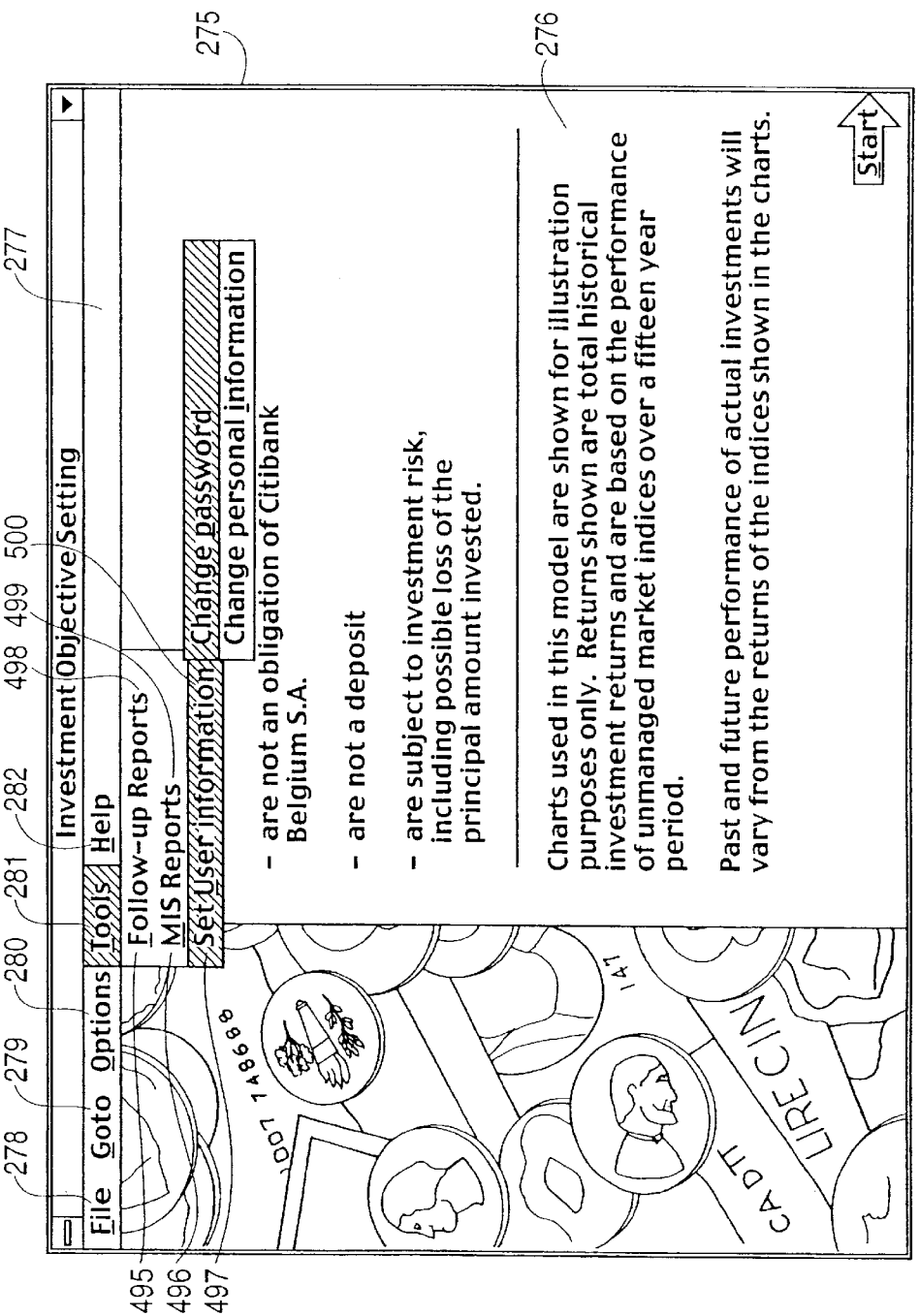
FIG. 75 is a screen containing the Tools pulldown menu, submenu selections.
Figure 76:
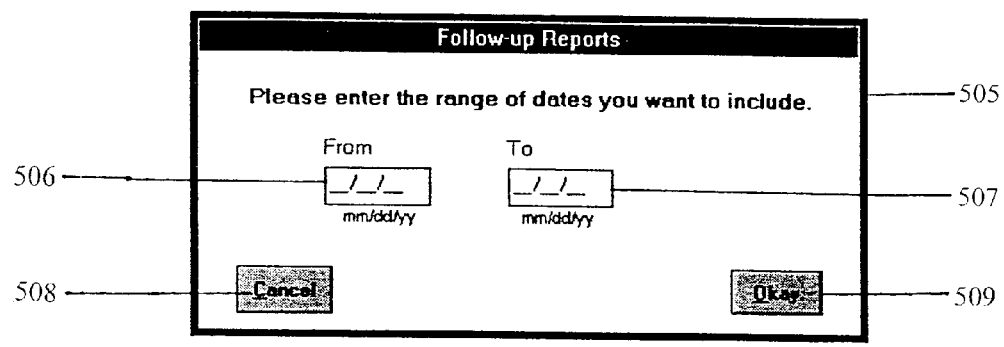
FIG. 76 is a pop-up window for the Follow-up Reports menu selection.

FIG. 75 illustrates the tools 281 submenu, which includes Follow-up Reports 495, MIS Reports 496, and Set User Information 497. Selecting Follow-up Reports 495, produces the pop-up screen 505 shown in FIG. 76. The pop-up screen 505 allows the user to input date ranges for reports using "From" 506 date and a "To" 507 date. The user may select the "Cancel" button 508 to cancel reports and the "Okay" button to return to the pulldown menu for tools 281 shown in FIG. 76.

Figure 77:
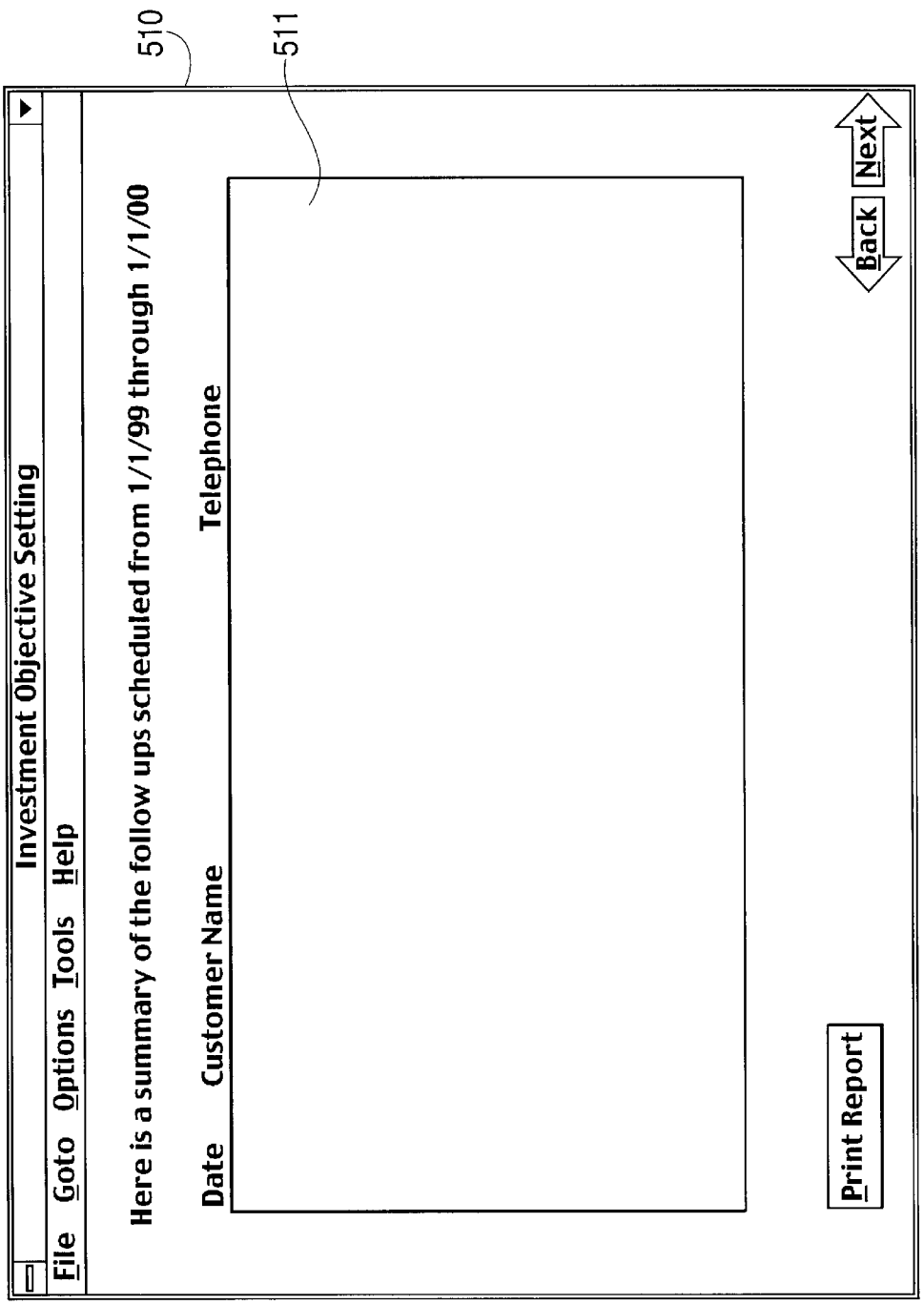
FIG. 77 is a screen for the Management Information System (MIS) reports information.

FIG. 77 contains an example pop-up input screen 510 for MIS reports. The screen 510 contains an input area 511 and a button 512 providing an option to Print Report. MIS reports contain all the data for the system, including a log of navigation. Data includes the number of times the utilized the program menu, what program menus the user selected, changes the user made to profiles, changes the user made to asset allocation recommendations, what products the user selected, and any notes the user added.

The business manager can examine this information to determine how the users are performing and how well the system corresponds to selling preferences.

Figure 78:
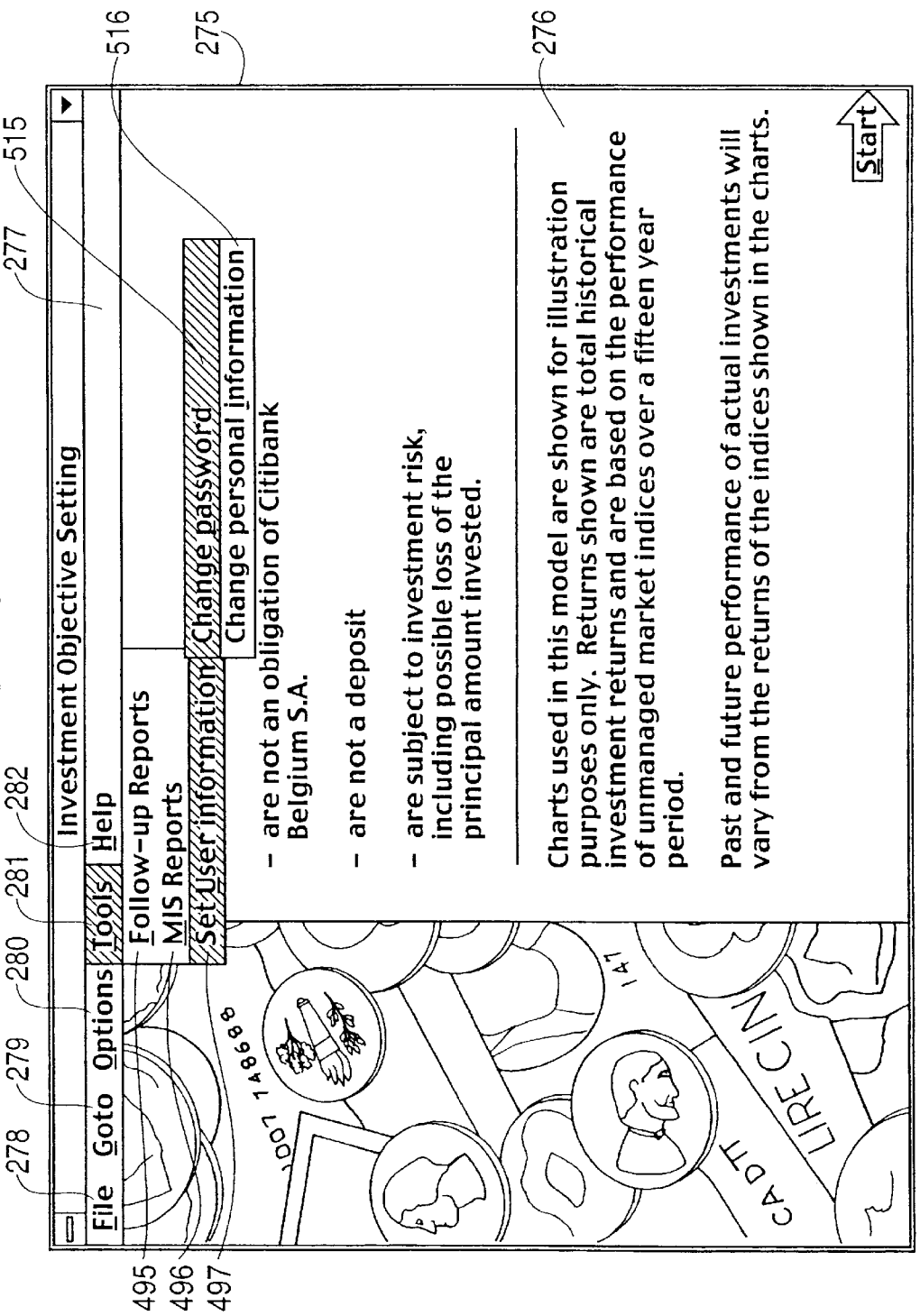
FIG. 78 is a screen illustrating the Tools pulldown menu, Set User information submenu.
Figure 79:
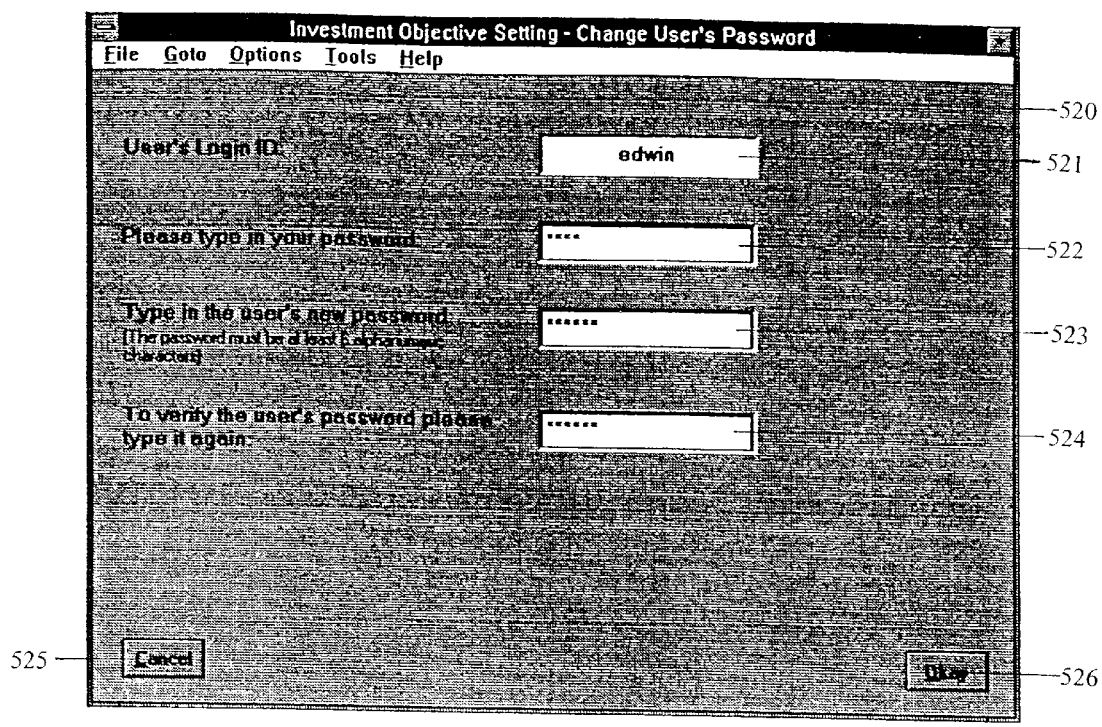
FIG. 79 is a screen for the Change password menu selection.

FIG. 78 illustrates the pulldown submenu for Set User information 497. The submenu choices are Change password 515 and Change personal information 516. Selecting Change password 515 produces the window 520 shown in FIG. 79. To change the customer's password, the user must enter the customer's login ID 521, current password 522, new password 523, and verification of new password 524.

Figure 80:
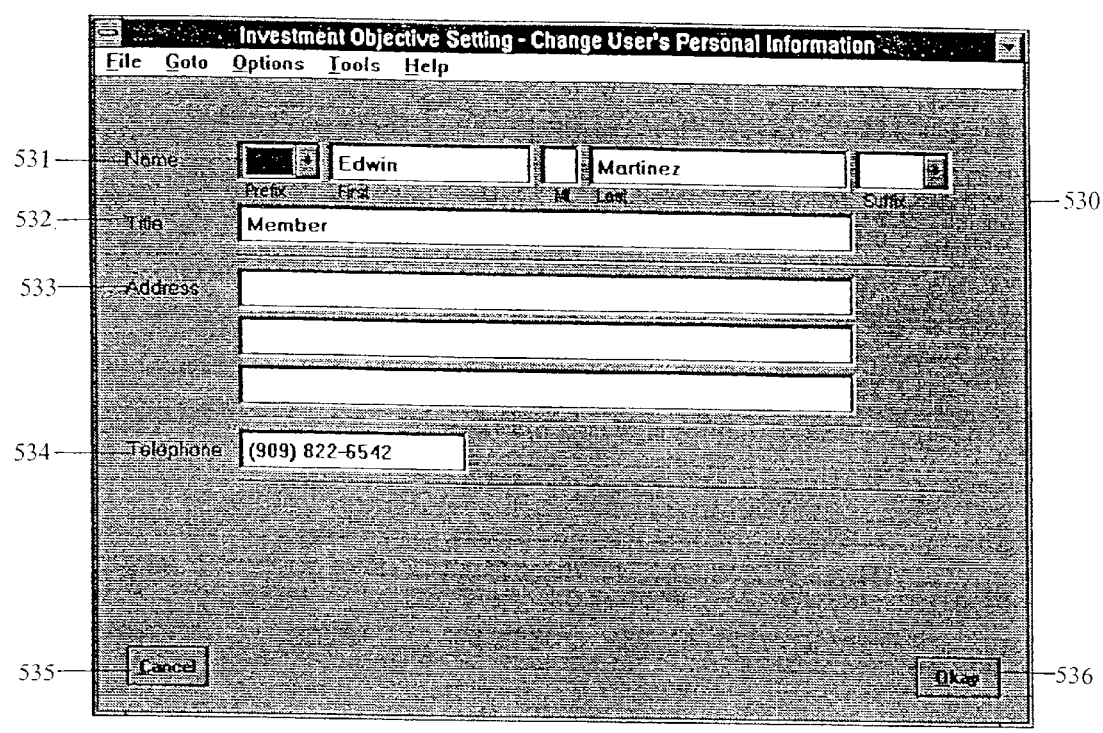
FIG. 80 is a screen for Change personal information.

Selecting Change personal information 516, as shown in FIG. 78, produces the window 530 shown in FIG. 80. The user may verify or change information regarding name 531, title 532, address 533, and telephone 534. The user may cancel changes using the "Cancel" button 535 or select "Okay" to return to the disclaimer page.

Figure 81:
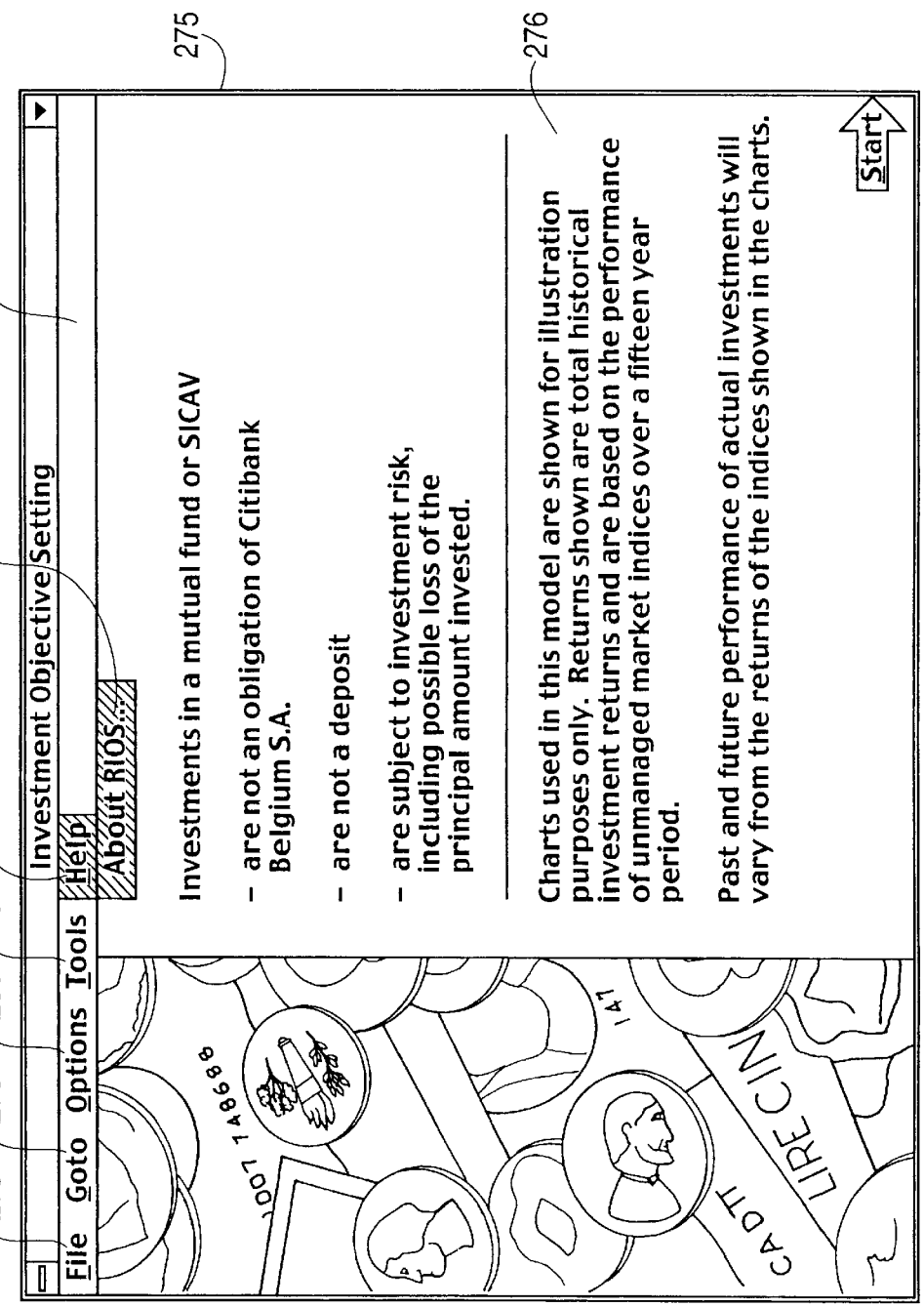
FIG. 81 is a screen illustrating the Help pulldown menu.

FIG. 81 shows the Help 282 pulldown menu. The only selection the user may make within this menu is About RIOS . . . 540. Selecting this option produces the pop-up screen 545, providing information on the system. The user may select the "Okay" button 546 to return to the disclaimer page.

An embodiment of the present invention includes a tutorial aspect intended to assist an account representative, through interactive visual aids, with explaining or clarifying user questions.

The tutorial is available via the program menu. It consists of a series of five screens that the user can access as visual aids to emphasize points, explain the relationship between risk and return, explain the benefit of diversification, explain why it is important to invest in the long-term, and explain standard deviations. The user can call up any one of these screens. A next/back is included on each screen that allows the user to return to where the user was in the system after the user has completed review of that particular screen.

Figure 82:
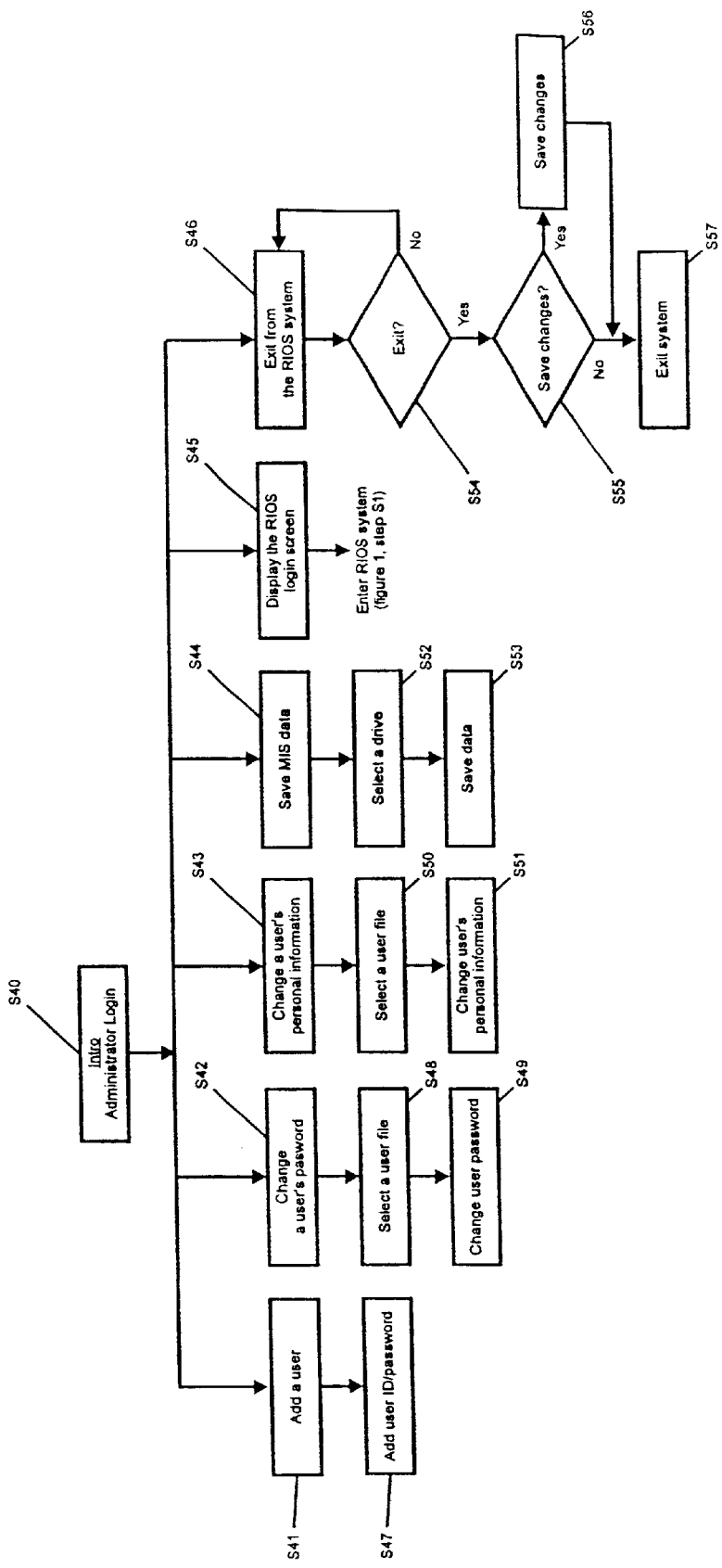
FIG. 82 contains a block diagram of an embodiment for system administration functions of the present invention.
Figure 83:
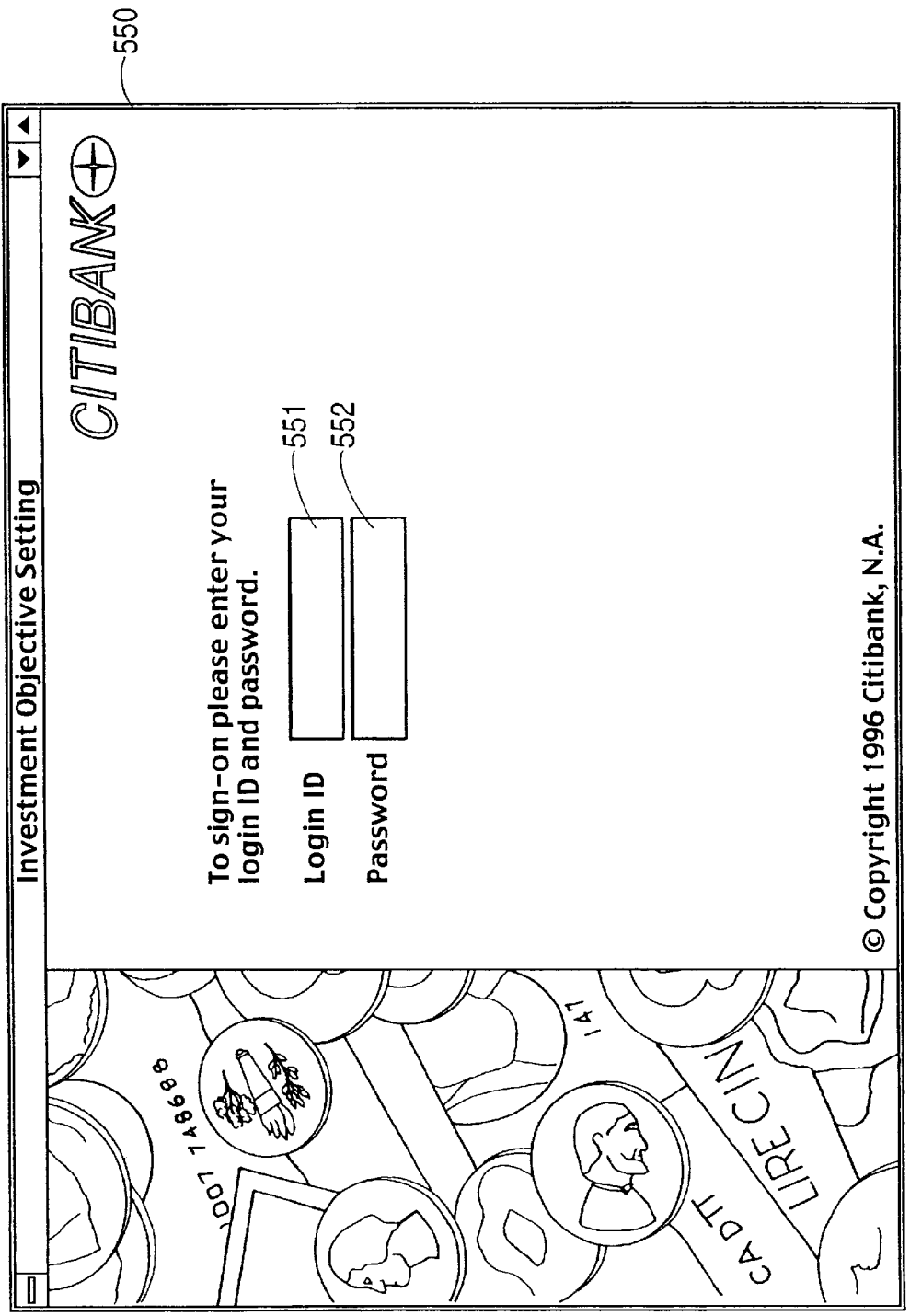
FIG. 83 is a screen containing administrator sign-on information.

The system administration portion of the system allows the system manager to update products and performance information. FIG. 82 contains flow diagrams of the method and system of an embodiment of the present invention with a system administration feature. FIGS. 85 through 92 show the screens for an embodiment of the present invention, corresponding to many of the steps contained in FIG. 82. In FIG. 82, step S40, the administrator signs-on to the system. As shown in FIG. 83, this sign-on occurs within a window 550 and includes areas for providing login ID information 551 and password 552 for the system administrator. The system contains a verification step for failure to enter a valid password, allowing up to three tries.

Figure 84:
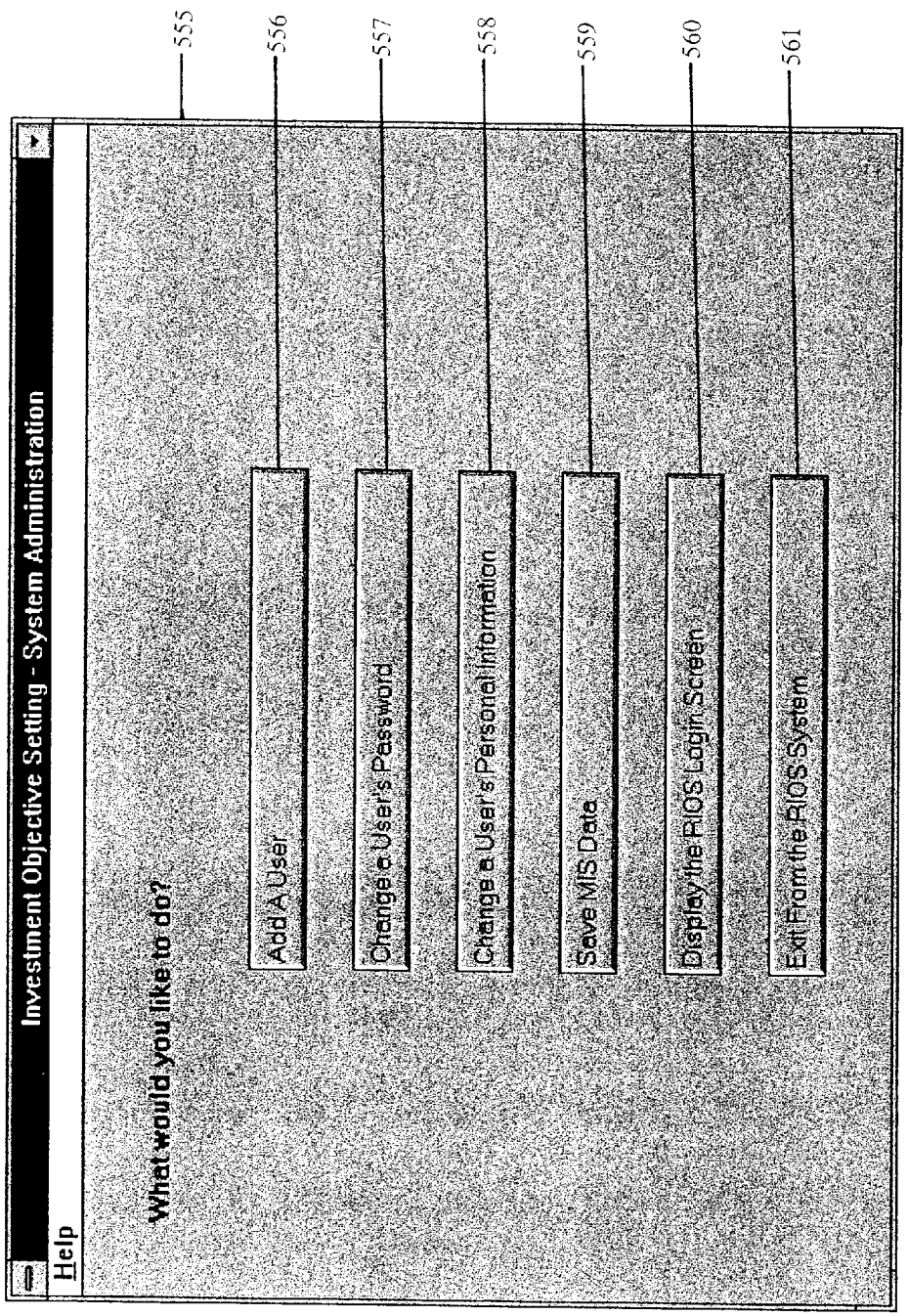
FIG. 84 is a screen containing the administrator options.

The system administrator then has a choice between six options, shown as steps S41 through S46 in FIG. 82. As shown in FIG. 84, these options are presented within a window 555, and include Add A User 556, Change a User's Password 557, Change a User's Personal Information 558, Save MIS Data 559, Display the RIOS Login Screen 560, and Exit From the RIOS System 561.

Figure 85:
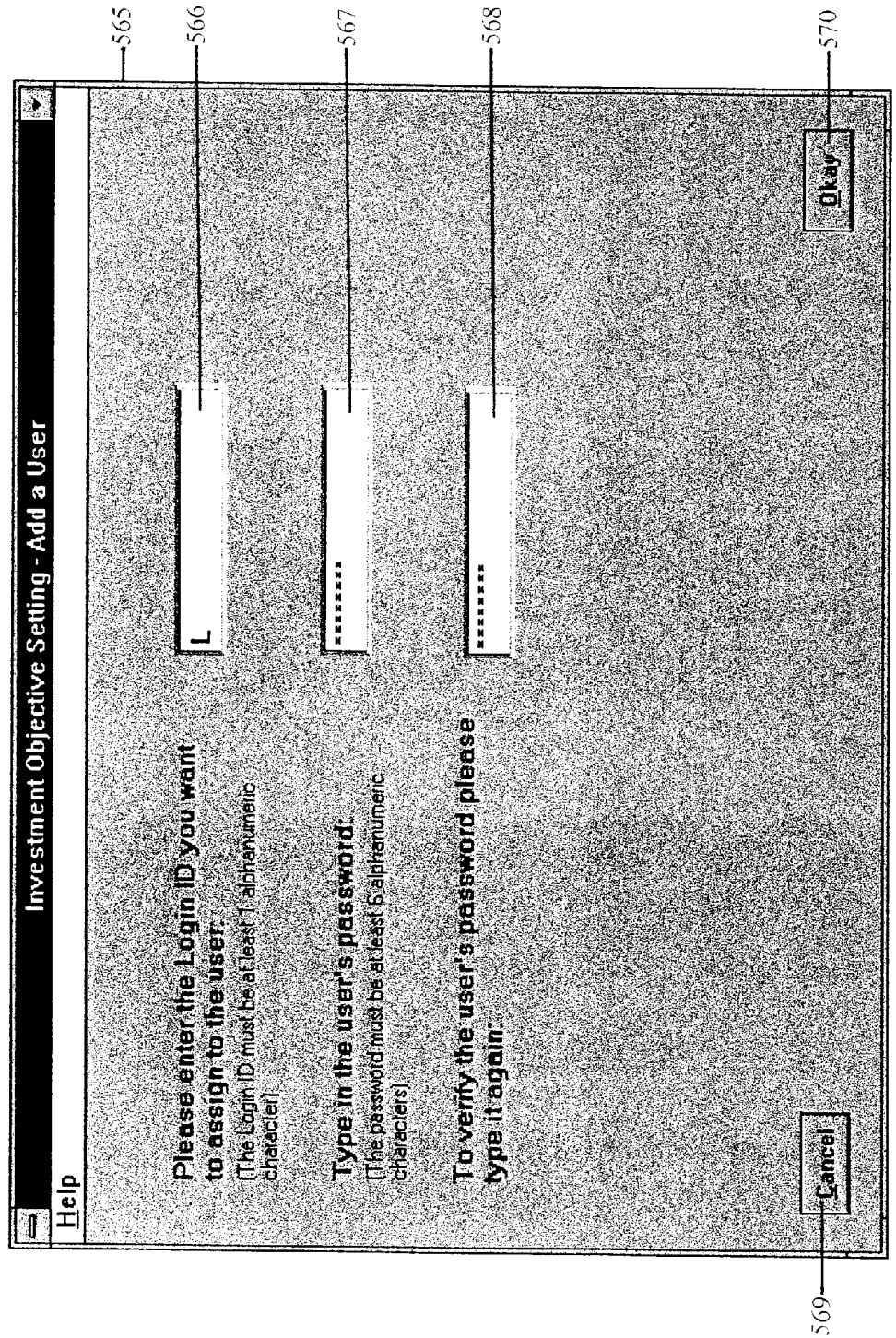
FIG. 85 is a screen for system administration Add user ID/password.

If the system administrator selects Add a User 556 (FIG. 84), the system proceeds to the step of Add user ID/password S47 of FIG. 82. As shown in FIG. 85 the system proceeds to a window 565. The administrator must enter a login name 566 to assign, a password 567, and verification of the password 568 to make the addition. The addition may be canceled 569, or accepted 570.

Figure 86:
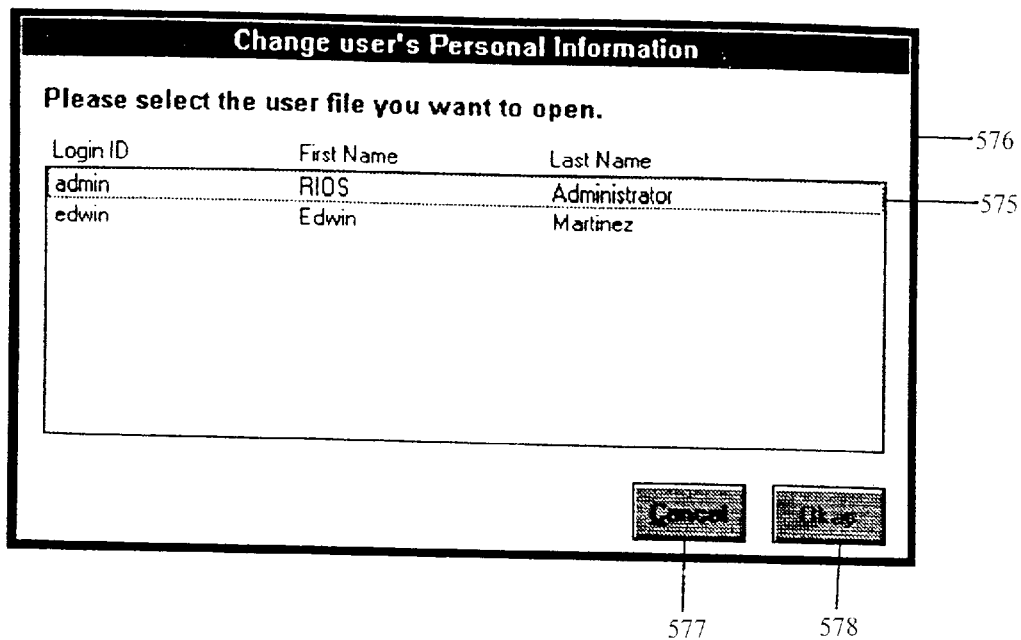
FIG. 86 is a screen for system administration user file list for selection.
Figure 87:
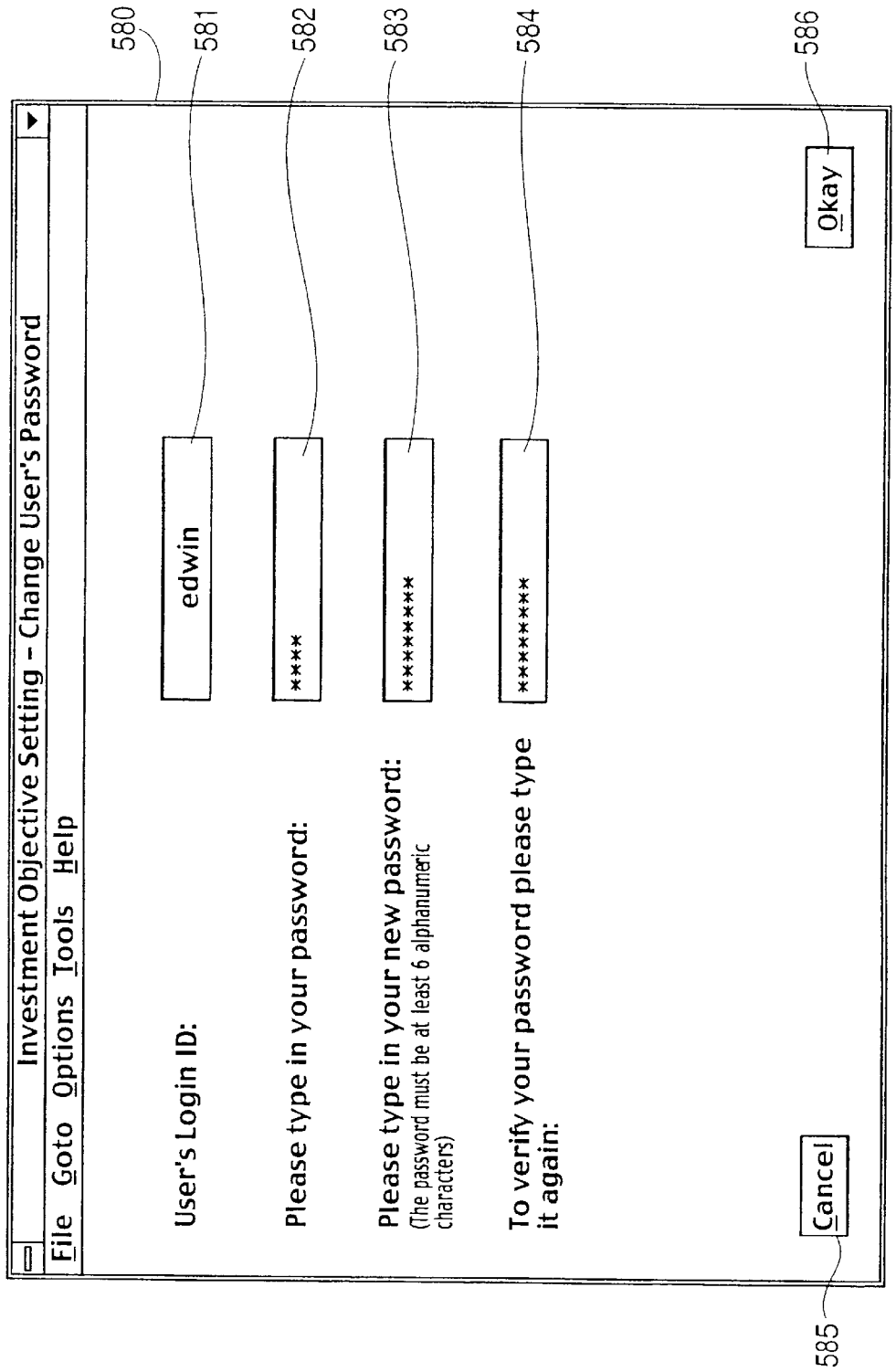
FIG. 87 is a screen for system administration Change user password.

If the system administrator selects Change a User's Password 557 (FIG. 84), the system proceeds to the step of add Select a user file S48 of FIG. 82. As shown in FIG. 86 the system proceeds to a window 575. The administrator selects a user file from the list of user files 576 to change a password. The selection may be canceled 577, or accepted 578. Once a user file is accepted 578 (FIG. 86), the system proceeds to the step of Change user password S49 of FIG. 82. As shown in FIG. 87 the system proceeds to a window 580. The system administrator must enter the user's name 581, the system administrator's password 582, the user's new password 583, and a verification of the new user's password 584 to make the change. The change may be canceled 585 or accepted 586.

Figure 88:
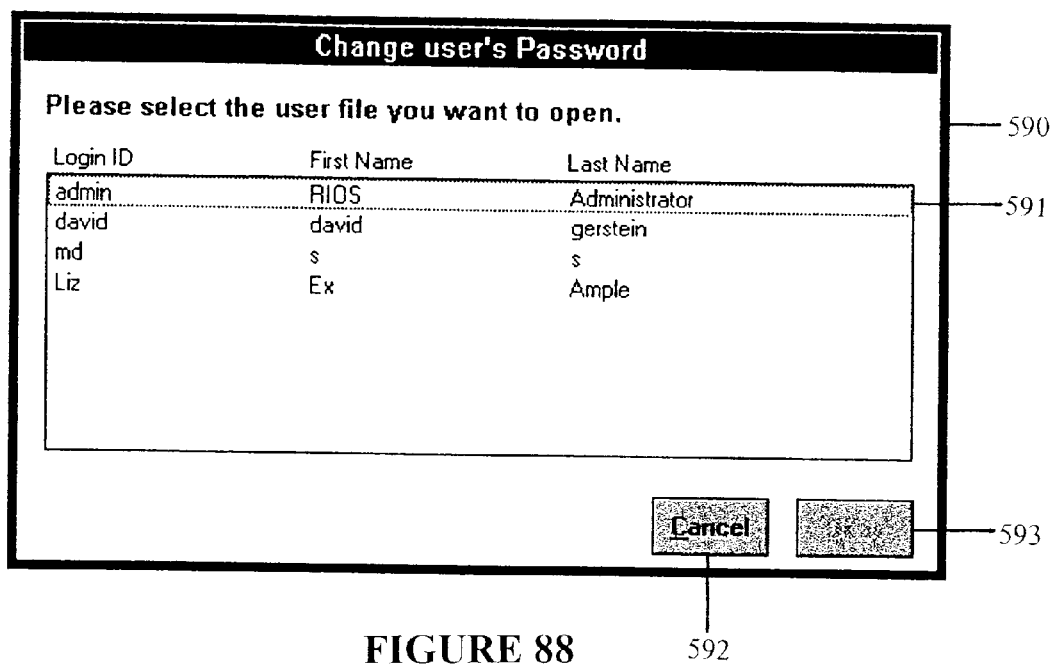
FIG. 88 is a screen for system administrator selection of a file for Change a User's Personal Information.
Figure 89:
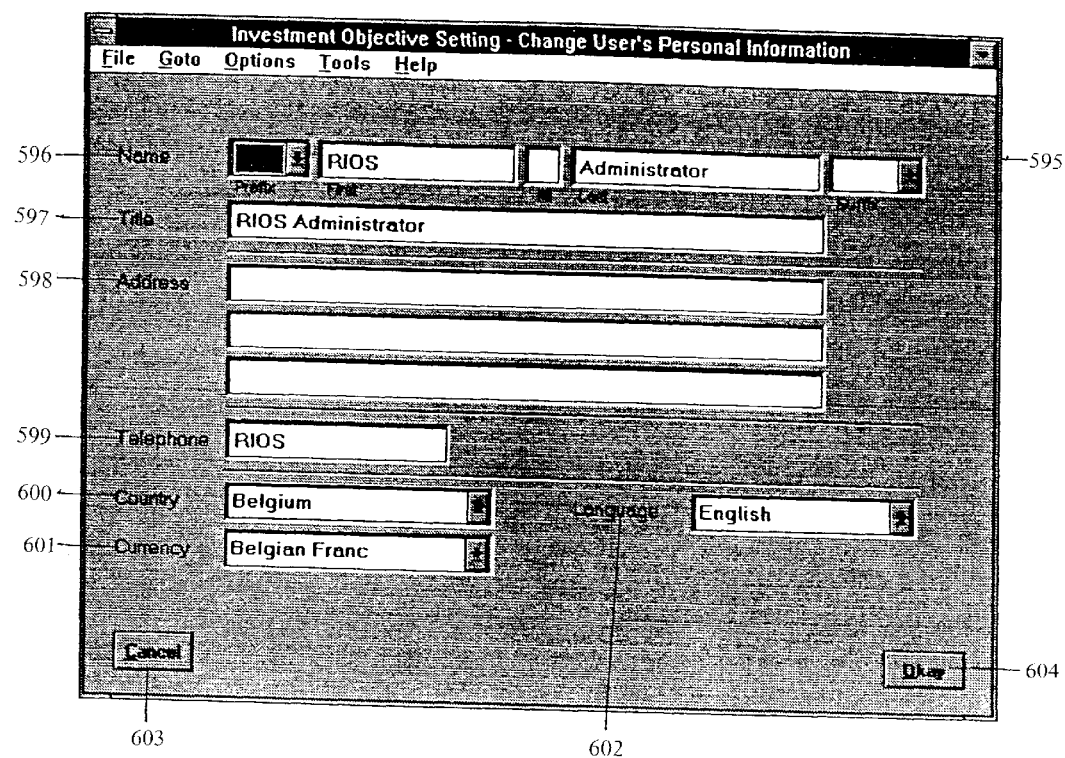
FIG. 89 is a screen for changing a user's personal information.

If the system administrator selects Change a User's Personal Information 558 (FIG. 84), the system proceeds to the step of Select a user file S48 of FIG. 82. As shown in FIG. 88 the system proceeds to a window 590. The administrator selects a user file from the list of user files 592 to make a change. The selection may be canceled 592, or accepted 593. Once a user file is accepted 593 (FIG. 88), the system proceeds to the step of Change user's personal information S51 of FIG. 82. As shown in FIG. 89 the system proceeds to a window 595. The system administrator may alter the user's name 596, title 597, address 598, telephone number 599, country 600, currency default 601, or language default 601. Any changes may be canceled 603 or accepted 604.

Figure 90:
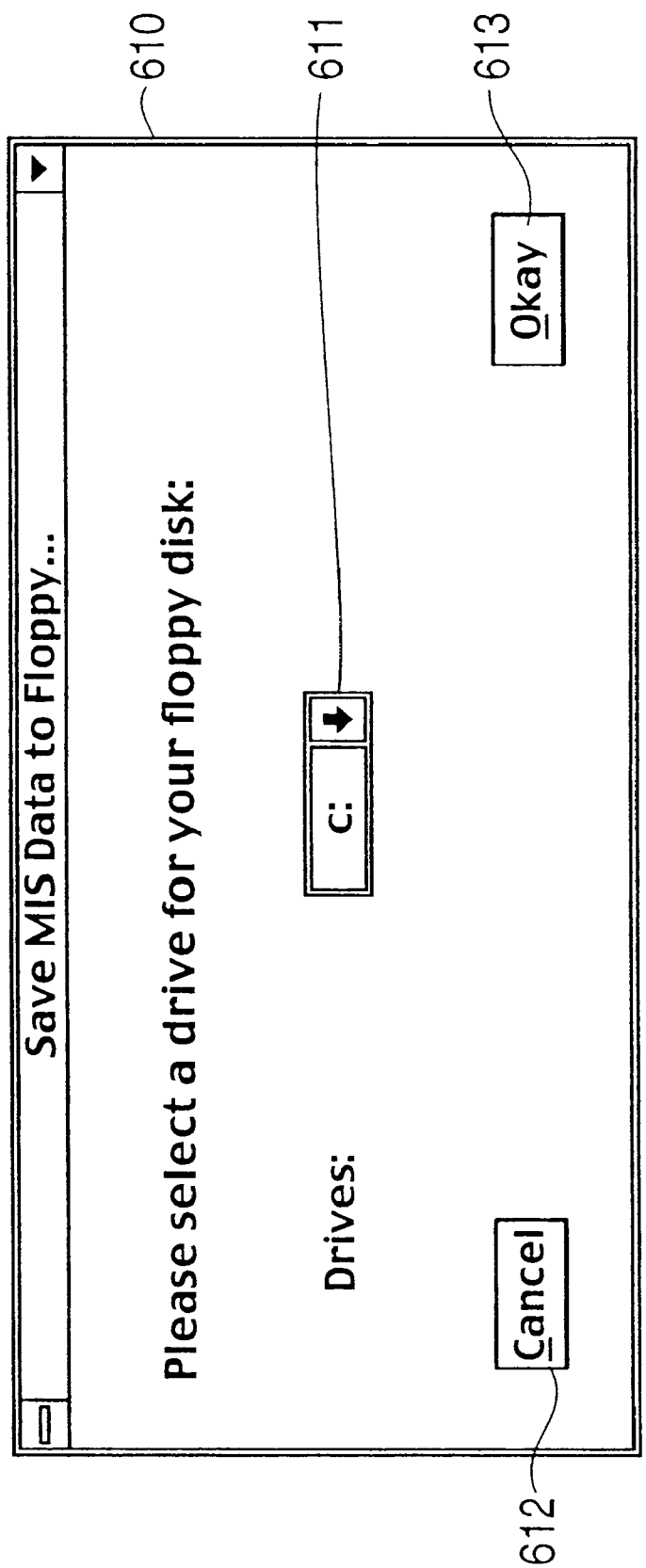
FIG. 90 is a screen for system administrator Save MIS Data.

If the system administrator selects Save MIS Data 559 (FIG. 84), the system proceeds to the step of Select a drive S52 of FIG. 82. As shown in FIG. 90 the system proceeds to a window 610. The administrator selects a drive 611 to which the save is made. The selection may be canceled 612, or accepted 613. The system then saves the data S53 of FIG. 82.

If the system administrator selects Display the RIOS Login Screen 560 (FIG. 84), the system proceeds to the step of entering the system. The login screen 1 is shown in FIG. 7. The administrator may then enter the system as a user does.

If the system administrator selects Exit the RIOS System 561 (FIG. 84), the system proceeds to the step of confirming that the system administrator wants to exit S54 (FIG.82). If the system administrator replies negatively, the system returns to the menu choices shown in window 555 of FIG. 84. If the system administrator confirms the exit, the system proceeds to the step of asking whether the system administrator wants to save changes S55 (FIG. 82). For this step, a pop-up window appears 295 of FIG. 44. If the system administrator chooses to save, the system proceeds to save changes S56 of FIG. 82. The system administrator then exits the system S57.

In an embodiment of the present invention, the investment recommendations that are generated by the system are systematically made to be appropriate for each customer's investment goals. The process follows several basic principles and employs a decision table as the method for determining the asset allocation recommendation.

In an embodiment of the present invention, all customers are asked for the same information:

| | |
|---|---|
| Personal information | Name (Entry required) |
| | Customer ID (Entry required) |
| | Address |
| | Telephone |
| | Citizenship (Entry required) |
| | Reference currency (Entry required) |
| | Date of Birth |
| Financial information | Investable assets |
| (No entry required) |     Cash and Equivalents |
| |     Fixed income |
| |     Equities |
| |     Mixed |
| Investment profile | Investment amount |
| | Financial capacity |
| | Income need |
| | Time frame |
| | Risk/return preferences |
| | Staying power |
| | Investment experience |

Responses are required only to those items which are necessary to the decision process. The amount of a customer's investment is not the sole differentiator for product recommendations.

In an embodiment of the present invention, responses to the profiling are assigned scores, which are then used to profile responses using a lookup table. The total of all the numbers assigned results in a rating. This rating gives points of risk, return, and liquidity, which are distributed among several asset allocations—each allocation has multiple gradations of aggressiveness. Ratings within an asset allocation will point to more aggressive (or more conservative) products within the tolerance limits of the asset allocation. Both the asset allocation and the products appropriate to implement the allocation can be determined using this rating.

The rating obtained will point to one of several asset allocations ranging from the most conservative to most aggressive. Customers can accept this initial recommendation, as described above, or study and select from the alternative allocations. Once a customer has chosen to review alternative asset allocations, the asset allocation that is eventually chosen by the customer is identified by the system as having been "selected" by the customer rather than recommended, even if the initial allocation is the one selected.

In an embodiment of the present invention, for each allocation, a portfolio product, which has the appropriate characteristics, is offered. The match of asset allocations and products also occurs by use of a lookup table.

What is claimed is:

1. A computer-implemented method for assisting an investor with investment decisions, comprising:

receiving investor personal profile information, comprising personal data and financial data, wherein the financial data comprises investor asset information comprising a total amount of assets, a current allocation of the plurality of assets and a designation of a reference currency of a country in which the method is being utilized, wherein the reference currency is selected from a plurality of currencies;

receiving an investor-determined total amount to invest representing at least a portion of the total amount of assets;

receiving one or more investor-determined investment goals from the investor;

receiving an investor-determined investment amount, representing an allocation of the total amount to invest, for each of the one or more investment goals;

receiving an investor-determined investment time horizon for each of the one or more investment goals;

receiving an investor-determined risk/return relationship, representing a potential investment outcome and selected from a plurality of risk/return relationships that vary by the selected reference currency, for each of the one or more investment goals;

receiving an investor-determined level of staying power, representing a willingness to maintain the investment amount, for each of the one or more investment goals, if the investment time horizon is greater than or equal to a predetermined short-term time period or if the risk/return relationship is more risky than a predetermined level of risk/return relationship;

receiving an investor-determined level of investment experience indicating the investor's knowledge about investments;

matching via a computer the received investor-determined inputs with a plurality of predetermined portfolio options stored in a decision table in the computer to determine an initial recommended portfolio for each of the one or more investment goals, wherein the initial recommended portfolio comprises an initial recommended asset allocation among a plurality of asset categories based on the reference currency, wherein the plurality of predetermined portfolio options comprise at least one set of options for each of the plurality of currencies, wherein the at least one set of options each comprise a range of alternatives within each of the plurality of asset categories each correlated with at least one level of the investor-determined inputs; and communicating the initial recommended portfolio to the investor to aid the investor in making investment decisions.

2. The method of claim 1, further comprising:

receiving an investor-determined level of comfort with the initial recommended portfolio, where the level of comfort is one of either comfortable or not comfortable;

matching via the computer, if the level of comfort is not comfortable, the received investor-determined inputs with the plurality of predetermined portfolio options to determine an alternate recommended portfolio for each of the one or more investment goals, wherein the alternate recommended portfolio differs from the initial recommended portfolio and comprises an alternate recommended asset allocation among the plurality of asset categories based on the selected reference currency; and communicating the alternate recommended portfolio to the investor to aid the investor in making investment decisions.

3. The method of claim 2, further comprising:

comparing and communicating to the investor an investor-selected one of the initial recommended portfolio or the alternate recommended portfolio with the current allocation of assets; and comparing and communicating to the investor the initial recommended portfolio and the alternate recommended portfolio to aid the investor in making investment decisions.

4. The method of claim 1, further comprising:

recommending to the investor at least one of a plurality of specific investment products within each asset category of the initial recommended portfolio for each of the one or more investment goals, wherein the plurality of specific investment products varies depending on the reference currency;

receiving an investor-determined selection of one of the plurality of specific investment products within each asset category of the initial recommended portfolio for each of the one or more investment goals; and purchasing the investor-determined selection of one of the plurality of specific investment products within each asset category of the initial recommended portfolio for each of the one or more investment goals.

5. The method of claim 1, wherein matching the received investor-determined inputs with the plurality of predetermined portfolio options comprises:

categorizing the investment amount into a first numeric factor;

categorizing the level of investment experience into a second numeric factor;

categorizing the investment time horizon into a third numeric factor;

categorizing desired level of risk/return into a fourth numeric factor;

categorizing level of staying power into a fifth numeric factor;

summing the numeric factors; and categorizing the sum of numeric factors in order to determine of the initial recommended investment portfolio from the plurality of predetermined portfolio options.

6. The method of claim 5, further comprising:

referring to an entry in the decision table associated with each of the numeric factors in order to guide the asset allocation for determination of the initial recommended investment portfolio.

7. The method of claim 5, further comprising applying a set of rules to each investor-determined input in order to categorize each investor-determined input into a numerical factor.

8. The method of claim 1, further comprising:

receiving an input to determine whether the investor is a first time user in order to provide an abbreviated method for assisting the investor with investment decisions; and communicating a revised recommended portfolio to the investor, if the investor is a non-first time user, the revised recommended portfolio determined by:

receiving at least one revised investor-determined input in place of a corresponding one of the initially-received investor-determined inputs; and matching via the computer a combination of the revised investor-determined inputs and the initially-received investor-determined inputs with the plurality of predetermined portfolio options stored in the decision table of the computer.

9. The method of claim 8, further comprising creating and maintaining a file of information for the investor.

10. The method of claim 9, further comprising retrieving the previously developed file of information for the investor upon receiving the input that the investor is a non-first time user.

11. The method of claim 1, further comprising:

receiving an investor-determined level of income needed; and receiving and investor-determined amount and time for additional income to be added to the investor-determined total amount to invest.

12. The method of claim 1, further comprising providing a tutorial for the investor.

13. The method of claim 1, further comprising:

receiving an investor-determined indication of a negative investment experience;

receiving investor-determined additional information regarding the negative investment experience; and modifying the initial recommended portfolio based on the negative investment experience.

14. The method of claim 1, further comprising:

receiving an investor-determined level of comfort with the initial recommended portfolio;

receiving additional information regarding a lack of comfort with the initial recommended portfolio; and altering the initial recommended portfolio based on the investor-determined level of comfort.

15. The method of claim 1, further comprising displaying information specific to a particular country based on the selection of the reference currency.

16. The method of claim 15, wherein the information specific to a particular country comprises multiple market and instruments data, and presentation of information in the native language of the the country of the reference currency.

17. The method of claim 1, wherein communicating the initial recommended portfolio comprises displaying charts, graphs, tables, and alphanumeric information.

18. A computer-implemented method for assisting an investor with investment decisions, comprising:

receiving investor personal profile information, comprising personal data and financial data, wherein the financial data comprises investor asset information comprising a total amount of assets, a current allocation of the plurality of assets and a designation of a reference currency of a country in which the method is being utilized, wherein the reference currency is selected from a plurality of currencies;

receiving an investor-determined total amount to invest representing at least a portion of the total amount of assets;

receiving one or more investor-determined investment goals from the investor;

receiving an investor-determined investment amount, representing an allocation of the total amount to invest, for each of the one or more investment goals;

receiving an investor-determined investment time horizon for each of the one or more investment goals;

receiving an investor-determined risk/return relationship, representing a potential investment outcome and selected from a plurality of risk/return relationships that vary by the selected reference currency, for each of the one or more investment goals;

receiving an investor-determined level of staying power, representing a willingness to maintain the investment amount, for each of the one or more investment goals, if the investment time horizon is greater than or equal to a predetermined short-term time period or if the risk/return relationship is more risky than a predetermined level of risk/return relationship;

receiving an investor-determined level of investment experience indicating the investor's knowledge about investments;

matching via a computer the received investor-determined inputs with a plurality of predetermined portfolio options stored in a decision table in the computer to determine an initial recommended portfolio for each of the one or more investment goals, wherein the initial recommended portfolio comprises an initial recommended asset allocation among a plurality of asset categories, wherein the initial recommended portfolio varies depending on the reference currency;

communicating the initial recommended portfolio to the investor to aid the investor in making investment decisions;

recommending to the investor at least one of a plurality of specific investment products within each asset category of the initial recommended portfolio for each of the one or more investment goals, wherein the plurality of specific investment products varies depending on the reference currency;

receiving an investor-determined selection of one of the plurality of specific investment products within each asset category of the initial recommended portfolio or the alternate recommended portfolio for each of the one or more investment goals; and purchasing the investor-determined selection of one of the plurality of specific investment products within each asset category of the initial recommended portfolio or the alternate recommended portfolio for each of the one or more investment goals.

19. The method of claim 18, further comprising:

receiving an investor-determined level of comfort with the initial recommended portfolio, where the level of comfort is one of either comfortable or not comfortable;

matching via the computer, if the level of comfort is not comfortable, the received investor-determined inputs with the plurality of predetermined portfolio options to determine an alternate recommended portfolio for each of the one or more investment goals, wherein the alternate recommended portfolio differs from the initial recommended portfolio and comprises an alternate recommended asset allocation among the plurality of asset categories, wherein the alternate recommended portfolio varies depending on the reference currency; and communicating the alternate recommended portfolio to the investor to aid the investor in making investment decisions.

20. The method of claim 19, further comprising:

comparing and communicating to the investor an investor-selected one of the initial recommended portfolio or the alternate recommended portfolio with the current allocation of assets; and comparing and communicating to the investor the initial recommended portfolio and the alternate recommended portfolio to aid the investor in making investment decisions.

21. The method of claim 20, further comprising:

recommending to the investor at least one of a plurality of specific investment products within each asset category of the initial recommended portfolio or the alternate recommended portfolio for each of the one or more investment goals, wherein the plurality of specific investment products varies depending on the reference currency;

receiving an investor-determined selection of one of the plurality of specific investment products within each asset category of the initial recommended portfolio or the alternate recommended portfolio for each of the one or more investment goals; and purchasing the investor-determined selection of one of the plurality of specific investment products within each asset category of the initial recommended portfolio or the alternate recommended portfolio for each of the one or more investment goals.

22. The method of claim 18, wherein matching the received investor-determined inputs with the plurality of predetermined portfolio options comprises:

categorizing the investment amount into a first numeric factor;

categorizing the level of investment experience into a second numeric factor;

categorizing the investment time horizon into a third numeric factor;

categorizing desired level of risk/return into a fourth numeric factor; categorizing level of staying power into a fifth numeric factor;

summing the numeric factors; and categorizing the sum of numeric factors in order to determine of the initial recommended investment portfolio from the plurality of predetermined portfolio options.

23. The method of claim 22, further comprising:

referring to an entry in the decision table associated with each of the numeric factors in order to guide the asset allocation for determination of the initial recommended portfolio.

24. A computer-implemented method for assisting an investor with investment decisions, comprising:

receiving investor-specific information, comprising personal data and financial data, wherein the financial data comprises investor asset information comprising a total amount of assets, a current allocation of assets and a designation of a reference currency of a country in which the method is being utilized, wherein the reference currency is selected from a plurality of currencies;

receiving an investor-determined total amount to invest representing a portion of the total amount of assets;

receiving one or more investment goals from the investor;

receiving an investor-determined investment amount, representing an allocation of the total amount to invest, for each of the one or more investment goals;

receiving an investor-determined investment time horizon for each of the one or more investment goals;

receiving an investor-determined risk/return relationship, representing a potential investment outcome and selected from a plurality of risk/return relationships that vary by the selected reference currency, for each of the one or more investment goals;

receiving an investor-determined level of staying power, representing a willingness to maintain the investment amount, for each of the one or more investment goals, if the investment time horizon is greater than or equal to a predetermined short-term time period or if the risk/return relationship is more risky than a predetermined level of risk/return relationship;

receiving an investor-determined level of investment experience indicating the investor's knowledge about investments;

matching via a computer the received investor-determined inputs with a plurality of predetermined portfolio options stored in a decision table in the computer to determine an initial recommended portfolio for each of the one or more investment goals, wherein the initial recommended portfolio comprises an initial recommended asset allocation among a plurality of asset categories, wherein the initial recommended portfolio varies depending on the reference currency;

communicating the initial recommended portfolio to the investor to aid the investor in making investment decisions;

receiving an investor-determined level of comfort with the initial recommended portfolio, where the level of comfort is one of either comfortable or not comfortable;

matching via the computer, if the level of comfort is not comfortable, the received investor-determined inputs with the plurality of predetermined portfolio options to determine an alternate recommended portfolio for each of the one or more investment goals, wherein the alternate recommended portfolio differs from the initial recommended portfolio and comprises an alternate recommended asset allocation among the plurality of asset categories, wherein the alternate recommended portfolio varies depending on the reference currency;

communicating the alternate recommended portfolio to the investor to aid the investor in making investment decisions;

comparing an investor-selected one of the initial recommended portfolio or the alternate recommended portfolio with the current allocation of assets;

comparing the initial recommended portfolio and the alternate recommended portfolio;

recommending to the investor at least one of a plurality of specific investment products within each asset category of the initial recommended portfolio or the alternate recommended portfolio for each of the one or more investment goals, wherein the plurality of specific investment products varies depending on the reference currency;

receiving an investor-determined selection of one of the plurality of specific investment products within each asset category of the initial recommended portfolio or the alternate recommended portfolio for each of the one or more investment goals; and purchasing the investor-determined selection of one of the plurality of specific investment products within each asset category of the initial recommended portfolio or the alternate recommended portfolio for each of the one or more investment goals.

25. The method of claim 24, wherein receiving the financial data further comprises receiving a designation of an asset category and a type of asset within each asset category for the investor asset information.

26. The method of claim 24, further comprising receiving a designation of asset currency selected from a plurality of currencies for each asset category.

27. The method of claim 24, further comprising establishing an interactive, network communication between the investor and an investment expert.

28. The method of claim 24, further comprising:

receiving an investor request for more information on one of the plurality of specific investment products; and presenting more information on the requested one of the plurality of specific investment products to the investor to aid in making investment decisions.

29. The method of claim 24, further comprising presenting an asset allocation tutorial to the investor to aid in making investment decisions.

30. The method of claim 24, further comprising receiving and storing in the computer retrievable notes from the investor, wherein the notes are associated with any portion of the method for assisting the investor with investment decisions.

31. The method of claim 24, wherein matching the received investor-determined inputs with the plurality of predetermined portfolio options comprises:

categorizing the investment amount into a first numeric factor;

categorizing the level of investment experience into a second numeric factor;

categorizing the investment time horizon into a third numeric factor;

categorizing desired level of risk/return into a fourth numeric factor;

categorizing level of staying power into a fifth numeric factor;

summing the numeric factors; and categorizing the sum of numeric factors in order to determine of the initial recommended investment portfolio from the plurality of predetermined portfolio options.

32. The method of claim 31, further comprising:

referring to an entry in the decision table associated with each of the numeric factors in order to guide the asset allocation for determination of the initial recommended portfolio.

33. A computer-implemented method for assisting an investor with investment decisions, comprising:

receiving investor-specific information, comprising personal data and financial data, wherein the financial data comprises investor asset information comprising a total amount of assets, a current allocation of assets and a designation of a reference currency of a country in which the method is being utilized, wherein the reference currency is selected from a plurality of currencies;

receiving an investor-determined total amount to invest representing a portion of the total amount of assets;

receiving one or more investment goals from the investor;

receiving an investor-determined investment amount, representing an allocation of the total amount to invest, for each of the one or more investment goals;

receiving an investor-determined investment time horizon for each of the one or more investment goals;

receiving an investor-determined risk/return relationship, representing a potential investment outcome and selected from a plurality of risk/return relationships that vary by the selected reference currency, for each of the one or more investment goals;

receiving an investor-determined level of staying power, representing a willingness to maintain the investment amount, for each of the one or more investment goals, if the investment time horizon is greater than or equal to a predetermined short-term time period or if the risk/return relationship is more risky than a predetermined level of risk/return relationship;

receiving an investor-determined level of investment experience indicating the investor's knowledge about investments;

determining via a computer an initial recommended portfolio by assigning a score to each of the received investor-determined inputs by correlating each of the inputs with a predetermined profile stored in the computer corresponding to each of the inputs, and wherein the combination of the scores for each of the received investor-determined inputs determines a rating that is compared to a plurality of predetermined portfolio options stored in a decision table in the computer to determine an initial recommended portfolio for each of the one or more investment goals, wherein the initial recommended portfolio comprises an initial recommended asset allocation among a plurality of asset categories, wherein the initial recommended portfolio varies depending on the reference currency;

communicating the initial recommended portfolio to the investor to aid the investor in making investment decisions;

receiving an investor-determined level of comfort with the initial recommended portfolio, where the level of comfort is one of either comfortable or not comfortable;

determining via the computer, if the level of comfort is not comfortable, an alternate recommended portfolio that differs from the initial recommended portfolio by comparing the rating to the plurality of predetermined portfolio options for each of the one or more investment goals, wherein the alternate recommended portfolio comprises an alternate recommended asset allocation among the plurality of asset categories, wherein the alternate recommended portfolio varies depending on the reference currency;

communicating the alternate recommended portfolio to the investor to aid the investor in making investment decisions;

comparing an investor-selected one of the initial recommended portfolio or the alternate recommended portfolio with the current allocation of assets;

comparing the initial recommended portfolio and the alternate recommended portfolio;

recommending to the investor at least one of a plurality of specific investment products within each asset category of the initial recommended portfolio or the alternate recommended portfolio for each of the one or more investment goals, wherein the plurality of specific investment products varies depending on the reference currency;

receiving an investor-determined selection of one of the plurality of specific investment products within each asset category of the initial recommended portfolio or the alternate recommended portfolio for each of the one or more investment goals; and purchasing the investor-determined selection of one of the plurality of specific investment products within each asset category of the initial recommended portfolio or the alternate recommended portfolio for each of the one or more investment goals.

* * * * *